United States Patent
Ebrahim Rezagah et al.

(10) Patent No.: US 12,490,166 B2
(45) Date of Patent: Dec. 2, 2025

(54) USER EQUIPMENT FOR COMMUNICATION OVER A CELLULAR NETWORK AND METHOD FOR OPERATING A USER EQUIPMENT FOR COMMUNICATION OVER A CELLULAR NETWORK

(71) Applicant: KONINKLIJKE PHILIPS N.V., Eindhoven (NL)

(72) Inventors: Roya Ebrahim Rezagah, Berlin (DE); Thomas Wirth, Berlin (DE); Thomas Haustein, Berlin (DE); Jasmina McMenamy, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 718 days.

(21) Appl. No.: 17/715,791

(22) Filed: Apr. 7, 2022

(65) Prior Publication Data

US 2022/0232448 A1 Jul. 21, 2022

Related U.S. Application Data

(63) Continuation of application No. PCT/EP2020/078338, filed on Oct. 8, 2020.

(30) Foreign Application Priority Data

Oct. 11, 2019 (EP) ..................... 19202868

(51) Int. Cl.
*H04W 36/30* (2009.01)
*H04W 36/00* (2009.01)
*H04W 36/36* (2009.01)

(52) U.S. Cl.
CPC ... *H04W 36/305* (2018.08); *H04W 36/00698* (2023.05); *H04W 36/362* (2023.05)

(58) Field of Classification Search
None
See application file for complete search history.

(56) References Cited

U.S. PATENT DOCUMENTS 9,237,489 B2  1/2016 Kuo
10,321,362 B2 *  6/2019 Zhang ............... H04W 36/0069
(Continued)

FOREIGN PATENT DOCUMENTS

CN  102291733 A  * 12/2011 ............ H04W 24/10
CN  102378311 A  *  3/2012
(Continued)

OTHER PUBLICATIONS

3GPP TR 38.874, "[Uploaded in 2 parts] Study on Integrated Access and Backhaul", TR 38.874, 3GPP. 2018. "Study on Integrated Access and Backhaul"; 111 pp., Nov. 2018, pp. 1-94.
(Continued)

*Primary Examiner* — Andrew C Oh

(57) ABSTRACT

A user equipment for communication over a cellular network is configured for simultaneously communicating with one or more cells of first and second nodes of the cellular network, and to methods for operating such user equipments for communication over a cellular network. Furthermore, a user equipment for communication over a cellular network includes a plurality of base stations which are connected over a xhaul network of the cellular network to a core network of the cellular network, wherein the user equipment is configured for communicating with one of the base stations of the cellular network, which is used as a serving base station, or for communicating with more of the base stations of the cellular network simultaneously, which respectively are used as serving base stations, and to methods for operating such user equipments for communication over a cellular network.

63 Claims, 30 Drawing Sheets

(56) References Cited

U.S. PATENT DOCUMENTS

| | | | |
|---|---|---|---|
| 10,750,410 B2 | 8/2020 | Vrzic et al. | |
| 11,706,675 B2* | 7/2023 | Belling | H04W 36/0085 370/331 |
| 2005/0094600 A1* | 5/2005 | Zhang | H04L 1/1893 370/331 |
| 2015/0117183 A1* | 4/2015 | Heo | H04W 8/06 370/242 |
| 2015/0195865 A1* | 7/2015 | Lee | H04W 72/23 455/426.1 |
| 2015/0334765 A1* | 11/2015 | Rahman | H04L 5/0092 370/328 |
| 2018/0124612 A1* | 5/2018 | Babaei | H04W 74/004 |
| 2020/0008113 A1* | 1/2020 | Chen | H04W 36/0085 |

FOREIGN PATENT DOCUMENTS

| | | | | |
|---|---|---|---|---|
| CN | 105210416 A | * | 12/2015 | H04W 36/04 |
| CN | 106031292 A | * | 10/2016 | H04L 5/0053 |
| CN | 106332114 A | * | 1/2017 | H04W 24/02 |
| CN | 106537997 A | * | 3/2017 | H04W 52/367 |
| CN | 110651508 A | * | 1/2020 | H04W 52/343 |
| CN | 111107593 A | * | 5/2020 | H04W 36/30 |
| CN | 111565407 A | * | 8/2020 | H04W 36/00695 |
| CN | 112399504 A | * | 2/2021 | H04W 36/0085 |
| CN | 113412680 A | * | 9/2021 | H04W 76/27 |
| CN | 116419352 A | * | 7/2023 | H04W 76/30 |
| EP | 3930419 A1 | * | 12/2021 | H04W 76/27 |
| KR | 20150020699 A | * | 2/2015 | H04L 5/0091 |
| KR | 20170114258 A | | 10/2017 | |
| RU | 2792670 C2 | * | 3/2023 | |
| WO | WO-2012103762 A1 | * | 8/2012 | H04W 76/19 |
| WO | WO-2012137034 A1 | * | 10/2012 | H04W 36/0072 |
| WO | WO-2013140533 A1 | * | 9/2013 | H04W 36/0079 |
| WO | WO-2018024212 A1 | * | 2/2018 | H04W 36/0069 |
| WO | WO-2018059299 A1 | * | 4/2018 | H04W 36/0064 |
| WO | WO-2015065128 A1 | * | 5/2018 | H04W 72/20 |
| WO | WO-2019092943 A1 | * | 5/2019 | H04W 36/0088 |
| WO | WO-2019098059 A1 | * | 5/2019 | H04W 72/542 |
| WO | WO-2019194715 A1 | * | 10/2019 | H04W 36/0069 |
| WO | WO-2019240770 A1 | * | 12/2019 | H04W 36/0069 |
| WO | WO-2018085049 A1 | * | 5/2020 | H04W 36/185 |

OTHER PUBLICATIONS

3GPP TS 24.501, "[Uploaded in 2 parts] Non-Access-Stratum (NAS) Protocol for 5GS", 3GPP TS 24.501, v. 16.1.0, "Non-Access-Stratum (NAS) Protocol for 5GS"; 541 pp., Jun. 2019, pp. 1-425.
3GPP TS 36.133, "[Uploaded in 8 parts] LTE; Evolved Universal Terrestrial Radio Access (E-UTRA); Requirements for support of radio resource management", 3GPP TS 36.133, v. 15.6.0, "LTE; Evolved Universal Terrestrial Radio Access (E-UTRA); Requirements for support of radio resource management"; 3,584 pp. (includes cover page), Jul. 2019, pp. 1-358.
3GPP TS 36.331, "[Uploaded in 2 parts] Evolved Universal Terrestrial Radio Access (E-UTRA); Radio Resource Control (RRC); Protocol specification", 3GPP TS 36.331, v. 15.6.0, "Evolved Universal Terrestrial Radio Access (E-UTRA); Radio Resource Control (RRC); Protocol specification"; 960 pp., Jun. 2019, pp. 1-481.
3GPP TS 37.340, "Evolved Universal Terrestrial Radio Access (E-UTRA) and NR; Multi-connectivity; Stage", 3GPP TS 37.340, v. 15.6.0, Evolved Universal Terrestrial Radio Access (E-UTRA) and NR; Multi-connectivity; Stage 2, Jun. 2019, 69 pp.
3GPP TS 38.133, "[Uploaded in 2 parts] Requirements for support of radio resource management", 3GPP TS 38.133, v. 15.4.0, "NR; Requirements for support of radio resource management"; 876 pp., Dec. 2018, pp. 1-522.
3GPP TS 38.215, "5G; NR; Physical layer measurements", 3GPP TS 38.215, v. 15.5.0, "5G; NR; Physical layer measurements"; 18 pp., Jul. 2019.
3GPP TS 38.331, "NR; Radio Resource Control (RRC) protocol specification", 3GPP TS 38.331, v. 15.6.0, "NR; Radio Resource Control (RRC) protocol specification", Jun. 2019, 519 pp.
3GPP TS 38.401, "5G; NG-RAN; Architecture description", 3GPP TS 38.401, v. 15.6.0, "5G; NG-RAN; Architecture description"; 48 pp., Jul. 2019.
3GPP TS 38.423, "NG-RAN; XN application protocol (XnAP)", 3GPP TS 38.423, v. 15.3.0, "NG-RAN; XN application protocol (XnAP)", Mar. 2019, 294 pp.
3GPP TSG-RAN WG2 #105, "Backhaul link RLF handling", Nokia et al. "Backhaul link RLF handling", 3GPP draft R2-1900627, vol. RAN WG2, Mar. 2019, XP051602005; 8 pp., Mar. 2019.
3GPP TSG-RAN WG2 #105bis, "Reuse of conditional handover for SCG change in NR-DC", NEC, 3GPP TSG RAN WG2 #105bis, R2-1904069 Reuse of conditional handover for SCG change in NR-DC, Apr. 2019; 3 pp., Apr. 2019.
3GPP TSG-RAN WG2 #106, "Conditional PSCell addition", MediaTek Inc., "Conditional PSCell addition" 3GPP draft R2-1906082, May 2019, XP051729559, 3 pp., May 2019.
3GPP TSG-RAN WG2 #107, "Chairman's Notes", 3GPP RAN WG 2 #107—"Chairman's Notes." Prague, 2019; 175 pp., Aug. 2019.
3GPP TSG-RAN WG2 #107bis, "Conditional NR PSCell addition/change failure handling", Qualcomm Inc., "Conditional NR PSCell addition/change failure handling", 3GPP draft R2-1912298, vol. RAN WG2, Oct. 2019, XP051790345, 3 pp., Oct. 2019.
3GPP TSG-RAN WG2 #77, "Random Access Failure Handling on SCell", Ericsson et al., "Random Access Failure Handling on SCell" 3GPP draft R2-120482, vol. RAN WG2, 2012, XP050565411; 3 pp., Feb. 2012.
Ahmadi "5G NR", Ahmadi, "5G NR", Elsevier, 2019, p. 124, 2019.
Ericsson, "LTE-NR tight-interworking and the first steps to 5G", https://www.ericsson.com/en/blog/2017/11/lte-nr-tight-interworking-and-the-first-steps-to-5g; 9 pp., Nov. 2017.
Ericsson, R2-1900404, "Conditional Handover in NR", Ericsson, 3GPP TSG RAN WG2 #105, R2-1900404 Conditional Handover in NR, Mar. 2019, 6 pp.
Lee, Jeong-Hwan, et al., "A Study of the Radio Resource Control Connection Re-establishment Procedure on the UE side in 3GPP", Lee et al., "A Study of the Radio Resource Control Connection", ETRI, 2015; 3 pp., pp. 260-262.
Rao, Jaya, et al., "Packet Duplication for URLLC in 5G: Architectural Enhancements and Performance Analysis", Rao, Jaya, and Sophie Vrzic. 2018. "Packet Duplication for URLLC in 5G: Architectural Enhancements and Performance Analysis." IEEE Network, 2018; 9 pp., pp. 32-40.
Rosa, Claudio, et al., "Dual Connectivity for LTE Small Cell Evolution: Functionality and Performance Aspects", Rosa, Claudio, "Dual Connectivity for LTE Small Cell Evolution: Functionality and Performance Aspects", IEEE Communications Magazine, 2016; 8 pp., pp. 136-143.
Sauter, Martin, "5G—Part 3—Dual Connectivity (EN-DC)", Sauter, Martin, https://blog.wirelessmoves.com/2017/09/5g-part-3-dual-connectivity-en-dc.html; 3 pp.
3GPP TSG-RAN WG2 Meeting #107 R2-1909536 Prague, CZ, Aug. 26-30, 2019 Source: vivo (Rapporteur) Title: Report on [106#41][NR and LTE CHO]—CHO execution details Agenda Item: 11.9.3.2 Document for: Discussion and Decision.
3GPP TSG-RAN WG2 Meeting #105bis R2-1904392 Xi'an, China, Apr. 8-12, 2019 Agenda item: 11.9.3 Source: Samsung Title: Discussion on fast RLF recovery enhancements in NR WID/SID: NR_MOB_ENH—Release 16 Document for: Discussion and Decision.
3GPP TSG-RAN WG2 Meeting #107 R2-1909542 Prague, Czech Republic, Aug. 26-30, 2019 (Revision of R2-1906126) Source: vivo Title: Remaining issues for cell level triggers for conditional handover Agenda Item: 11.9.3.4Document for: Discussion and Decision.
3GPP TSG-RAN WG2 Meeting #107bis R2-1912297 Chongqing, CN, Oct 14-Oct. 18, 2019 Agenda item: 6.9.4Source: Qualcomm Incorporated Title: Conditional NR PSCell addition/change procedures WID/SID: NR mobility enhancements.
3GPP TSG-RAN WG2 Meeting #107 Chonqing, China Oct. 14-18, 2019 Futurewei "Procedure and Configurations for Conditional SN Change".

* cited by examiner

USER EQUIPMENT FOR COMMUNICATION OVER A CELLULAR NETWORK AND METHOD FOR OPERATING A USER EQUIPMENT FOR COMMUNICATION OVER A CELLULAR NETWORK

CROSS-REFERENCES TO RELATED APPLICATIONS

This application is a continuation of copending International Application No. PCT/EP2020/078338, filed Oct. 8, 2020, which is incorporated herein by reference in its entirety, and additionally claims priority from European Application No. EP 19202868.6, filed Oct. 11, 2019, which is incorporated herein by reference in its entirety.

BACKGROUND OF THE INVENTION

The present disclosure refers to user equipments for communication over a cellular network and to methods for operating a user equipment for communication over a cellular network.

SUMMARY

An embodiment may have a user equipment for communication over a cellular network; wherein the user equipment is configured for simultaneously communicating with one or more cells of a first node of the cellular network and with one or more cells of a second node of the cellular network; wherein the user equipment is configured for receiving a first request for reconfiguration which includes an indication that a first cell of the first node, which communicates with the user equipment, has to be replaced by a first replacement cell of the cellular network, wherein the first request for reconfiguration includes a first change condition under which the first request for reconfiguration has to be executed, and/or for receiving a second request for reconfiguration which includes an indication that a first cell of the second node, which communicates with the user equipment, has to be replaced by a second replacement cell of the cellular network, wherein the second request for reconfiguration includes a second change condition under which the second request for reconfiguration has to be executed; wherein the user equipment includes a monitoring unit for monitoring the first change condition and/or the second change condition; and wherein the user equipment is configured for replacing the first cell of the first node by the first replacement cell, in case that the monitoring unit detects that the first change condition is met, and/or for replacing the first cell of the second node by the second replacement cell, in case that the monitoring unit detects that the second change condition is met.

According to another embodiment, a method for operating a user equipment for communication over a cellular network may have the steps of: using the user equipment for simultaneously communicating with one or more cells of a first node of the cellular network and with one or more cells of a second node of the cellular network; using the user equipment for receiving a first request for reconfiguration which includes an indication that a first cell of the first node, which communicates with the user equipment, has to be replaced by a first replacement cell of the cellular network, wherein the first request for reconfiguration includes a first change condition under which the first request for reconfiguration has to be executed, and/or for receiving a second request for reconfiguration which includes an indication that a first cell of the second node, which communicates with the user equipment, has to be replaced by a second replacement cell of the cellular network, wherein the second request for reconfiguration includes a second change condition under which the second request for reconfiguration has to be executed; using a monitoring unit of the user equipment for monitoring the first change condition and/or the second change condition; and using the user equipment for replacing the first cell of the first node by the first replacement cell, in case that the monitoring unit detects that the first change condition is met, and/or for replacing the first cell of the second node by the second replacement cell, in case that the monitoring unit detects that the second change condition is met.

Another embodiment may have a user equipment for communication over a cellular network; wherein the user equipment is configured for simultaneously communicating with one or more cells of a first node of the cellular network and with one or more cells of a second node of the cellular network; wherein the user equipment includes a monitoring unit for monitoring a quality of a first communication link between the user equipment and a first cell of the cells of the first node and/or for monitoring a quality of a second communication link between the user equipment and a first cell of the cells of the second node; wherein the user equipment is configured for transmitting
 a first replacement request for replacing the first cell of the first node by a first replacement cell, which is a second cell of the first node or a cell of a third node, in case that the monitoring unit detects a first change condition of the first communication link; and/or
 a second replacement request for replacing the first cell of the second node by a second replacement cell, which is a second cell of the second node or a cell of a fourth node, in case that the monitoring unit detects a second change condition of the second communication link.

According to yet another embodiment, a method for operating a user equipment for communication over a cellular network may have the steps of: using the user equipment for simultaneously communicating with one or more cells of a first node of the cellular network and with one or more cells of a second node of the cellular network; using a monitoring unit of the user equipment for monitoring a quality of a first communication link between the user equipment and a first cell of the cells of the first node and/or for monitoring a quality of a second communication link between the user equipment and a first cell of the cells of the second node; using the user equipment for transmitting
 a first replacement request for replacing the first cell of the first node by a first replacement cell, which is a second cell of the first node or a cell of a third node, in case that the monitoring unit detects a first change condition of the first communication link; and/or
 a second replacement request for replacing the first cell of the second node by a second replacement cell, which is a second cell of the second node or a cell of a fourth node, in case that the monitoring unit detects a second change condition of the second communication link.

Yet another embodiment may have a user equipment for communication over a cellular network, wherein the cellular network includes a plurality of base stations which are connected over a xhaul network of the cellular network to a core network of the cellular network; wherein the user equipment is configured for communicating with one of the base stations of the cellular network, which is used as a serving base station, or for communicating with more of the base stations of the cellular network simultaneously, which respectively are used as serving base stations; wherein the user equipment is configured for transmitting a list of candidate base stations, which are eligible for replacing at least one of the serving base stations, to one of the serving base stations; wherein the user equipment is configured for receiving quality information regarding a quality of a communication link between one of the candidate base stations and the core network for a plurality of the candidate base stations from at least one of the serving base stations; wherein the user equipment is configured for selecting one or more of the candidate base stations for replacing one or more of the base stations currently used as serving base stations based on the quality information.

Still another embodiment may have a method for operating a user equipment for communication over a cellular network, wherein the cellular network includes a plurality of base stations which are connected over a xhaul network of the cellular network to a core network of the cellular network; which method may have the steps of: using the user equipment for communicating with one of the base stations of the cellular network, which is used as a serving base station, or for communicating with more of the base stations of the cellular network simultaneously, which respectively are used as serving base stations; using the user equipment for transmitting a list of candidate base stations, which are eligible for replacing at least one of the serving base stations, to one of the serving base stations; using the user equipment for receiving quality information regarding a quality of a communication link between one of the candidate base stations and the core network for a plurality of the candidate base stations from at least one of the serving base stations; using the user equipment for selecting one or more of the candidate base stations for replacing one or more of the base stations currently used as serving base stations based on the quality information.

According to yet another embodiment, a non-transitory digital storage medium may have a computer program stored thereon to perform any of the inventive methods, when said computer program is run by a computer.

In a one aspect the disclosure refers to a user equipment for communication over a cellular network;
  wherein the user equipment is configured for simultaneously communicating with one or more cells of a first node of the cellular network and with one or more cells of a second node of the cellular network;
  wherein the user equipment comprises a monitoring unit for monitoring a quality of a first communication link between the user equipment and a first cell of the cells of the first node and/or for monitoring a quality of a second communication link between the user equipment and a first cell of the cells of the second node;
  wherein the user equipment is configured for transmitting
    a first replacement request for replacing the first cell of the first node by a first replacement cell, which is a second cell of the first node or a cell of a third node, in case that the monitoring unit detects a first change condition of the first communication link; and/or
    a second replacement request for replacing the first cell of the second node by a second replacement cell, which is a second cell of the second node or a cell of a fourth node, in case that the monitoring unit detects a second change condition of the second communication link.

In a further aspect the disclosure refers to a method for operating a user equipment for communication over a cellular network; the method comprising the steps:
  using the user equipment for simultaneously communicating with one or more cells of a first node of the cellular network and with one or more cells of a second node of the cellular network;
  using a monitoring unit of the user equipment for monitoring a quality of a first communication link between the user equipment and a first cell of the cells of the first node and/or for monitoring a quality of a second communication link between the user equipment and a first cell of the cells of the second node;
  using the user equipment for transmitting
    a first replacement request for replacing the first cell of the first node by a first replacement cell, which is a second cell of the first node or a cell of a third node, in case that the monitoring unit detects a first change condition of the first communication link; and/or
    a second replacement request for replacing the first cell of the second node by a second replacement cell, which is a second cell of the second node or a cell of a fourth node, in case that the monitoring unit detects a second change condition of the second communication link.

In a further aspect the disclosure refers to a user equipment for communication over a cellular network;
  wherein the user equipment is configured for simultaneously communicating with one or more cells of a first node of the cellular network and with one or more cells of a second node of the cellular network;
  wherein the user equipment is configured for receiving a first request for reconfiguration which comprises an indication that a first cell of the first node, which communicates with the user equipment, has to be replaced by a first replacement cell of the cellular network, wherein the first request for reconfiguration comprises a first change condition under which the first request for reconfiguration has to be executed, and/or for receiving a second request for reconfiguration which comprises an indication that a first cell of the second node, which communicates with the user equipment, has to be replaced by a second replacement cell of the cellular network, wherein the second request for reconfiguration comprises a second change condition under which the second request for reconfiguration has to be executed;
  wherein the user equipment comprises a monitoring unit for monitoring the first change condition and/or the second change condition; and
  wherein the user equipment is configured for replacing the first cell of the first node by the first replacement cell, in case that the monitoring unit detects that the first change condition is met, and/or for replacing the first cell of the second node by the second replacement cell, in case that the monitoring unit detects that the second change condition is met.

In a further aspect the disclosure refers to a method for operating a user equipment for communication over a cellular network; the method comprising the steps:
  using the user equipment for simultaneously communicating with one or more cells of a first node of the cellular network and with one or more cells of a second node of the cellular network;
  using the user equipment for receiving a first request for reconfiguration which comprises an indication that a first cell of the first node, which communicates with the user equipment, has to be replaced by a first replacement cell of the cellular network, wherein the first request for reconfiguration comprises a first change condition under which the first request for reconfiguration has to be executed, and/or for receiving a second request for reconfiguration which comprises an indication that a first cell of the second node, which communicates with the user equipment, has to be replaced by a second replacement cell of the cellular network, wherein the second request for reconfiguration comprises a second change condition under which the second request for reconfiguration has to be executed;

using a monitoring unit of the user equipment for monitoring the first change condition and/or the second change condition; and using the user equipment for replacing the first cell of the first node by the first replacement cell, in case that the monitoring unit detects that the first change condition is met, and/or for replacing the first cell of the second node by the second replacement cell, in case that the monitoring unit detects that the second change condition is met.

In a further aspect the disclosure refers to a user equipment for communication over a cellular network, wherein the cellular network comprises a plurality of base stations which are connected over a xhaul network of the cellular network to a core network of the cellular network;

wherein the user equipment is configured for communicating with one of the base stations of the cellular network, which is used as a serving base station, or for communicating with more of the base stations of the cellular network simultaneously, which respectively are used as serving base stations;

wherein the user equipment is configured for transmitting a list of candidate base stations, which are eligible for replacing at least one of the serving base stations, to one of the serving base stations;

wherein the user equipment is configured for receiving quality information regarding a quality of a communication link between one of the candidate base stations and the core network for a plurality of the candidate base stations from at least one of the serving base stations;

wherein the user equipment is configured for selecting one or more of the candidate base stations for replacing one or more of the base stations currently used as serving base stations based on the quality information.

In a further aspect the disclosure refers to a method for operating a user equipment for communication over a cellular network, wherein the cellular network comprises a plurality of base stations which are connected over a xhaul network of the cellular network to a core network of the cellular network; the method comprising the steps:

using the user equipment for communicating with one of the base stations of the cellular network, which is used as a serving base station, or for communicating with more of the base stations of the cellular network simultaneously, which respectively are used as serving base stations;

using the user equipment for transmitting a list of candidate base stations, which are eligible for replacing at least one of the serving base stations, to one of the more other base stations of a cellular network becoming the new serving base station;

using the user equipment for receiving quality information regarding a quality of a communication link between one of the candidate base stations and the core network for a plurality of the candidate base stations from at least one of the serving base stations;

using the user equipment for selecting one or more of the candidate base stations for replacing one or more of the base stations currently used as serving base stations based on the quality information.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
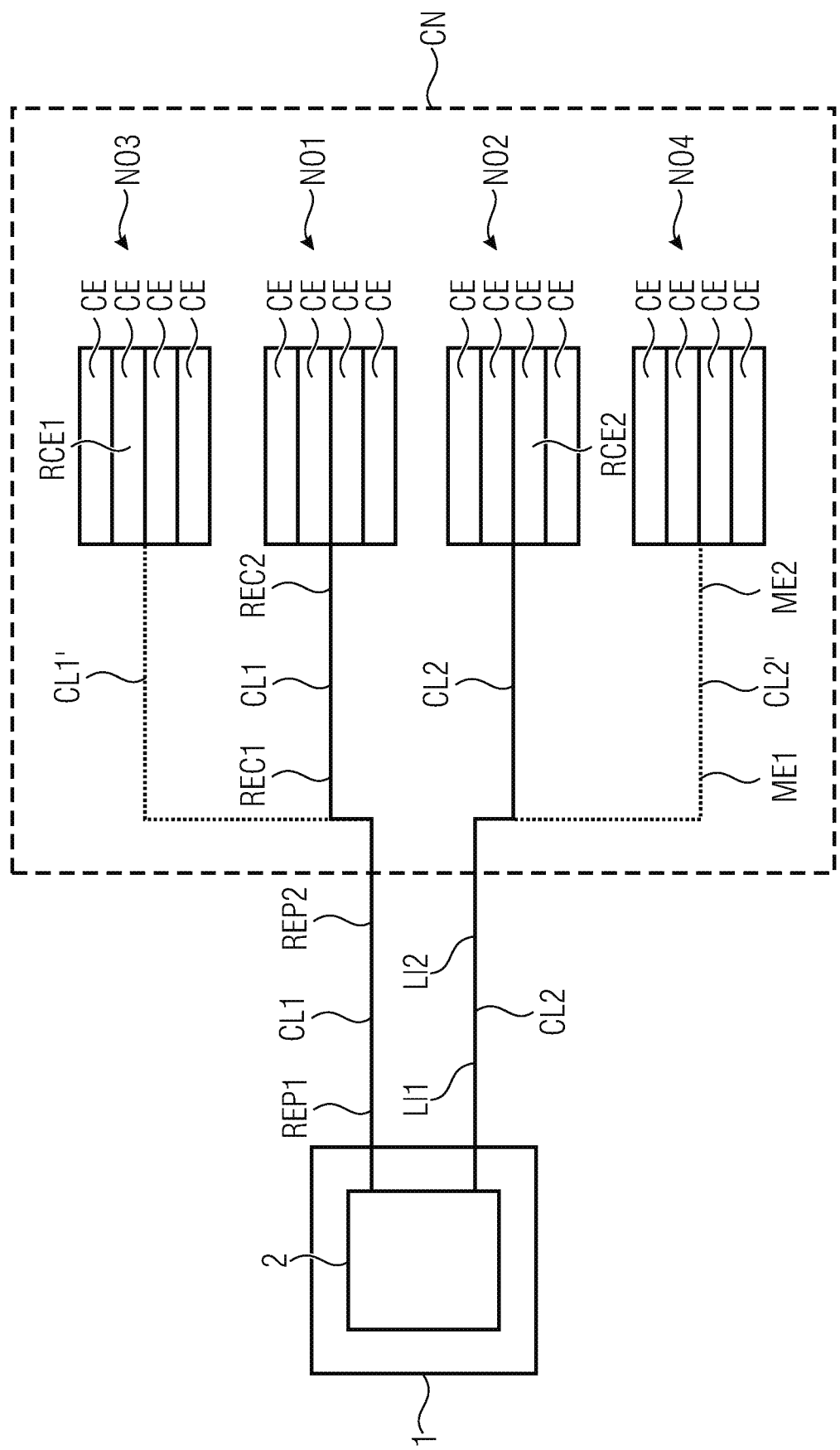
FIG. 1 illustrates embodiments of a user equipment according to the disclosure and its interactions with a cellular network in a schematic view.

Equal or equivalent elements or elements with equal or equivalent functionality are denoted in the following description by equal or equivalent reference numerals. It has to be noted that any information which is given in the context of embodiments of one of the Figures is also valid in the context of embodiments of the other Figures. This is, in particular, valid for definitions and features contained in the following description.

In the following description, a plurality of details is set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 2:
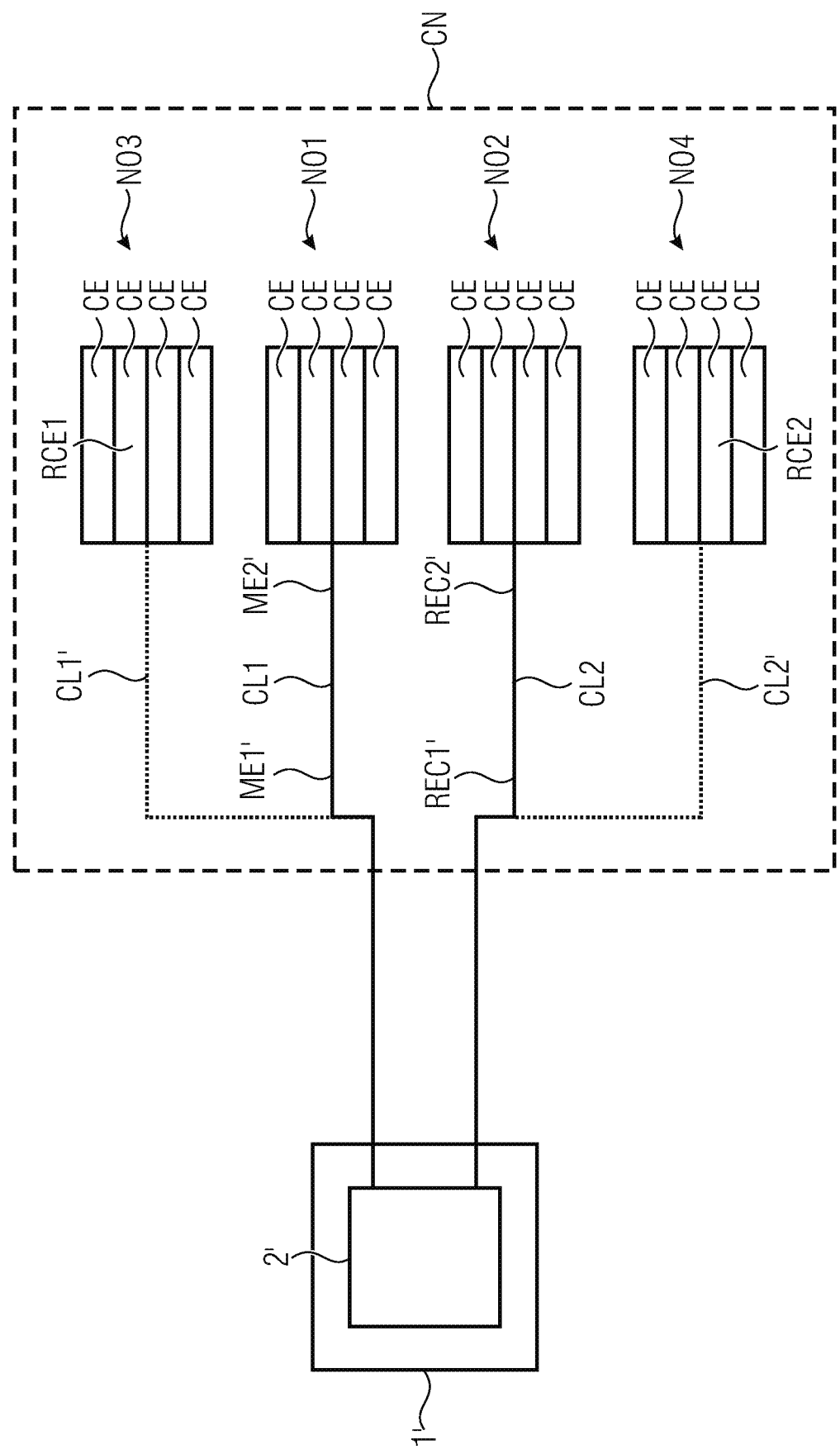
FIG. 2 illustrates further embodiments of a user equipment according to the disclosure and its interactions with a cellular network in a schematic view.
Figure 3:
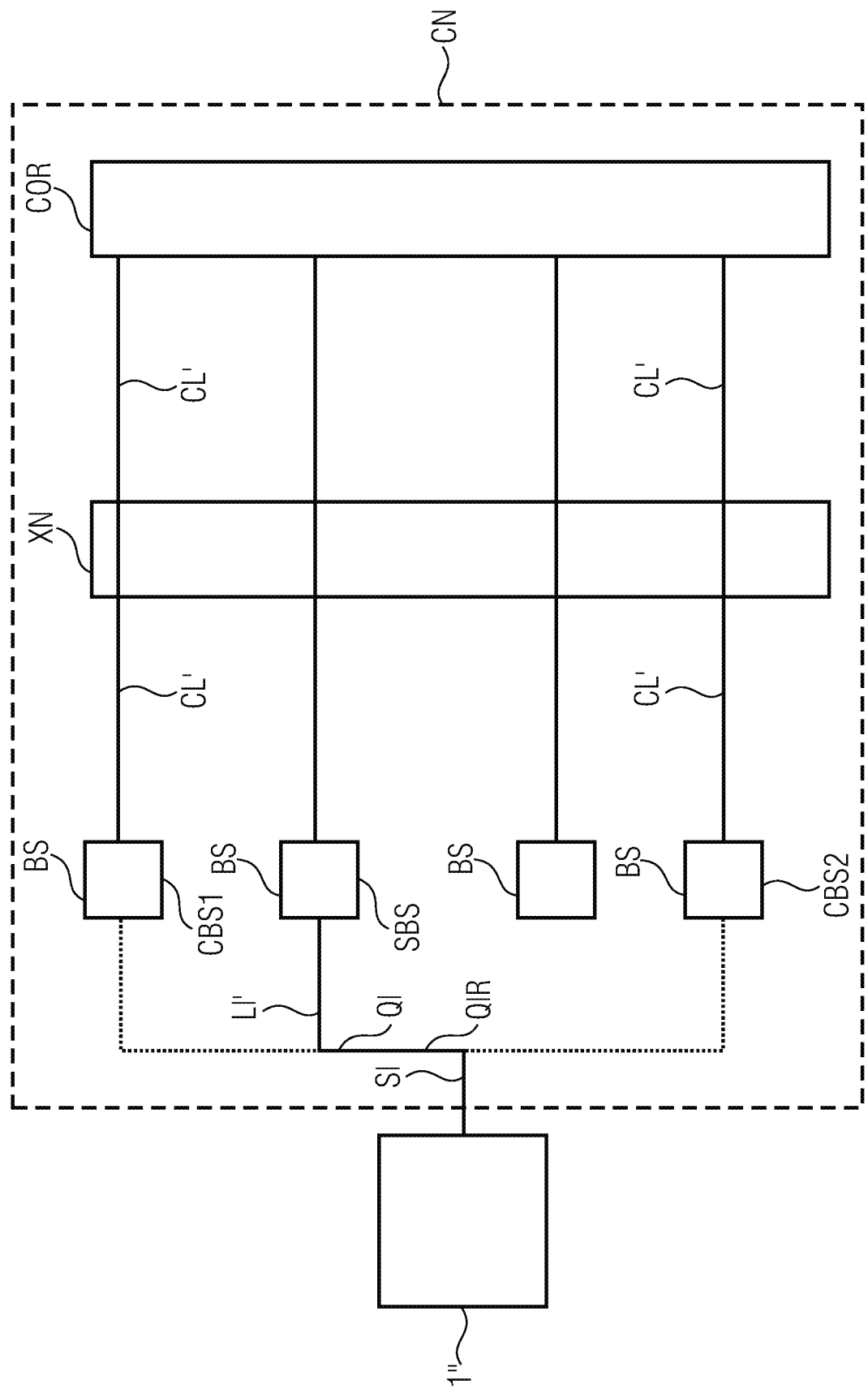
FIG. 3 illustrates further embodiments of a user equipment according to the disclosure and its interactions with a cellular network in a schematic view.

FIGS. 1 to 3 illustrate implementations of the disclosure in a general way. In contrast to that, FIGS. 4 to 27 illustrate implementations of the disclosure in Multi-Radio Dual Connectivity in 5G. However, a person skilled in the art will understand that the disclosure is not limited to the latter. Moreover, person skilled in the art will understand that features explained in the context of 5G are also possible in other cellular networks.

FIG. 1 illustrates an embodiment of a user equipment 1 according to the disclosure and its interactions with a cellular network CN in a schematic view.

According to some embodiments, the user equipment 1 for communication over a cellular network CN is configured for simultaneously communicating with one or more cells CE of a first node NO1 of the cellular network and with one or more cells CE of a second node NO2 of the cellular network CN;
  wherein the user equipment 1 comprises a monitoring unit 2 for monitoring a quality of a first communication link CL1 between the user equipment 1 and a first cell CE of the cells CE of the first node NO1 and/or for monitoring a quality of a second communication link CL2 between the user equipment 1 and a first cell CE of the cells CE of the second node NO2;
  wherein the user equipment 1 is configured for transmitting
  a first replacement request REP1 for replacing the first cell CE of the first node NO1 by a first replacement cell RCE1, which is a second cell CE of the first node NO1 or a cell CE of a third node NO3, in case that the monitoring unit 2 detects a first change condition of the first communication link CL1; and/or
  a second replacement request REP2 for replacing the first cell CE of the second node NO2 by a second replacement cell RCE2, which is a second cell CE of the second node NO2 or a cell of a fourth node NO4, in case that the monitoring unit 2 detects a second change condition of the second communication link CL2.

The user equipment 1 may comprise one or more of a mobile terminal, or a stationary terminal, or a cellular IoT user equipment, or a vehicular user equipment, or a vehicular group leader (GL) user equipment, or an IoT or narrow-band IoT, NB-IoT, device, or a ground-based vehicle, or an aerial vehicle, or a drone, or a moving base station, or a road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity. The user equipment can also be part of an integrated access and backhaul (IAB) node, e.g. the mobile terminal (MT) part of an IAB node.

The user equipment 1 may be configured for a downlink/uplink/sidelink communication using, for example resources from a set of downlink/uplink/sidelink resources of the cellular network.

The cellular network may comprise a plurality of base stations, wherein the base stations may comprise one or more of a macro cell base station, or a small cell base station, or a central unit of a base station, or a base station operating as cloud-RAN (CRAN), or a distributed unit of a base station, or a road side unit (RSU), or a cell, or a node, or a special cell (SpCell), further user equipments, or a group leader (GL) user equipment, or a relay, or a remote radio head, or an access and mobility management function (AMF), or a session management function (SMF), or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

A cell CE is a device which uses a set of time/frequency/code (e.g. as in CDM)/spatial (e.g. sectors)/spatial coding (beams and/or precoding) resources.

In some embodiments the user equipment 1 is configured for simultaneously communicating with one or more cells CE of a plurality of first nodes NO1 and with one or more cells CE of a plurality of second nodes NO2.

The term "first cell CE" refers to any specific cell CE of the cells in order to distinguish it from other cells CE of the respective node NO. In other words, the term does not refer to any order of the cells CE.

The monitoring unit 2 may comprise a software module which is configured for running on a processor of the user equipment 1.

According to some embodiments, the user equipment 1 is configured for communication over the cellular network CN using dual or multi connectivity. Dual connectivity implies simultaneous communication to two base stations, whereas multi connectivity implies simultaneous communication to more than two base stations, e.g. three or more base stations.

According to some embodiments, the first node NO1 is a base station and a Master Node for dual or multi connectivity; and wherein the second node NO2 is a base station and a Secondary Node for dual or multi connectivity.

According to some embodiments, the first cell CE of the first node NO1 is a Special Cell or a Secondary Cell of a Master Cell Group for dual or multi connectivity; and/or wherein the first cell CE of the second node NO2 is Special Cell or a Secondary Cell of a Secondary Cell Group for dual or multi connectivity.

According to some embodiments, first change condition and/or the second change condition is any of or a combination of any of:
  a specified number of instances where a timer of a Radio Link Failure timer has started, but has not expired within a specified period of time;

a specified number of HARQ retransmission from the PHY layer;

a specified number of retransmissions from a RLC layer that is less than the maximum number upon which the user equipment 1 detects a radio-link failure;

a weighted or moving average or any other specified statistical method using adopted metrics that shows a degradation of a signal quality;

a coded or uncoded bit error rate;

a packet loss rate or a packet error rate;

a data rate demand;

a supported bandwidth;

a multi-cell event, such as a multi-cell event in which one of the adopted metrics of the respective replacement cell RCE1, RCE2 becomes better during at least one specified period than the corresponding adopted metrics of the respective first cell CE, a multi-cell event in which one of the adopted metrics of the respective replacement cell RCE1, RCE2 becomes better during at least one specified period than a threshold or a multi-cell event in which one of the adopted metrics of the respective first cell CE becomes worse during at least one specified period than a first threshold and the corresponding adopted metrics of the respective replacement cell RCE1, RCE2 becomes better during the at least one specified period than a second threshold, wherein the multi-cell event is triggered by the user equipment 1, one of the nodes NO1, NO2 or another device of the cellular network CN.

The term "adopted metrics" may refer to Channel Quality Indicator (CQI), Reference Signal Received Power (RSRP), Received Signal Strength Indicator (RSSI), Signal Reference Signal Received Quality (RSRQ), Signal-to-Noise and Interference Ratio (SINR), any metric evaluating the quality of Channel State Information (CSI), or any other suitable metric.

The first change condition and/or the second change condition may comprise one or more of the following conditions:

Coded/uncoded BER measurements,

Packet loss, Packet error rate (PER),

Data rate demand,

Supported bandwidth (e.g. the UE might want to use less bandwidth in order to reduce power consumption, or it might want to have higher bandwidth to have a quicker transport of data and then go into a power saving mode afterwards), Based on an event, e.g. multi-cell event, a trigger from the base station or network or configured within the UE—see (TS 36.331 and TS 38.331), e.g.:

Event A3 (Neighbour becomes offset better than SpCell),

Event A4 (Neighbour becomes better than threshold),

Event A5 (SpCell becomes worse than threshold) and neighbour becomes better than threshold2).

According to some embodiments, the user equipment 1 is configured for transmitting the first replacement request REP1 to the first node NO1 or to the second node NO2.

According to some embodiments, the user equipment 1 is configured for transmitting the second replacement request REP2 to the first node NO1 or to the second the node NO2.

According to some embodiments, the user equipment 1 is configured for identifying candidate cells CE for the first replacement cell RCE1 or the second replacement cell RCE2 by means of measuring signals of possible candidate cells.

According to some embodiments, the user equipment 1 is configured for receiving a first list LI1 of candidate cells CE for the first replacement cell RCE1 from the first node NO1 or from the second node NO2.

According to some embodiments, the user equipment 1 is configured for receiving a second list LI2 of candidate cells CE for the second replacement cell RCE2 from the first node NO1 or from the second node NO2.

According to some embodiments, the user equipment 1 is configured for receiving a first request for reconfiguration REC1 which comprises an indication which of the cells CE of the cellular network CN is the first replacement cell RCE1 and an indication that the first request for reconfiguration REC1 is a response to the first replacement request REP1.

According to some embodiments, the user equipment 1 is configured for receiving the first request for reconfiguration REC1 from the first node NO1 or from the second node NO2.

According to some embodiments, the user equipment is configured for communicating with the first replacement cell RC1 after the first request for reconfiguration REC1 has been received by the user equipment 1.

According to some embodiments, the user equipment 1 is configured for transmitting a first message ME1 to the first node NO1 or to the second node NO2, wherein the first message ME1 indicates that the first cell CE of the first node NO1 has been released, after the first request for reconfiguration REC1 has been received by the user equipment 1.

According to some embodiments, the user equipment 1 is configured for indicating within the first replacement request REC1, whether the first replacement cell RCE1 belongs to the first node NO1 or to the third node NO3.

According to some embodiments, the user equipment 1 is configured for receiving a second request for reconfiguration REC2 which comprises an indication which of the cells CE of the cellular network CN is the second replacement cell RCE2 and an indication that the second request for reconfiguration REC2 is a response to the second replacement request REP2.

According to some embodiments, the user equipment 1 is configured for receiving the second request for reconfiguration REC2 from the first node NO1 or from the second node NO2.

According to some embodiments, the user equipment 1 is configured for communicating with the second replacement cell RCE2 after the second request for reconfiguration REC2 has been received by the user equipment 1.

According to some embodiments, the user equipment 1 is configured for transmitting a second message ME2 to the first node NO1 or to the second node NO2, wherein the second message ME2 indicates that the first cell CE of the second node NO2 has been released, after the second request for reconfiguration REC has been received by the user equipment 1.

According to some embodiments, the user equipment 1 is configured for indicating within the second replacement request REC2, whether the second replacement cell RCE2 belongs to the second node NO2 or to the fourth node NO4.

Further disclosed are embodiments of a method for operating a user equipment 1 for communication over a cellular network CN; the method comprising the steps:

using the user equipment 1 for simultaneously communicating with one or more cells CE of a first node NO1 of the cellular network CN and with one or more cells CE of a second node NO2 of the cellular network CN;

using a monitoring unit 2 of the user equipment 1 for monitoring a quality of a first communication link CL1 between the user equipment 1 and a first cell CE of the cells CE of the first node NO1 and/or for monitoring a quality of a second communication link CL1 between the user equipment 1 and a first cell CE of the cells CE of the second node NO2;

using the user equipment 1 for transmitting
a first replacement request REP1 for replacing the first cell CE of the first node NO1 by a first replacement cell RCE1, which is a second cell CE of the first node NO1 or a cell CE of a third node NO3, in case that the monitoring unit 2 detects a first change condition of the first communication link CL1; and/or
a second replacement request REP2 for replacing the first cell CE of the second node NO2 by a second replacement cell REC2, which is a second cell CE of the second node NO2 or a cell of a fourth node NO4, in case that the monitoring unit 2 detects a second change condition of the second communication link CL2.

Further disclosed are embodiments of a computer program for, when running on a processor, executing the method described above.

FIG. 2 illustrates further embodiments of a user equipment 1' according to the disclosure and its interactions with a cellular network CN in a schematic view.

According to some embodiments, the user equipment 1' for communication over a cellular network CN is configured for simultaneously communicating with one or more cells CE of a first node NO1 of the cellular network CN and with one or more cells CE of a second node NO2 of the cellular network CN;

wherein the user equipment 1' is configured for receiving a first request for reconfiguration REC1' which comprises an indication that a first cell CE of the first node NO1, which communicates with the user equipment 1', has to be replaced by a first replacement cell RCE1 of the cellular network CN, wherein the first request for reconfiguration REC1' comprises a first change condition under which the first request for reconfiguration REC1' has to be executed, and/or for receiving a second request for reconfiguration REC2' which comprises an indication that a first cell CE of the second node NO2, which communicates with the user equipment 1', has to be replaced by a second replacement cell RCE2' of the cellular network CN, wherein the second request for reconfiguration RCE2' comprises a second change condition under which the second request for reconfiguration RCE2' has to be executed;
wherein the user equipment 1' comprises a monitoring unit 2' for monitoring the first change condition and/or the second change condition; and
wherein the user equipment 1' is configured for replacing the first cell CE of the first node NO1 by the first replacement cell RCE1, in case that the monitoring unit 2' detects that the first change condition is met, and/or for replacing the first cell CE of the second node NO2 by the second replacement cell RCE2, in case that the monitoring unit 2' detects that the second change condition is met.

According to some embodiments, the user equipment 1' is configured for replacing the first cell CE of the first node NO1 by the first replacement cell RCE1 in such way that the first cell CE of the first node NO1 is released by the user equipment 1' before the user equipment 1' connects to the first replacement cell RCE1 and/or for replacing the first cell CE of the second node NO2 by the second replacement cell RCE2 in such way that the first cell CE of the second node NO2 is released by the user equipment 1' before the user equipment 1' connects to the second replacement cell RCE2.

According to some embodiments, the user equipment 1' is configured for replacing the first cell CE of the first node NO1 by the first replacement cell RCE1 in such way that the user equipment 1 connects to the first replacement cell RCE1 before the first cell CE of the first node NO1 is released by the user equipment 1 and/or for replacing the first cell CE of the second node NO2 by the second replacement cell RCE2 in such way that the user equipment 1' connects to the second replacement cell RCE2 before the first cell CE of the second node NO2 is released by the user equipment 1'.

According to some embodiments, the user equipment 1' is configured for communication over the cellular network CN using dual or multi connectivity.

According to some embodiments, the first node NO1 is a base station and a Master Node for dual or multi connectivity; and wherein the second node NO2 is a base station and a Secondary Node for dual or multi connectivity.

According to some embodiments, the first cell CE of the first node NO1 is a Special Cell or a Secondary Cell of a Master Cell Group for dual or multi connectivity; and/or wherein the first cell CE of the second node NO2 is Special Cell or a Secondary Cell of a Secondary Cell Group for dual or multi connectivity.

According to some embodiments, first change condition and/or the second change condition is any of or a combination of any of:
a specified number of instances where a timer of a Radio Link Failure timer has started, but has not expired within a specified period of time;
a specified number of HARQ retransmission from the PHY layer;
a specified number of retransmissions from a RLC layer that is less than the maximum number upon which the user equipment 1 detects a radio-link failure:
a weighted or moving average or any other specified statistical method using adopted metrics that shows a degradation of a signal quality;
a coded or uncoded bit error rate;
a packet loss rate or a packet error rate;
a data rate demand;
a supported bandwidth;
a multi-cell event, such as a multi-cell event in which one of the adopted metrics of the respective replacement cell RCE1, RCE2 becomes better during at least one specified period than the corresponding adopted metrics of the respective first cell CE, a multi-cell event in which one of the adopted metrics of the respective replacement cell RCE1, RCE2 becomes better during at least one specified period than a threshold or a multi-cell event in which one of the adopted metrics of the respective first cell CE becomes worse during at least one specified period than a first threshold and the corresponding adopted metrics of the respective replacement cell RCE1, RCE2 becomes better during at least one specified period than a second threshold, wherein the multi-cell event is triggered by the user equipment 1', one of the nodes NO1, NO2 or another device of the cellular network CN.

According to some embodiments, the user equipment 1' is configured for receiving the first request for reconfiguration REC1' from the first node NO1 or the second node NO2.

According to some embodiments, the user equipment 1' is configured for receiving the second request for reconfiguration REC2' from the first node NO1 or from the second node NO2.

According to some embodiments, the user equipment 1' is configured for communicating with the first replacement cell RCE1 after the first change condition has been met.

According to some embodiments, the user equipment 1' is configured for performing a random access procedure towards the first replacement cell RCE1 after the first change condition has been met, wherein the user equipment 1' is configured for releasing the first cell CE of the first node NO1 after the random access procedure towards the first replacement cell RCE1 has been successfully completed.

According to some embodiments, the user equipment 1' is configured for stopping the random access procedure towards the first replacement cell RCE1 and for maintaining the connection with the first cell CE of the first node NO1 in case that a maximum number of attempts or a maximum delay for the random access procedure towards the first replacement cell RCE1 is reached.

According to some embodiments, the user equipment 1' is configured for communicating with the second replacement cell RCE2 after the second change condition has been met.

According to some embodiments, the user equipment 1' is configured for performing a random access procedure towards the second replacement cell RCE2 after the second change condition has been met, wherein the user equipment 1' is configured for releasing the first cell CE of the second node NO2 after the random access procedure towards the second replacement cell RCE2 has been successfully completed.

According to some embodiments, the user equipment 1' is configured for stopping the random access procedure towards the second replacement cell RCE2 and for maintaining the connection with the second cell CE of the second node NO2 in case that a maximum number of attempts or a maximum delay for the random access procedure towards the second replacement cell RCE2 is reached.

According to some embodiments, the user equipment 1' is configured for transmitting a first message ME1' to the first node NO1 or to the second node NO2, after the first condition has been met, wherein the first message M1' indicates that the first cell CE of the first node NO1 has been released.

According to some embodiments, the user equipment 1' is configured for transmitting a second message ME2' to the first node NO1 or to the second node NO2, after the second condition has been met, wherein the second message ME2' indicates that the first cell CE of the second node NO2 has been released.

According to some embodiments, the user equipment 1' is configured for deriving from the first request for reconfiguration REC1', whether the first replacement cell RCE1 belongs to the first node NO1 of the cellular network CN or to a third node NO3 of the cellular network CN, and/or for deriving from the second request for reconfiguration REC2', whether the second replacement cell RCE2' belongs to the second node NO2 of the cellular network CN or to a fourth node NO4 of the cellular network CN.

Further disclosed are embodiments of a method for operating a user equipment 1' for communication over a cellular network CN; the method comprising the steps:
using the user equipment 1' for simultaneously communicating with one or more cells CE of a first node NO1 of the cellular network CN and with one or more cells CE of a second node NO2 of the cellular network CN;
using the user equipment 1' for receiving a first request for reconfiguration REC1' which comprises an indication that a first cell CE of the first node NO1, which communicates with the user equipment 1', has to be replaced by a first replacement cell RCE1 of the cellular network CN, wherein the first request for reconfiguration REC1' comprises a first change condition under which the first request for reconfiguration REC1' has to be executed, and/or for receiving a second request for reconfiguration REC2' which comprises an indication that a first cell CE of the second node NO2, which communicates with the user equipment 1', has to be replaced by a second replacement cell RCE2' of the cellular network CN, wherein the second request for reconfiguration REC2' comprises a second change condition under which the second request for reconfiguration REC2' has to be executed;
using a monitoring unit 2' of the user equipment 1' for monitoring the first change condition and/or the second change condition; and
using the user equipment 1' for replacing the first cell CE of the first node NO1 by the first replacement cell RCE1, in case that the monitoring unit 2' detects that the first change condition is met, and/or for replacing the first cell CE of the second node NO2 by the second replacement cell RCE2, in case that the monitoring unit 2' detects that the second change condition is met.

Further disclosed are embodiments of a computer program for, when running on a processor, executing the method according to the disclosure.

FIG. 3 illustrates further embodiments of a user equipment 1" according to the disclosure and its interactions with a cellular network CN in a schematic view.

According to some embodiments, the cellular network CN comprises a plurality of base stations BS which are connected over a xhaul network XN of the cellular network to a core network COR of the cellular network CN;
wherein the user equipment 1" is configured for communicating with one of the base stations BS of the cellular network CN, which is used as a serving base station SBS, or for communicating with more of the base stations BS of the cellular network CN simultaneously, which respectively are used as serving base stations SBS;
wherein the user equipment 1" is configured for transmitting a list LI' of candidate base stations CBS, which are eligible for replacing at least one of the serving base stations SBS, to one of the serving base stations SBS;
wherein the user equipment 1" is configured for receiving quality information QI regarding a quality of a communication link CL' between one of the candidate base stations CBS and the core network COR for a plurality of the candidate base stations CBS from at least one of the serving base stations SBS;
wherein the user equipment 1" is configured for selecting one or more of the candidate base stations CBS for replacing one or more of the base stations BS currently used as serving base stations SBS based on the quality information QI.

The xhaul network XN may be a fronthaul network or the backhaul network. It may be wireless or wired. It also may be a different RAT technology than the access technology such as Wi-Fi, LTE, LTE-Advanced, LTE-Advanced Pro, 5G, or a direct D2D link. The xhaul network XN might also be an IAB network. Furthermore, the xhaul network can also contain proprietary wired technology, such as data transported over fiber optics using the Common Public Radio Interface (CPRI).

According to some embodiments, the user equipment 1" is configured for transmitting a quality information request QIR to the at least one of the serving base station SBS, wherein the quality information request QIR requests the at least one of the serving base stations SBS to transmit the quality information QI.

In other embodiments one of the serving base stations SBS may provide the quality information QI to the user equipment 1 via direct signaling or via broadcast or multicast.

According to some embodiments, the user equipment 1" is configured for receiving the quality information QI as a unsorted list comprising quality indicating values for the plurality of the candidate base stations CBS;
  wherein the user equipment 1" is configured for sorting the unsorted list in order to create a sorted list;
  wherein the user equipment 1" is configured for selecting the one or more of the candidate base stations CBS for replacing the one or more of the base stations BS currently used as serving base stations SBS based on the sorted list.

In some embodiments, the sorted list is an indexed list where the indexes correspond to an ordering, e.g. by a network entity, or an indexed list where the indexes correspond to the quality indicating values or a criterion dependent on the quality indicating values.

According to some embodiments, the user equipment 1" is configured for receiving the quality information QI:
  as a sorted list for the plurality of the candidate base stations CBS, or
  as an indexed list where the indexes correspond to an ordering, or
  as an indexed list where the indexes correspond to the quality indicating values;
  wherein the user equipment 1" is configured for selecting the one or more of the candidate base stations CBS for replacing the one or more of the base stations BS currently used as serving base stations SBS based on the sorted list.

In some embodiments, the user equipment 1" is configured for selecting the one or more of the candidate base stations CBS for replacing the one or more of the base stations BS currently used as serving base stations SBS based on a ranking contained in the sorted list or based on a criterion, e.g. a cost function.

According to some embodiments, the user equipment 1" is configured for transmitting a signal SI, which indicates which of the one or more of the candidate base stations CBS have been selected; to one of base stations BS currently used as serving base stations SBS and/or to one of the candidate base stations CBS which have been selected.

According to some embodiments, the user equipment 1" is configured for communication over the cellular network CN using dual or multi connectivity;
  wherein the user equipment 1" is configured for simultaneously communicating with a Master Node being one of the serving base stations SBS and with a Secondary Node being one of the serving base stations SBS;
  wherein the user equipment 1" is capable of creating the list LI' of candidate base stations CBS in such way that the candidate base stations CBS in the list LI' of candidate base stations CBS comprise a plurality of candidate base stations CBS, which are eligible for replacing the Master Node as one of the serving base stations SBS, and/or a plurality of candidate base stations CBS, which are eligible for replacing the Secondary Node as one of the serving base stations SBS.

According to some embodiments, the user equipment 1" is configured for receiving the quality information QI regarding the quality of the communication link CL' between one of the candidate base stations CBS and the core network CN for a plurality of the candidate base stations CBS, which are eligible for replacing the Master Node as one of the serving base stations SBS from at least one of the serving base stations SBS; and/or
  wherein the user equipment 1" is configured for receiving the quality information regarding the quality of the communication link CL' between one of the candidate base stations CBS and the core network CN for a plurality of the candidate base stations CBS, which are eligible for replacing the Secondary Node as one of the serving base stations SBS from at least one of the serving base stations SBS.

According to some embodiments, the user equipment 1" is configured for selecting one or more of the candidate base stations CBS for replacing the Master Node currently used as one of the serving base stations CBS; and/or
  wherein the user equipment 1" is configured for selecting one or more of the candidate base stations CBS for replacing the Secondary Node currently used as one of the serving base stations SBS.

Further disclosed are embodiments of a method for operating a user equipment 1" for communication over a cellular network CN, wherein the cellular network CN comprises a plurality of base stations BS which are connected over a xhaul network XN of the cellular network CN to a core network COR of the cellular network CN; the method comprising the steps:
  using the user equipment 1" for communicating with one of the base stations BS of the cellular network CN, which is used as a serving base station SBS, or for communicating with more of the base stations BS of the cellular network CN simultaneously, which respectively are used as serving base stations SBS;
  using the user equipment 1" for transmitting a list LI' of candidate base stations CBS, which are eligible for replacing at least one of the serving base stations SBS, to one of the serving base stations SBS;
  using the user equipment 1" for receiving quality information QI regarding a quality of a communication link CL' between one of the candidate base stations CBS and the core network COR for a plurality of the candidate base stations CBS from at least one of the serving base stations SBS;
  using the user equipment 1" for selecting one or more of the candidate base stations CBS for replacing one or more of the base stations BS currently used as serving base stations SBS based on the quality information QI.

Further disclosed are embodiments of a computer program for, when running on a processor, executing the method according to the disclosure.

The aim of the following description is to present the ideas of the disclosure related to Multi-Radio Dual Connectivity (MR-DC) in 5G. The proposed enhancements in some cases also include the aspects related to the (wireless or wired) backhaul network, which now features nodes with integrated access and backhaul (IAB) functionality. IAB nodes may use a special IAB routing protocol for communicating between the different IAB nodes.

Figure 4:
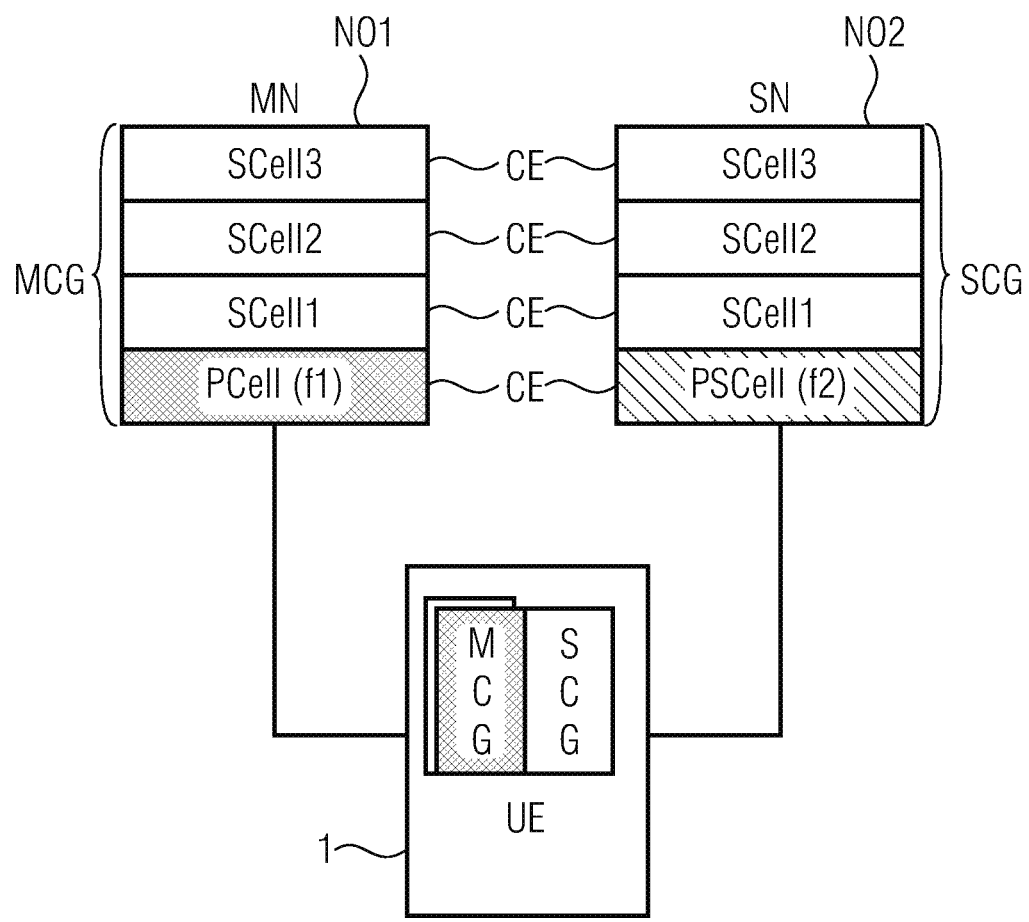
FIG. 4 illustrates a dual connected user equipment.

FIG. 4 illustrates a dual connected user equipment 1. MR-DC is a feature that enables multiple Rx/Tx capable UE to be configured to utilise resources provided by two different nodes connected via non-ideal backhaul, one providing NR access and the other one providing either E-UTRA or NR access. One node acts as the MN and the other as the SN. The MN and SN are connected via a network interface and at least the MN is connected to the core network (TS37.340).

As part of MR-DC configuration, each User equipment (UE) is configured with two separate scheduled cell groups namely:

Master Cell Group (MCG)

Secondary Cell Group (SCG).

Master Cell Group (MCG) belongs to the Master Node (MN) and Secondary Cell Group (MSG) belongs to the Secondary Node (SN). Based on the MR-DC architecture, MCG and SCG could either be LTE cells or NR cells or cells using any other RAT, e.g. WiFi or technology of future cellular standards beyond 5G (B5G). The network configures the UE with MCG, and zero or one SCG.

There are two important cells when a UE is dual-connected to MN and SN. One is PCell (Primary Cell), and the other one is PSCell (Primary Secondary Cell). PCell is a SpCell (Special Cell) of MCG and PSCell is a SpCell for SCG, where SpCell is a primary cell of a master or secondary cell group. Other cells within MCG or SCG are Secondary Cells (SCell).

SCells are applicable either per MCG or SCG, and they are in Carrier Aggregation (CA) configuration with PCell, that is PSCell.

Below is some of the applicable terminology used in the document, defined in the relevant specifications:

LTE Specification (TS 36.331—f60):

Primary Cell (PCell): The cell, operating on the primary frequency, in which the UE either performs the initial connection establishment procedure or initiates the connection re-establishment procedure, or the cell indicated as the primary cell in the handover procedure.

Primary Secondary Cell (PSCell): The SCG cell in which the UE is instructed to perform random access or initial PUSCH transmission if random access procedure is skipped when performing the SCG change procedure.

Secondary Cell (SCell): A cell, operating on a secondary frequency, which may be configured once an RRC connection is established and which may be used to provide additional radio resources. Except for the case of (NG)EN-DC, the PSCell is considered to be an SCell.

NR Specification (TS 38.331—f60):

Primary Cell: The MCG cell, operating on the primary frequency, in which the UE either performs the initial connection establishment procedure or initiates the connection re-establishment procedure.

Primary SCG Cell: For dual connectivity operation, the SCG cell in which the UE performs random access when performing the Reconfiguration with Sync procedure.

Secondary Cell: For a UE configured with CA, a cell providing additional radio resources on top of Special Cell (SC).

Special Cell (SC): For Dual Connectivity (DC) operation the term Special Cell refers to the PCell of the MCG or the PSCell of the SCG, otherwise the term Special Cell refers to the PCell.

Combinations of LTE & NR, and corresponding abbreviations (TS37.340):

En-gNB: node providing NR user plane and control plane protocol terminations towards the UE, and acting as Secondary Node in EN-DC.

ng-eNB—eNodeB that can connect to the 5G Core:

MR-DC with LTE core:

E-UTRA-NR Dual Connectivity (EN-DC).

E-UTRA-NR Dual Connectivity (EN-DC) is with LTE core. A UE is connected to one eNB that acts as a MN and one en-gNB that acts as a SN. The eNB is connected to the EPC via the S1 interface and to the en-gNB via the X2 interface. The en-gNB might also be connected to the EPC via the S1-U interface and other en-gNBs via the X2-U interface.

MR-DC with 5G Core.

E-UTRA-NR Dual Connectivity (NGEN-DC)

NG-RAN E-UTRA-NR Dual Connectivity (NGEN-DC) with 5G Core: A UE is connected to one ng-eNB that acts as a MN and one gNB that acts as a SN. The ng-eNB is connected to the 5GC and the gNB is connected to the ng-eNB via the Xn interface.

NR-E-UTRA Dual Connectivity (NE-DC)

NG-RAN supports NR-E-UTRA Dual Connectivity (NE-DC), in which a UE is connected to one gNB that acts as a MN and one ng-eNB that acts as a SN. The gNB is connected to 5GC and the ng-eNB is connected to the gNB via the Xn interface.

NR-NR Dual Connectivity (NR-DC)

NG-RAN supports NR-NR Dual Connectivity (NR-DC), in which a UE is connected to one gNB that acts as a MN and another gNB that acts as a SN. The master gNB is connected to the 5GC via the NG interface and to the secondary gNB via the Xn interface. The secondary gNB might also be connected to the 5GC via the NG-U interface. In addition, NR-DC can also be used when a UE is connected to two gNBDUs, one serving the MCG and the other serving the SCG, connected to the same gNB-CU, acting both as a MN and as a SN.

In EN-DC, the MCG is configured as specified in TS 36.331. The network provides the configuration parameters for a cell group in the CellGroupConfig IE (TS 38.331 f60), Sec. 5.3.5.5, see 0 of this document.

Figure 5:
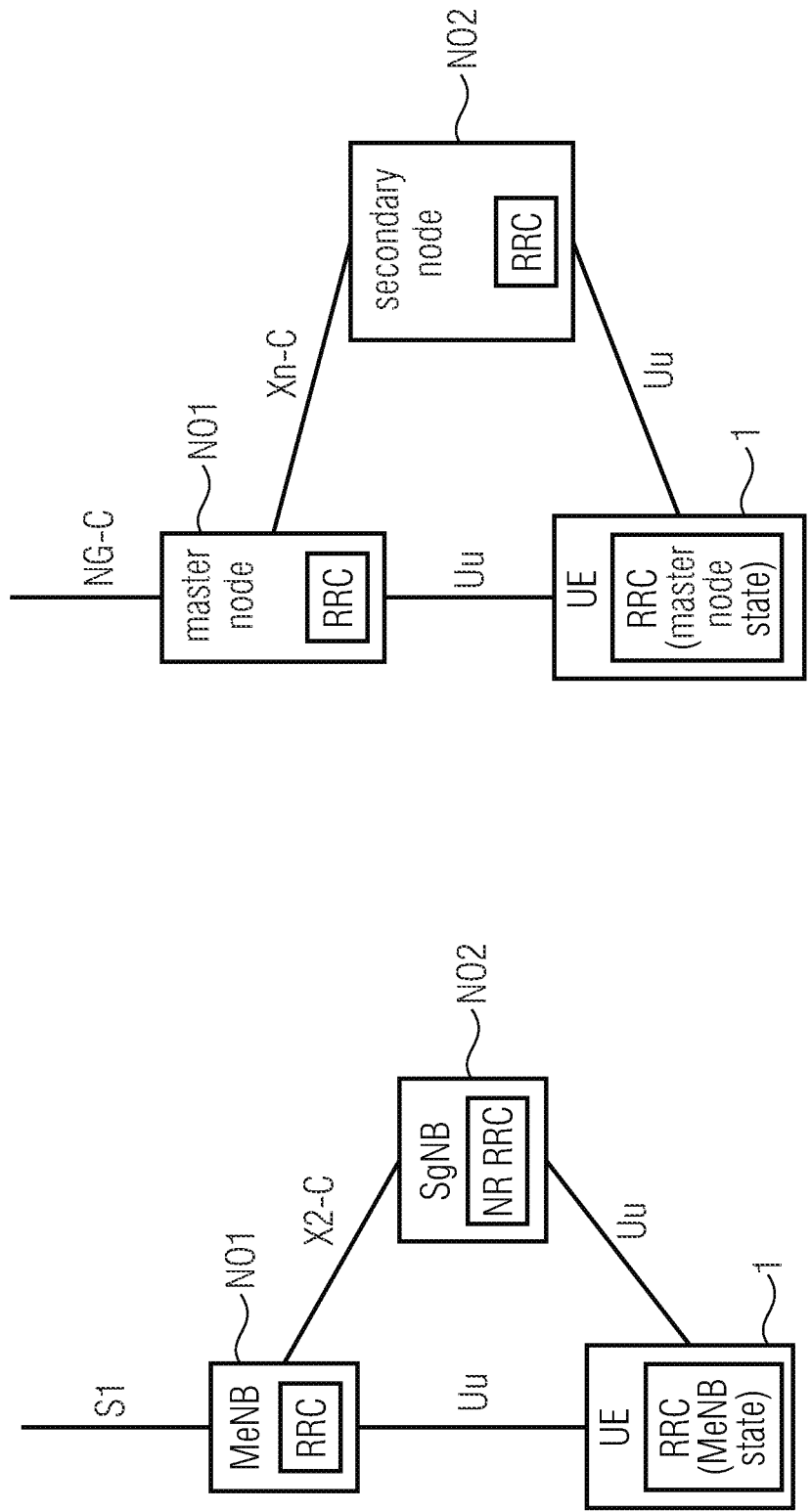
FIG. 5 illustrates the control plane architecture for EN-DC (left) and MR-DC with 5GC (right)—(TS37.340)

FIG. 5 illustrates the control plane architecture for EN-DC (left) and MR-DC with 5GC (right)—(TS37.340.). In MR-DC, the UE has a single RRC state, based on the MN RRC and a single C-plane connection towards the Core Network. Each radio node has its own RRC entity, which can generate RRC PDUs to be sent to the UE. RRC PDUs generated by the SN can be transported via the MN to the UE. The MN sends the initial SN RRC configuration via MCG Signaling Radio Bearer 1 (SRB1), but subsequent reconfigurations may be transported via MN or SN. When transporting RRC PDU from the SN, the MN does not modify the UE configuration provided by the SN. (TS37.340).

Hence, control plane is handled using SRBs. SRBs are used for the transmission of RRC and Non-Access Stratum (NAS) messages. More specifically, the following SRBs are defined:

SRB0 is for RRC messages using the CCCH logical channel;

SRB1 is for RRC messages (which may include a piggybacked NAS message) as well as for NAS messages prior to the establishment of SRB2, all using DCCH logical channel;

SRB2 is for NAS messages, all using DCCH logical channel. SRB2 has a lower priority than SRB1 and may be configured by the network after AS security activation;

SRB3 is for specific RRC messages when UE is in (NG)EN-DC or NR-DC, all using DCCH logical channel.

In downlink, piggybacking of NAS messages is used only for one dependent (i.e. with joint success/failure) procedure: bearer establishment/modification/release. In uplink piggybacking of NAS message is used only for transferring the initial NAS message during connection setup and connection resume.

NOTE 1: The NAS messages transferred via SRB2 are also contained in RRC messages, which however do not include any RRC protocol control information. Once AS security is activated, all RRC messages on SRB1, SRB2 and SRB3, including those containing NAS messages, are integrity protected and ciphered by PDCP. NAS independently applies integrity protection and ciphering to the NAS messages, see TS 24.501.

Split SRB is supported for all the MR-DC options in both SRB1 and SRB2 (split SRB is not supported for SRB0 and SRB3).

Once AS security is activated, all RRC messages on SRB1, SRB2 and SRB3, including those containing NAS messages, are integrity protected and ciphered by PDCP. NAS independently applies integrity protection and ciphering to the NAS messages, see TS 24.501 [23].

Split SRB is supported for all the MR-DC options in both SRB1 and SRB2 (split SRB is not supported for SRB0 and SRB3).

Figure 6:
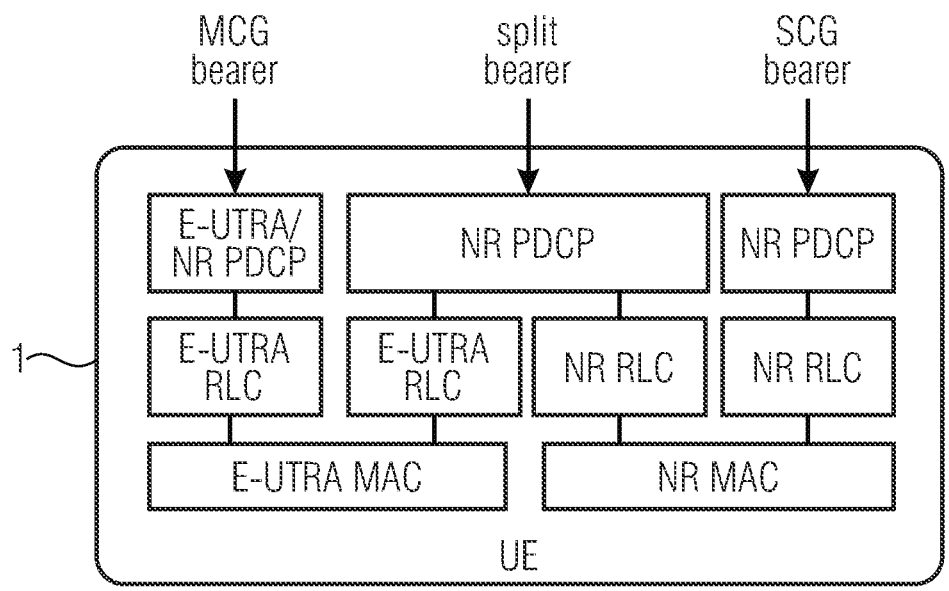
FIG. 6 illustrates Radio Protocol Architecture for MCG, SCG and split bearers from a UE perspective in MR-DC with EPC (EN-DC) (TS37.340)

FIG. 6 illustrates Radio Protocol Architecture for MCG, SCG and split bearers from a UE perspective in MR-DC with EPC (EN-DC) (TS37.340.).

Figure 7:
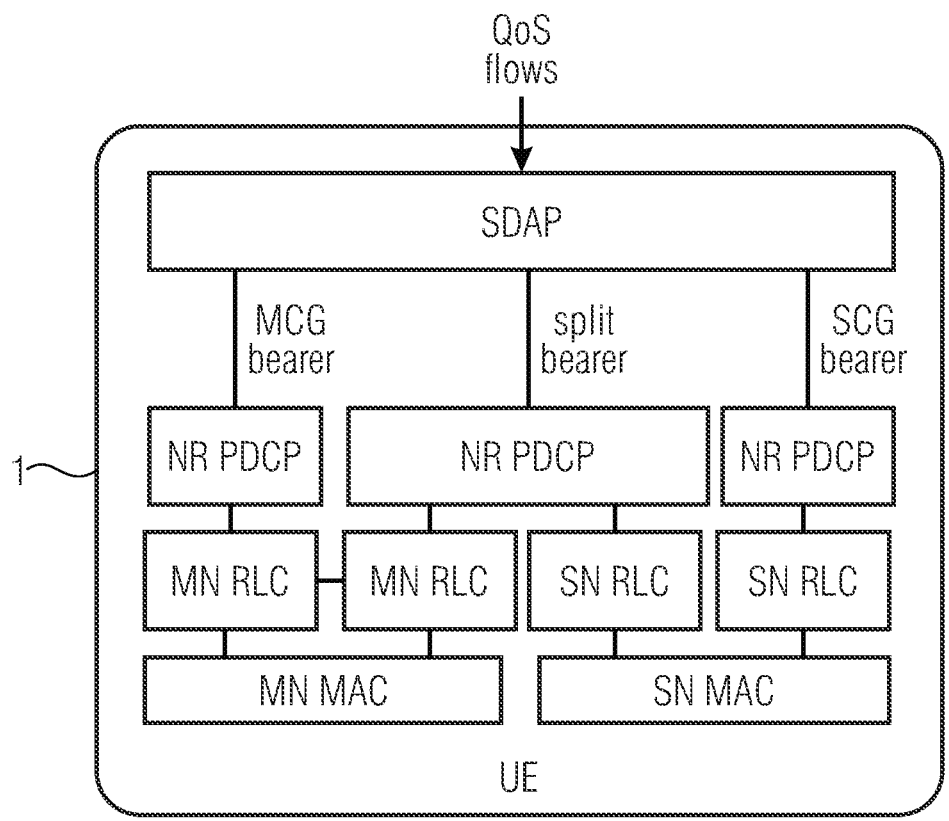
FIG. 7 illustrates MCG, SCG and split bearers from a user equipment perspective in MR-DC with 5GC (NGEN-DC, NE-DC and NR-DC)

FIG. 7 illustrates MCG, SCG and split bearers from a user equipment perspective in MR-DC with 5GC (NGEN-DC, NE-DC and NR-DC).

Two different user-plane options can enable multi-connectivity:
1. Split bearer—In the split bearer option, the second bearer is provided by the two nodes. The Secondary Node does not implement PDCP, but the RLC layer and below.
2. Separate bearer—In the separate bearer option, each bearer terminates in the different node. The bearers are separated in the S-GW/User Plane Function (UPF) and Access and Mobility Management Function (AMF), and each node implements the protocol stack from PDCP below.

Figure 8:
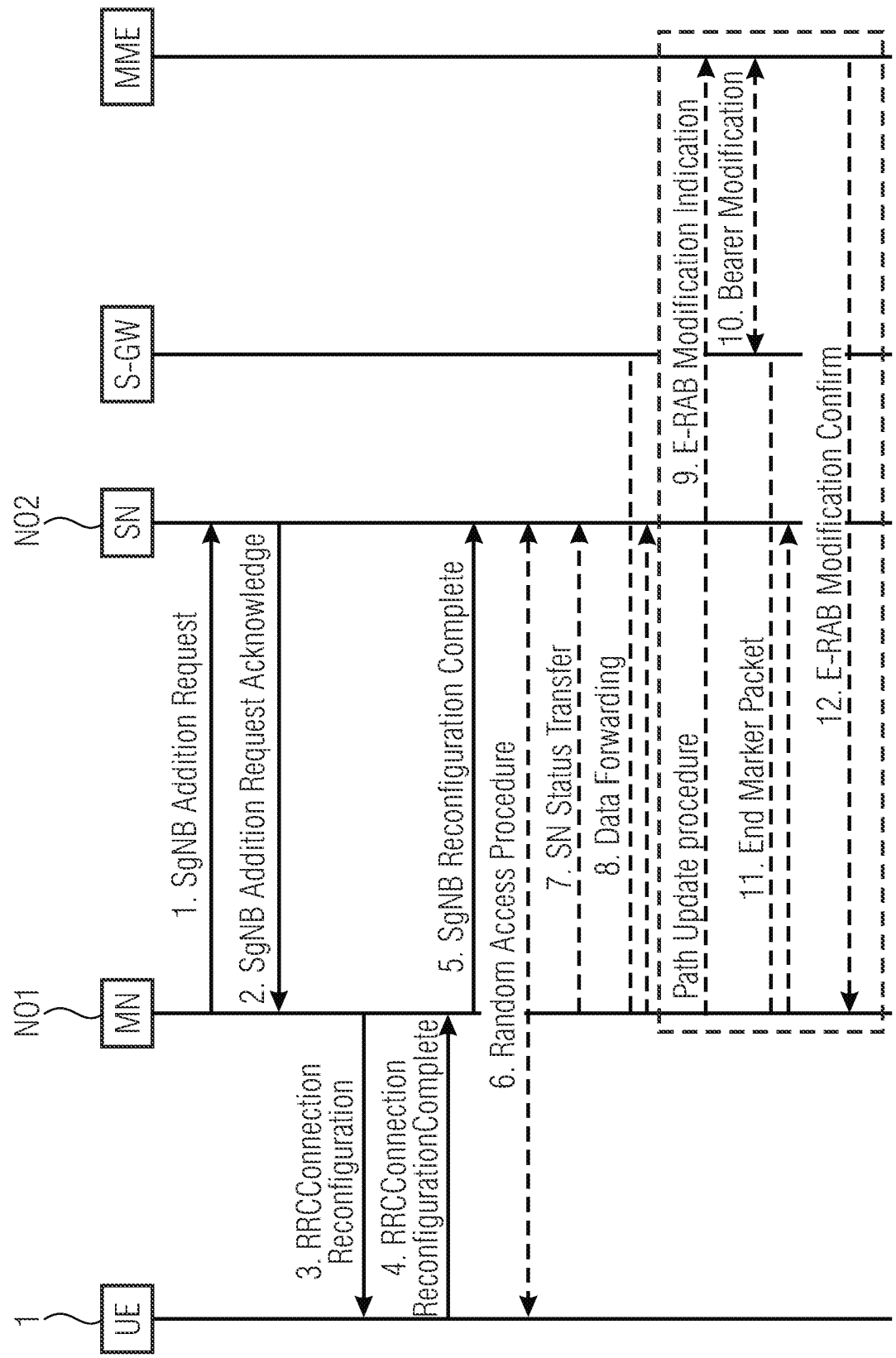
FIG. 8 illustrates SN Addition in EN-DC (TS37.340.)

FIG. 8 illustrates SN Addition in EN-DC (TS37.340.). One of the most important procedures for MR-DC procedure is the secondary node (SN) addition. The SN addition is done according to (TS37.340), Section 10.2. Some of the most relevant aspects of the procedure are shown below (At the end of the document are the information elements applicable to the below-specified signaling procedures).

SgNB Addition Request: The MN decides to add the SN. The MN sends a Secondary Node Addition Request to the SN. The message carries the RRC and Radio Bearer configuration. UE capabilities and security information are also included in the message.

SgNB Addition Request Acknowledge: The SN responds with information about the radio resources and admitted bearers. The NR RRC configuration message is included in the message.

Figure 9:
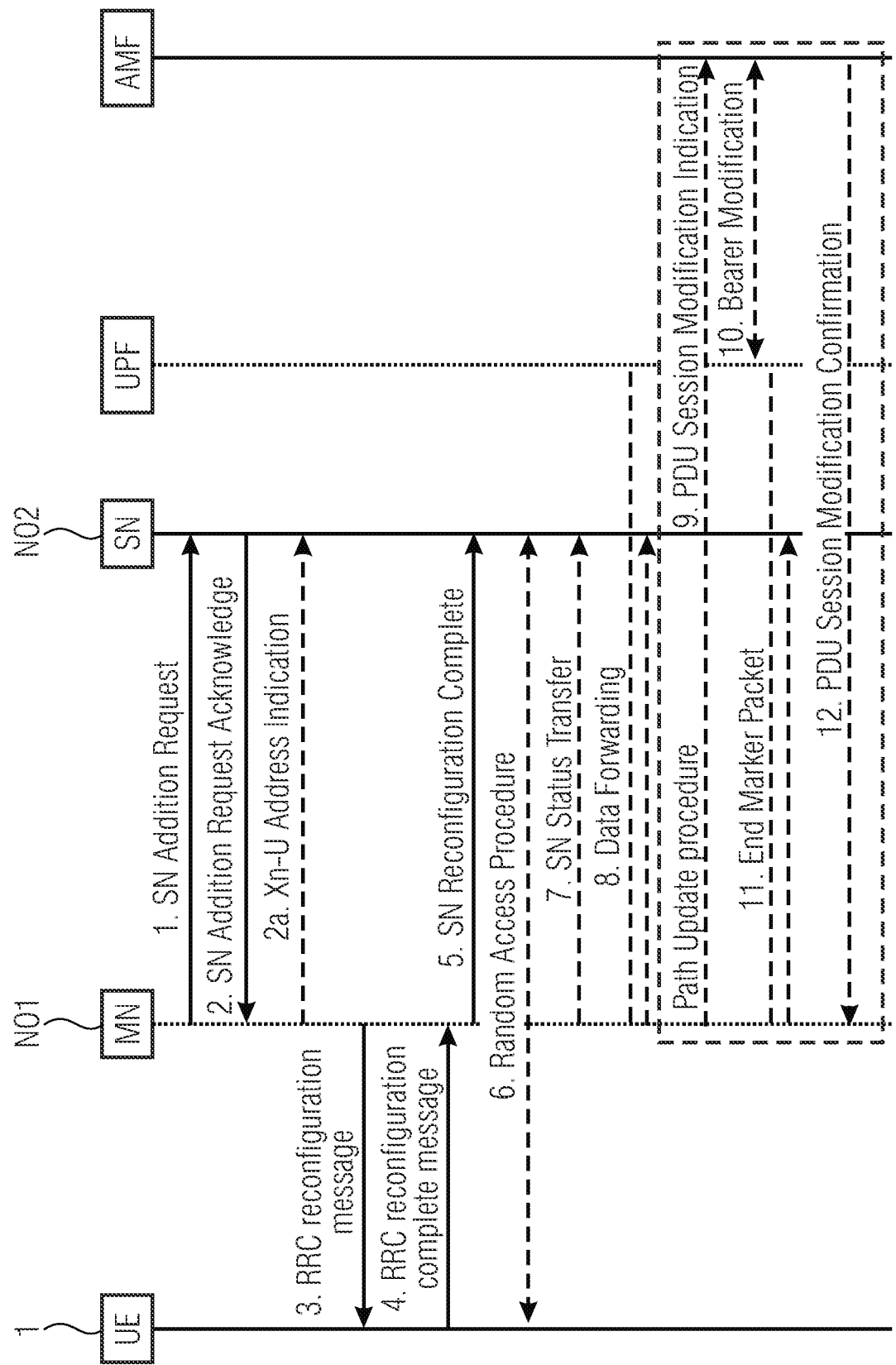
FIG. 9 illustrates SN Addition with 5GC (TS37.340.)

FIG. 9 illustrates SN Addition with 5GC (TS37.340.).

Figure 10:
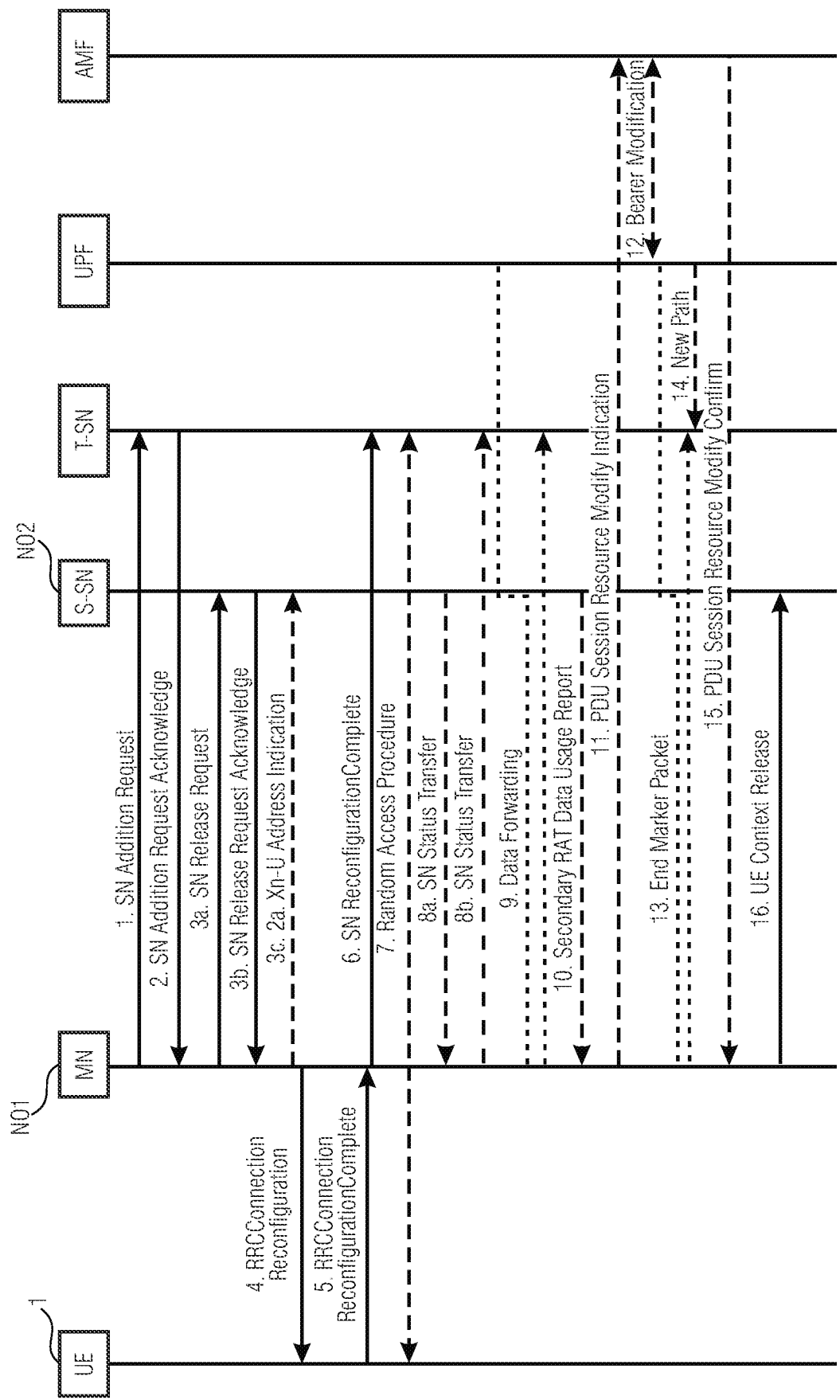
FIG. 10 illustrates SN Change—MN initiated in MRDC with 5GC, according to (TS37.340.), Figure 10.5.2-1.

FIG. 10 illustrates SN Change—MN initiated in MRDC with 5GC, according to (TS37.340.), Figure 10.5.2-1. The SN change procedure is initiated either by MN or SN and transfers a UE context from a source SN to a target SN and changes the SCG configuration in the UE from one SN to another (TS37.340). FIG. 10 and Error! Reference source not found. 11 depict the MN- and SN-initiated node change for MR-DC with 5GC. The cases with EN-DC are depicted in FIG. 4 and FIG. 5.

Figure 11:
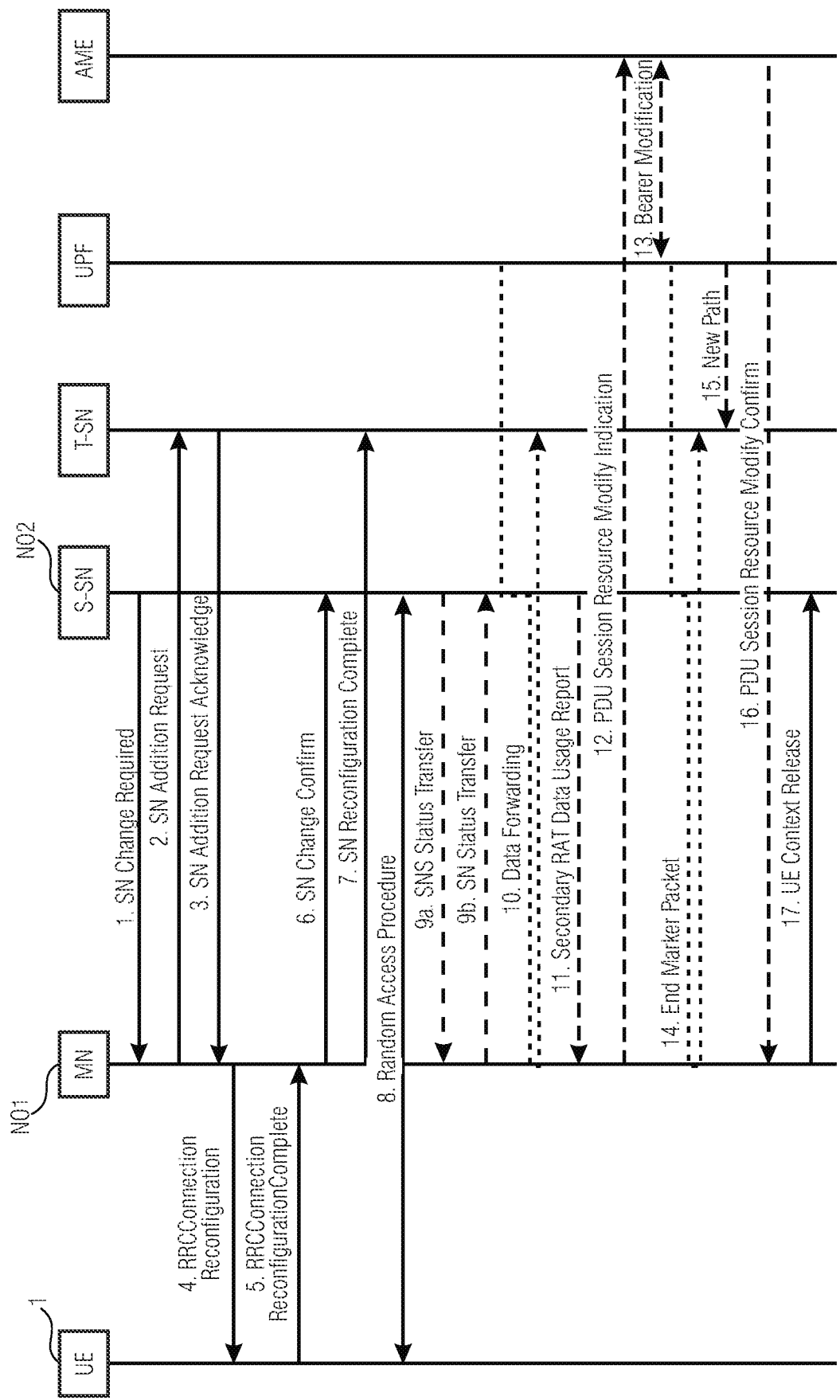
FIG. 11 illustrates SN Change in MRDC with 5GC—SN initiated, according to (TS37.340.), Figure 10.5.12-2.

FIG. 11 illustrates SN Change in MRDC with 5GC—SN initiated, according to (TS37.340.), Figure 10.5.12-2.

Figure 12:
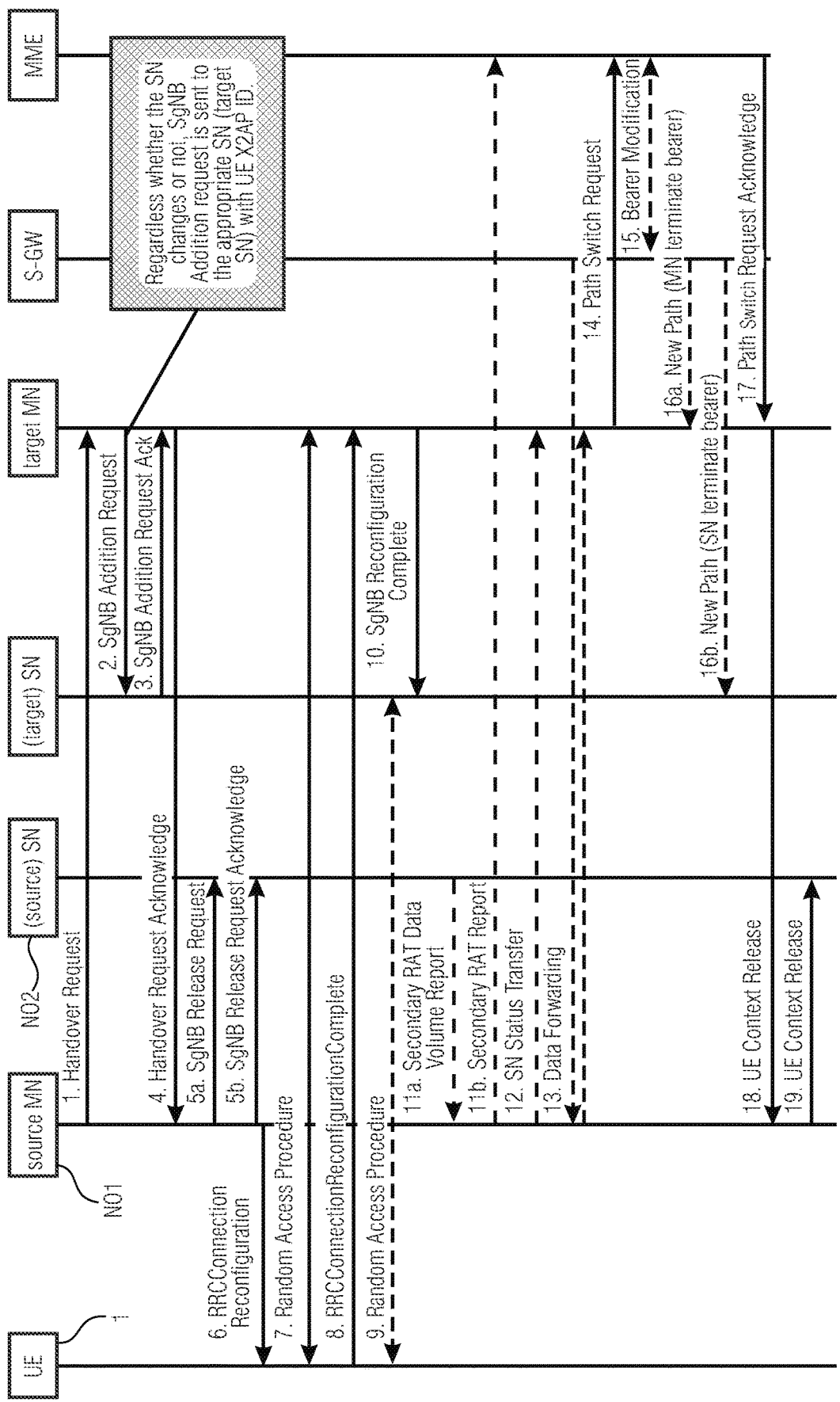
FIG. 12 illustrates MN Handover in EN-DC with SgNb change according to (TS37.340.)

FIG. 12 illustrates MN Handover in EN-DC with SgNb change according to (TS37.340.). Inter-Master Node handover with/without Secondary Node change: FIG. 12 depicts the MN handover with/without Secondary node change in the case of EN-DC. The specification (TS37.340) also includes the case for 5GC—refer to Figure 10.7.2-1 in (TS37.340).

RRC-related aspects (measurements):

Measurements:
Measurements can be configured independently by the MN and by the SN (intra-RAT measurements on serving and non-serving frequencies). The MN indicates the maximum number of frequency layers and measurement identities that can be used in the SN to ensure that UE capabilities are not exceeded.

The Secondary Node Change procedure can be triggered by both the MN (only for inter-frequency secondary node change) and the SN. For secondary node changes triggered by the SN, the RRM measurement configuration is maintained by the SN which also processes the measurement reporting, without providing the measurement results to the MN.

When SRB3 is not configured, reports for measurements configured by the SN are sent on SRB1. When SRB3 is configured, reports for measurements configured by the SN are sent on SRB3.

Measurement results related to the target SN can be provided by MN to target SN at MN that initiated SN change procedure. Measurement results of target SN can be forwarded from source SN to target SN via MN at SN that initiated SN change procedure. Measurement results related to the target SN can be provided by the source MN to target MN at Inter-MN handover with/without SN change procedure (see below).

A more detailed look at what goes into Configuration of (Secondary) Cell Group: The major functionality of RRC Reconfiguration is to configure Radio Bearers, Measurement and Scells or Cell Groups. The information elements for the CGConfig are given in TS 36.331—f60 and TS 38.331—f60.

SCG failure handling: RLF is declared separately for the MCG and for the SCG. If radio link failure is detected for MCG, the UE initiates the RRC connection re-establishment procedure (TS37.340). Note that RAN 2 has included new procedure—Fast MCG recovery in Release 16 (3GPP RAN2, 2019) to address delay associated with the RRC connection reestablishment procedure.

Please note that MCG failure will not be further discussed in this document. Instead, the SCG failure is described.

The following SCG failure cases are supported:
SCG RLF;
SN change failure;
For EN-DC, NGEN-DC and NR-DC, SCG configuration failure (only for messages on SRB3);
For EN-DC, NGEN-DC and NR-DC, SCG RRC integrity check failure (on SRB3).

Upon SCG failure, the UE suspends SCG transmissions for all radio bearers and reports the SCG Failure Information to the MN, instead of triggering re-establishment.

In all SCG failure cases, the UE maintains the current measurement configurations from both the MN and the SN and the UE continues measurements based on configuration from the MN and the SN if possible. The SN measurements configured to be routed via the MN will continue to be reported after the SCG failure.

NOTE: UE may not continue measurements based on configuration from the SN after SCG failure in certain cases (e.g. UE cannot maintain the timing of PSCell).

The UE includes in the SCG Failure Information message the measurement results available according to current measurement configuration of both the MN and the SN. The MN handles the SCG Failure Information message and may decide to keep, change, or release the SN/SCG. In all the cases, the measurement results according to the SN configuration and the SCG failure type may be forwarded to the old SN and/or to the new SN.

A more detailed look at the SCG Failure: Definition of the failure: The failure in the specifications is referred to as SCG failure in both—LTE and NR.

As stated earlier, SCG is a cell group configured in the UE that belongs to the SN. Within the SCG, there is Primary Secondary Cell (PSCell). In LTE, this is the cell in which the UE is instructed to perform random access or initial PUSCH transmission if random access procedure is skipped when performing the SCG change procedure (TS 36.331—f60). In NR, the PSCell is the cell in which the UE performs random access when performing the Reconfiguration with Sync procedure. (TS 38.331—f60).

LTE Specifications:
  The SCG failure is reported by the UE in the following cases (TS 36.331—f60):
    upon detecting radio link failure for the SCG,
    upon SCG change failure (due to mobility for SCG),
    upon stopping uplink transmission towards the PSCell due to exceeding the maximum uplink transmission timing difference when powerControlMode is configured to 1, according to TS 36.133.
Action in Case of Failure:
  Upon Initiating the Procedure, the UE:
  suspends all SCG DRBs and suspends SCG transmission for split DRBs,
  resets SCG-MAC,
  stops T307 timer,
    T307 timer is started on the Reception of RRCConnectionReconfiguration message including MobilityControlInfoSCG. It is stopped on successful completion of random access on the PSCell, upon initiating re-establishment and upon SCG release.
  initiates transmission of the SCGFailureInformation message.
Nr Specifications:
  The purpose of this procedure is to inform LTE or NR MN about an SCG failure the UE has experienced. The SCG failure is reported by the UE in the following cases (TS 38.331—f60):
    upon detecting radio link failure for the SCG (subclause 5.3.10.3),
    upon reconfiguration with sync failure of the SCG (subclause 5.3.5.8.3),
    upon SCG configuration failure i.e. inability to comply with reconfiguration request (subclause 5.3.5.8.2),
    upon integrity check failure indication from SCG lower layers concerning SRB3.
Action in Case of Failure:
  Upon Initiating the Procedure, the UE:
  suspends SCG transmission for all SRBs and DRBs,
  resets SCG MAC,
  stops T304 timer, if running
    Timer T304 is started upon reception of RRCReconfiguration message including reconfigurationWithSync. It is stopped upon successful completion of random access on the corresponding SpCell. For T304 of SCG, the timer is stopped upon SCG release.
  if the UE is in EN-DC:
    initiates transmission of the SCGFailureInformationNR message as specified in TS 36.331 clause 5.6.13a.

Following on from all of the above, and current specifications—TS 36.331—f60 and TS 38.331—f60, only PCell on MN and SpCell on SN will have an RLF reported.

Figures 13A, 13B:
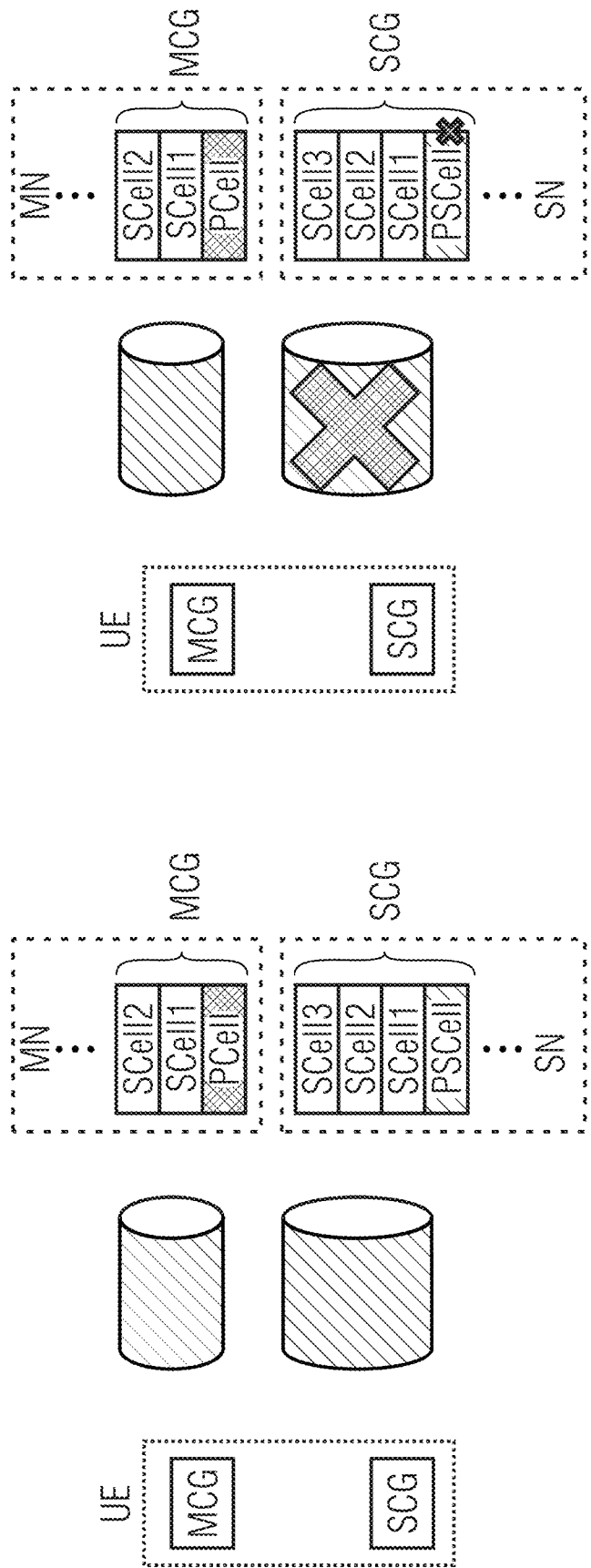
FIGS. 13A and 13B illustrates a PSCell failure.

FIGS. 13A and 13B illustrates a PSCell failure. The aim of this invention is to improve robustness and to provide seamless experience for a UE that is in Multi-Radio Dual Connectivity (MR-DC)-mode. As stated above, MR-DC implies a system in dual connectivity between E-UTRA and NR nodes, or between two NR nodes. The invention addresses the case where PSCell link of the secondary node (SN) experiences degrading quality, which may lead to a PSCell failure.

The robustness of the MR-DC feature depends on the stability of links on PCell and PSCell. Namely, as explained in Section 0, the SCG Failure occurs, among other cases, when there is a radio link failure (RLF) on the special cell (SpCell) on the SN (PSCell). In that case, the SCG data radio bearers are released, MAC is reset and the appropriate timers are stopped. Considering that likely deployments of MR-DC is in heterogeneous deployments, with SNs using small cells and/or cmWave/mmWave spectrum (e.g. FR2 in 5G,), the PSCell radio link may particularly be subject to fluctuations and failures, making the multi-connectivity feature unstable. Particularly, the operation in mmWave frequency bands, at 28 GHz, but which also go beyond 52 GHz, e.g. 60 GHz, as specified by 3GPP, introduce significant increase in pathloss and worsening signal penetration, which will especially influence the stability and the quality of the links.

FIGS. 13A and 13B illustrates the potential impact of a radio link failure on PSCell. The PSCell failure may result in UE experiencing large fluctuations in QoS as, in this case, the greater pipe becomes unavailable.

When an SCG failure occurs due to a radio link failure (RLF) on a PSCell, the network, specifically the MN, handles the SCG Failure Information message (scgFailureInformation/scgFailureInformationEUTRA). This message is sent from UE to MN—EUTRA or NR (TS 38.331—f60), FIG. 5.7.3.1.1. The standard currently does not specify the action taken by the MN after it has received the SCG RLF notification. According to (TS37.340), the MN may decide to:
  keep SN/SCG, or
  change SN/SCG, or
  release SN/SCG.

As SCG data radio bearers are released, even if the MN decides to keep SN/SCG and re-establish radio bearers, or change SN/SCG, there may be an interruption for the UE services as the data rate gap can be large due to unavailability of all SCG cells.

Figure 14A:
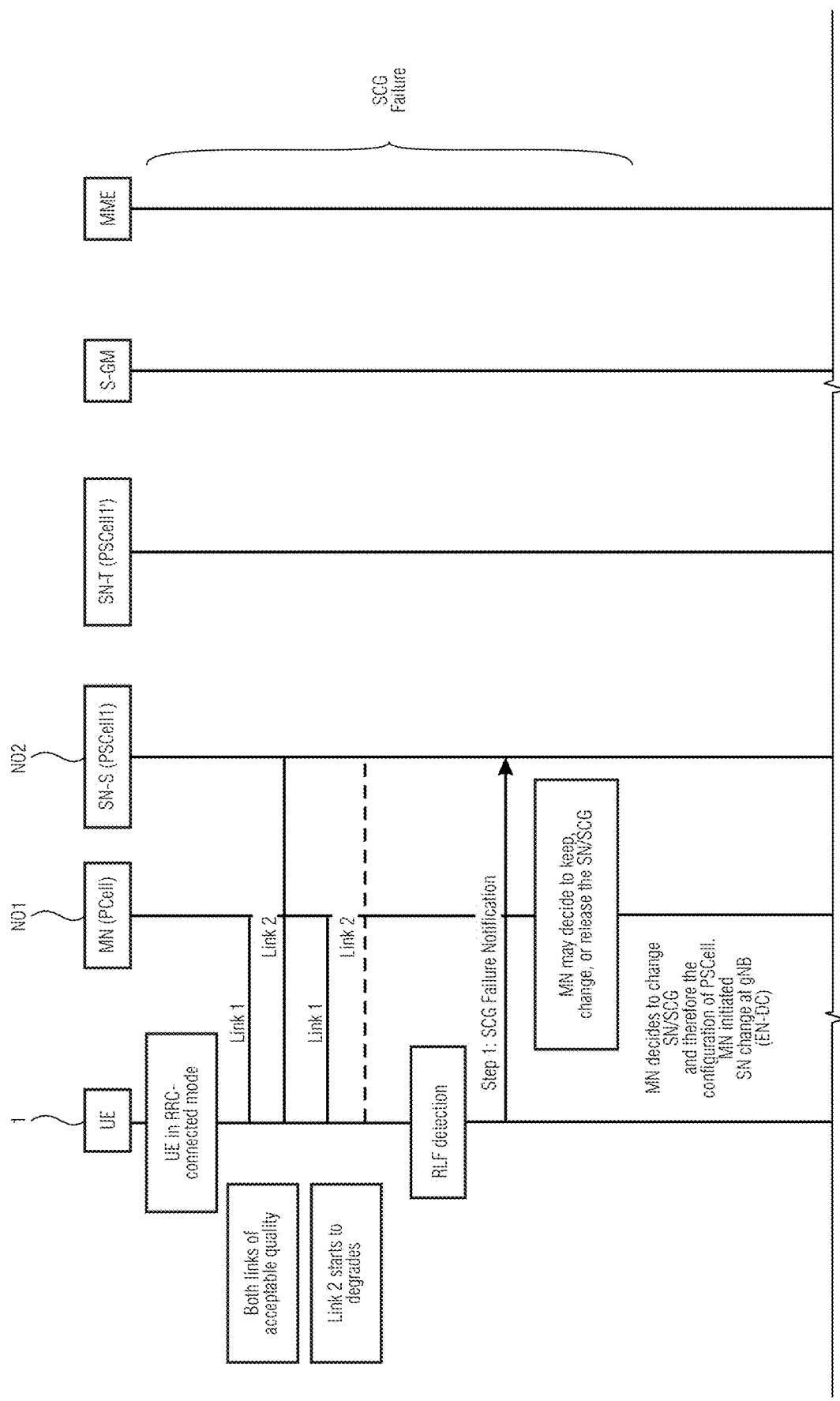
FIGS. 14A and 14B illustrates an SN change after RLF on SCG.
Figure 14B:
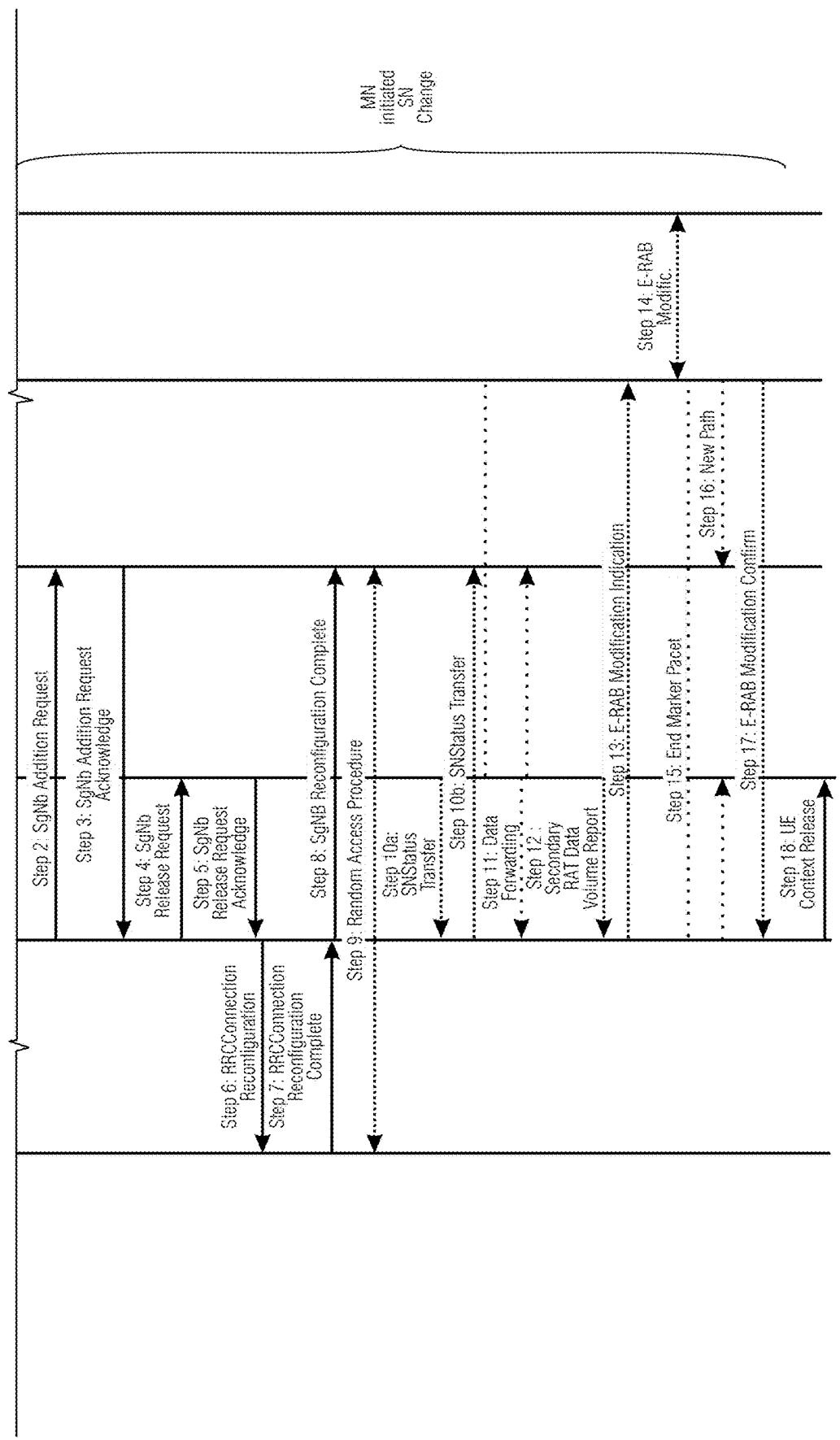
Figure 15A:
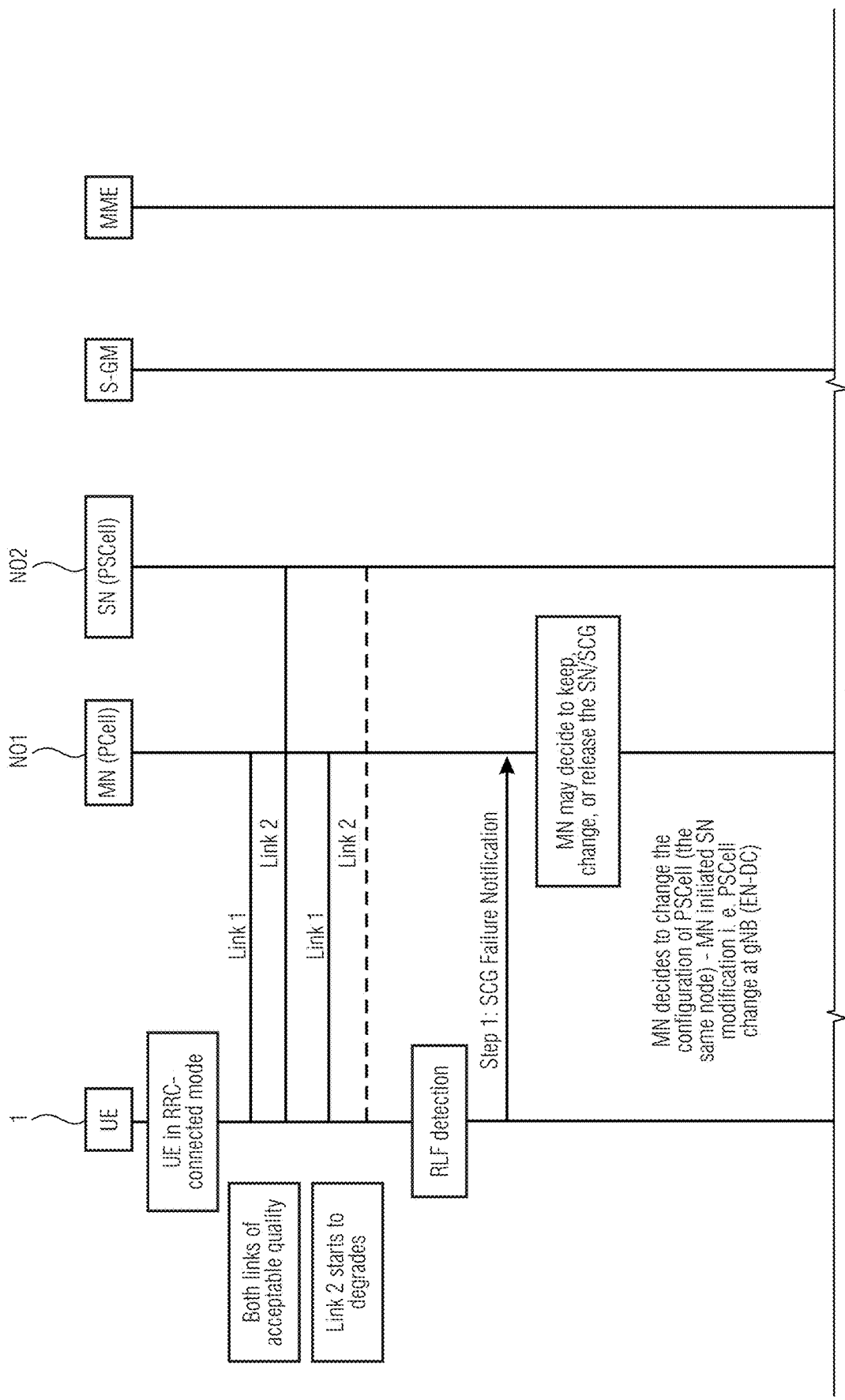
FIGS. 15A and 15B illustrates an SgNb modification after RLF on SCG.
Figure 15B:
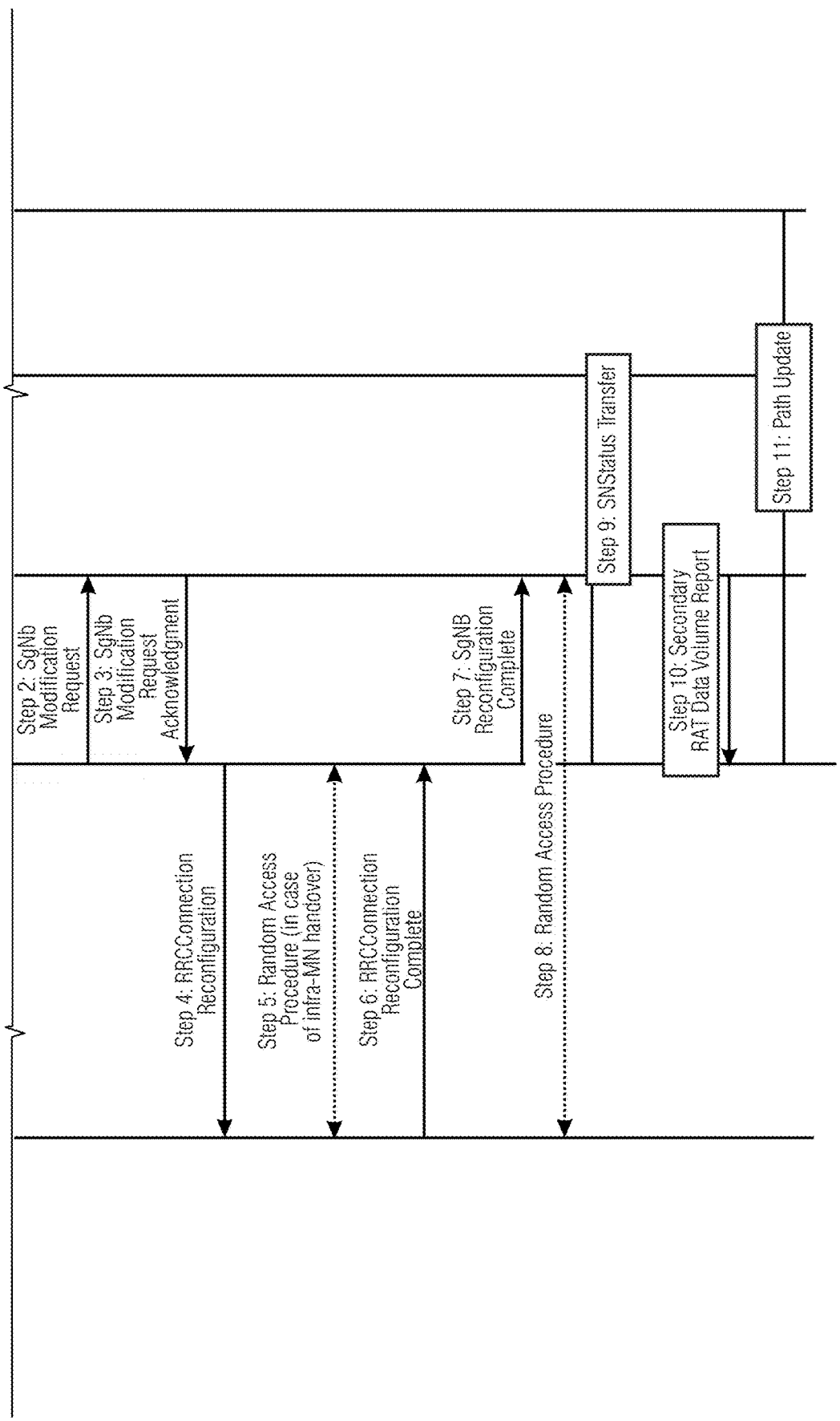

FIGS. 14A, 14B, 15A and 15B depict the cases of SN change, that is the SCG modification by MN. FIGS. 14A and 14B illustrates an SN change after RLF on SCG. FIGS. 15A and 15B illustrates an SgNb modification after RLF on SCG.

Figure 16:
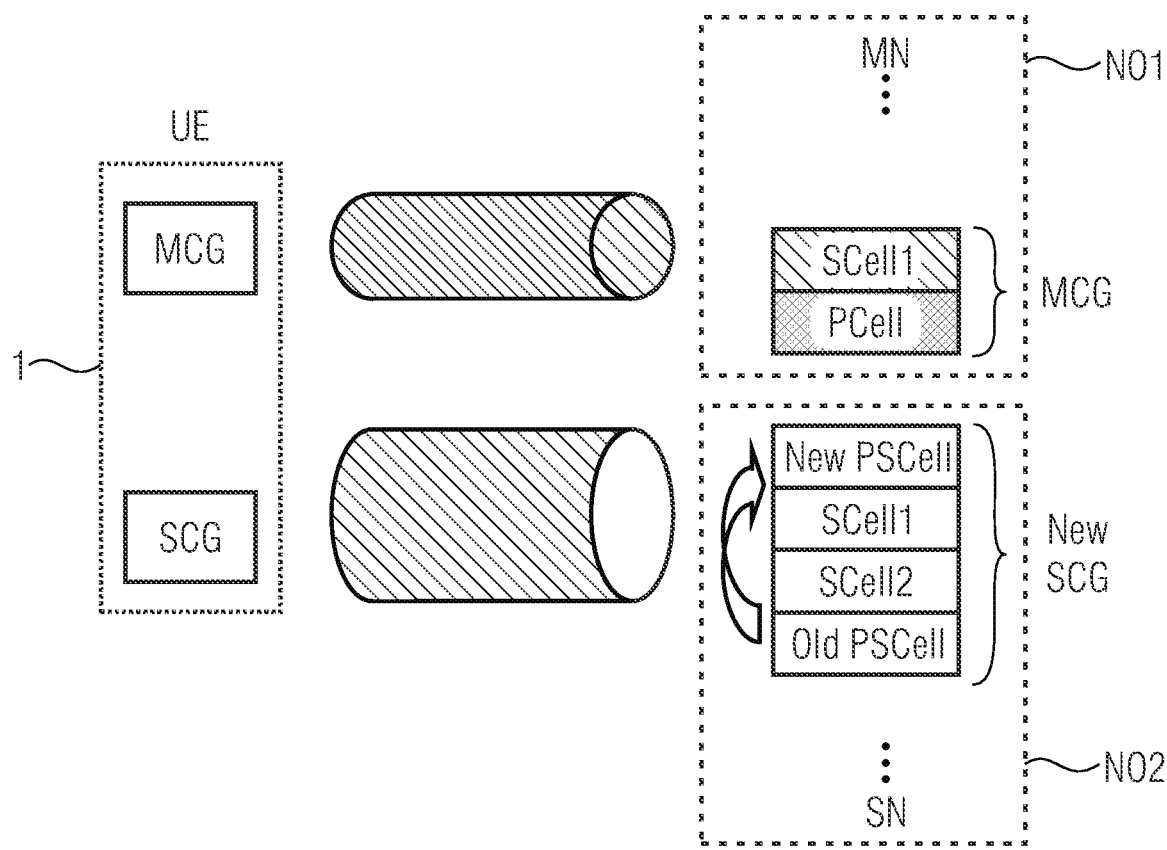
FIG. 16 illustrates an Intra-SN PSCell/SCG change.

FIG. 16 illustrates an Intra-SN PSCell/SCG change. The proposed enhancement is targeted to improve the robustness of the MR-DC feature and provide UE in MRDC-mode with a seamless experience by enabling a pre-emptive action as the link on PSCell degrades.

The cases of inter- and intra-SN change are described separately.

Intra-SN PSCell/SCG change is depicted by FIG. 16. New SCG can also include previous and/or new SCells. The condition in relation to a degrading quality of PSCell triggers the decision to change PSCell/SCG within the same SN.

Figure 17:
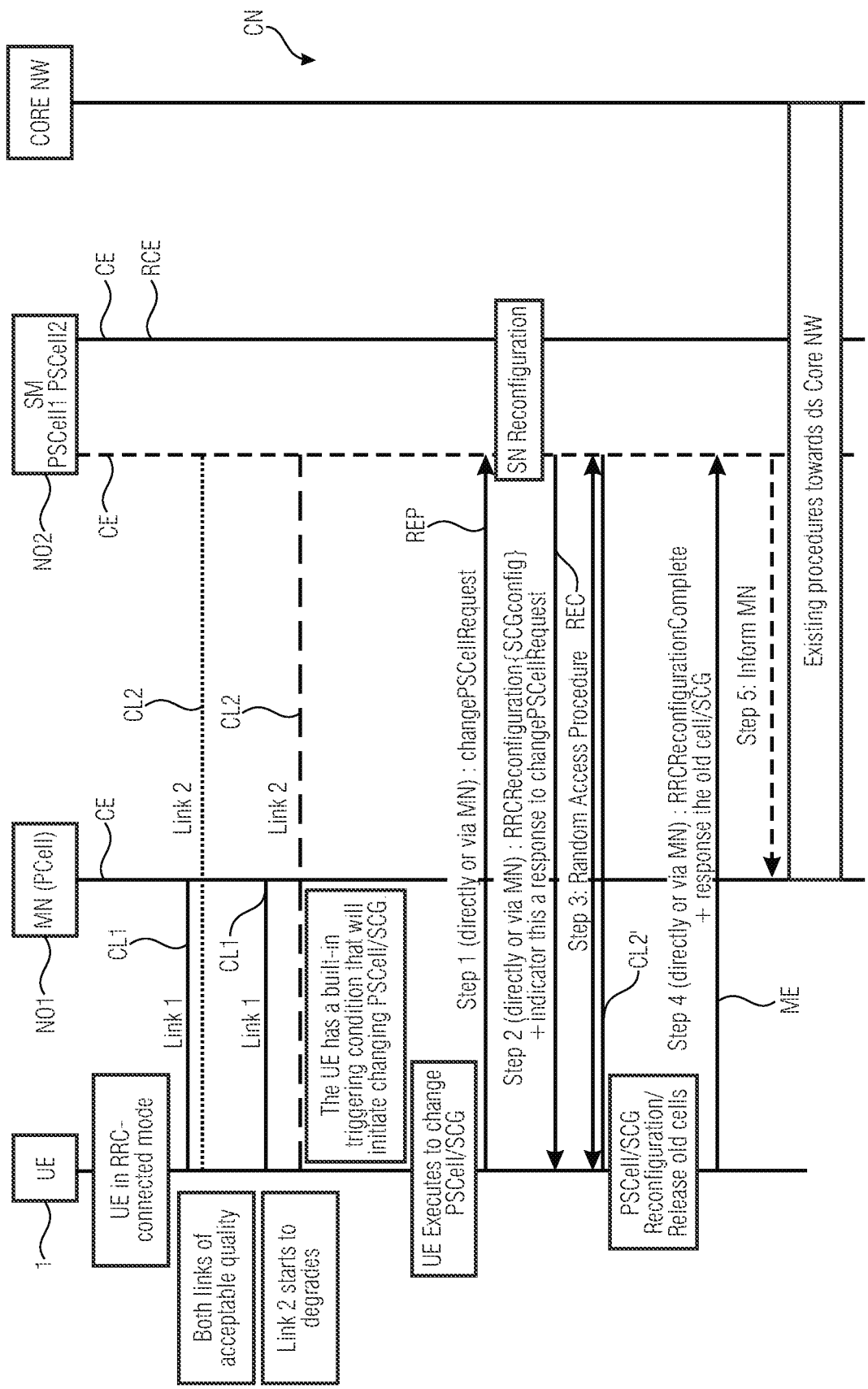
FIG. 17 illustrates an implementation of a user equipment according to FIG. 1 in 5G and its interactions with a cellular network in a schematic view.

FIG. 17 illustrates an implementation of a user equipment according to FIG. 1 in 5G and its interactions with a cellular network in a schematic view. Here, an intra-SN PSCell/SCG change is shown. The UE decides to change PSCell and thereby SCG based on a triggering condition that takes into account the quality of the existing PSCell.

This enhancement is aimed at giving the UE the right to request PSCell change due to a degrading quality of PSCell. For that, the UE may have a built-in triggering condition that will initiate changing PSCell. For example, the triggering condition could be configured as x number of instances where the timer T310 (the RLF timer) has started, but has not expired within y sec. The triggering condition could also be based on the number of retransmissions from the RLC layer on PSCell that is less than the maximum number, upon which the UE detects the radio-link failure. Based on the triggering condition, the UE decides to change the PSCell and SCG, accordingly. The enhancement also envisages that the UE creates a pool of candidate PSCells. It should then provide the SN with a PSCell preference from this preconfigured pool by sending an ordered list of PSCells. The pool of candidate cells can be created by one or more of the following:
- The UE monitors potential candidates by means of measurements, e.g. correlation of synchronization signals and reference signals (e.g. Channel State Information Reference Signals, Beam Ream Reference Signals, and Demodulation Reference Signals). The UE may use the defined metrics such as Reference Signal Received Power (RSRP), Received Signal Strength Indicator (RSSI), Signal Reference Signal Received Quality (RSRQ) or Signal-to-Noise and Interference Ratio (SINR), or any metric evaluating the quality of Channel State Information (CSI), (3GPP, 2019) for creating the pool.
- The MN and/or SN and/or one of the SCells and/or SpCells within the MN or SN can provide a list of candidates directly to the UE,
- A combination of the above.

In addition to the PSCell pool, the UE may also provide the network with the ordered list of SCells for the new SCG. The SCell pool may be created in the same was as a PSCell pool, and it may include existing and/or new SCells. The PSCells and SCells may be interchanged between the pools.

The following steps are proposed, which are shown in FIG. 17. The figure depicts the case when the procedure is being mainly handled between the UE and SN:
1) Upon making a decision on the PSCell change, the UE sends a PSCell/SCG reconfiguration request to SN. The request may be sent via MN (using SRB1), or directly to SN (using SRB3).
2) The SN checks the available radio resources on the proposed cells and sends the RRCReconfigurationRequest, including the new PSCell/SCG radio resource configuration. The RRCReconfigurationRequest message now includes an indicator that the message is a response to a PSCellChangeRequest.
3) The UE performs Random Access (RA) procedure towards the new cell.
   a. The UE may be configured with a maximum number of attempts or a maximum delay for the RA procedure (less than what is specified for the detection of SCG RLF failure). In that case, the UE would report RRCReconfigurationFailure and would not release the existing PSCell/SCG configuration.
4) The UE sends modified RRCReconfigurationComplete message—again via MN or directly to the SN. An indication to release the old PSCell is now piggybacked onto RRCReconfigurationComplete message. The SN releases the old cell.
5) In case the signalling from 4) is not transported via MN, the SN needs to inform the MN of the new PSCell/SCG configuration.

It is also possible to have the procedure being mainly handled between the UE and MN (RRCreconfiguration), which could be sent either directly or via SN. In either case, the existing procedures towards the core network can be preserved, which also depends on whether MN is involved or not—as per the existing specifications for the SN modification.

Note 1: Steps 3) and 4) can be interchanged. As explained above, in case Random access (RA) is performed in Step 3), the potential problems with the RA procedures mean that the old cell is not released and that the UE reports RRCReconfigurationFailure via MN or directly to the SN.

Figure 18A:
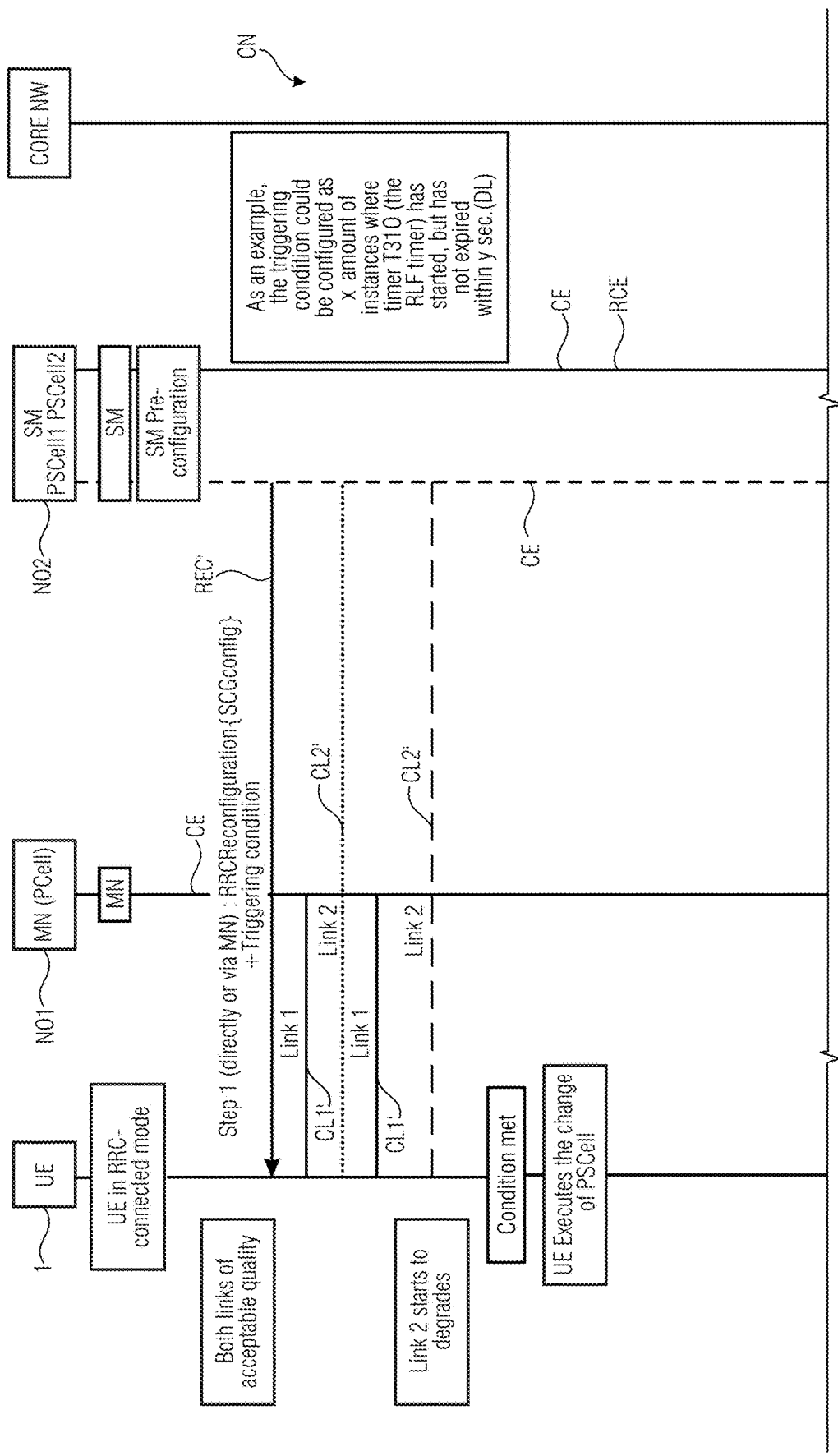
FIGS. 18A and 18B illustrates an implementation of a user equipment according to FIG. 2 in 5G and its interactions with a cellular network in a schematic view.
Figure 18B:
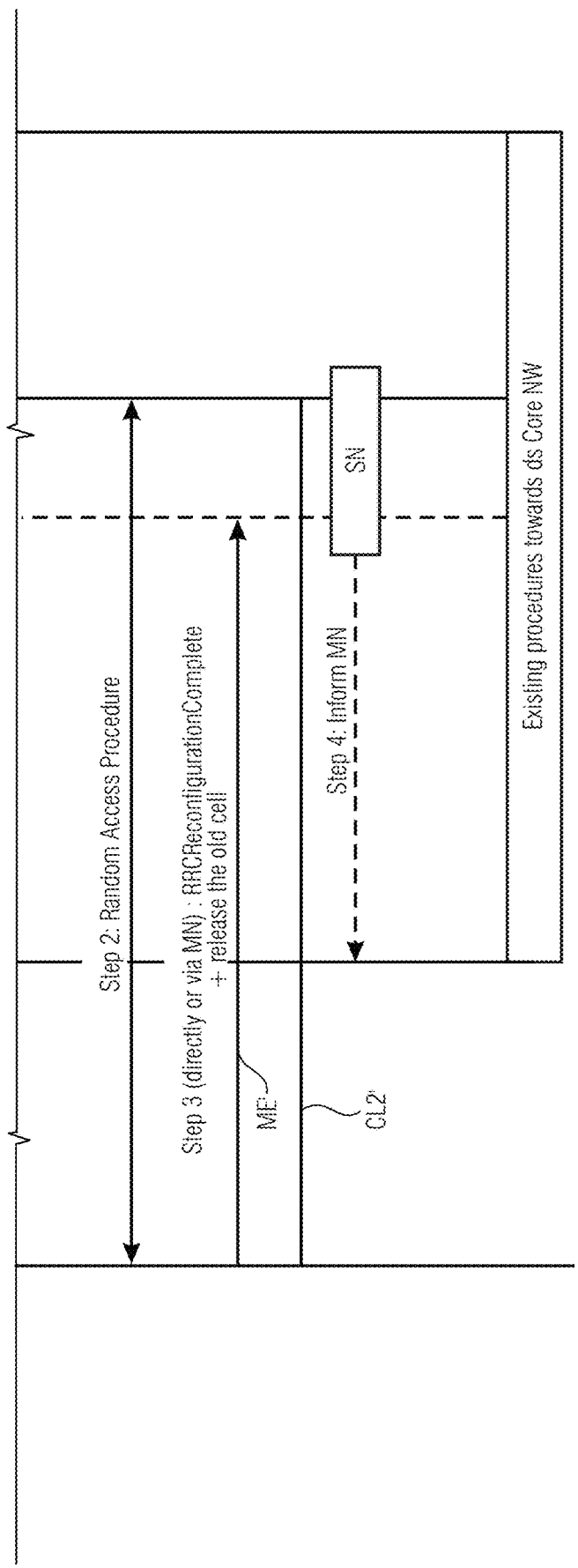

FIGS. 18A and 18B illustrates an implementation of a user equipment according to FIG. 2 in 5G and its interactions with a cellular network in a schematic view. An Intra-SN PSCell Change is illustrated here. SN may decide the pre-configuration of its resources (as depicted in the FIGS. 18A and 18B. Once the condition is met, the UE executes the change of PSCell and accordingly the SCG based on a triggering condition that takes into account the quality of the existing PSCell.

This enhancement is based on the Conditional Handover (CHO) feature, currently discussed for the inclusion in Release 16 (3GPP RAN2, 2019), where the network is in charge of the PSCell/SCG change. The UE only acts once the triggering condition is met. In (MediaTek, 2019) and (NEC, 2019), the so-called conditional PSCell addition and SCG change are also proposed. The triggering condition can be the same as discussed above.

The network (MN or SN) already have the mechanism to create a pool of candidate PSCells and SCells, which is sent to the UE.

This is depicted in FIGS. 18A and 18B and is described below.
1) SN decides, based on e.g. measurement results, to initiate PSCell/SCG change pre-configures the radio resources, which may also include old or new SCells. It sends the RRCReconfigurationRequest, including the new PSCell/SCG radio resource configuration and triggering condition.
2) Once the condition is met, the UE changes the PSCell, reconfigures SCG and performs RA procedure towards the new PSCell.
3) The UE sends modified RRCReconfigurationComplete message—again via MN or directly to the SN. An indication of release of the old PSCell and/or SCells is now piggybacked onto RRCReconfigurationComplete message. The SN releases the old cell(s).
4) In case the signalling from 4) is not transported via MN, the SN needs to inform the MN of the new PSCell/SCG configuration.

Figure 19:
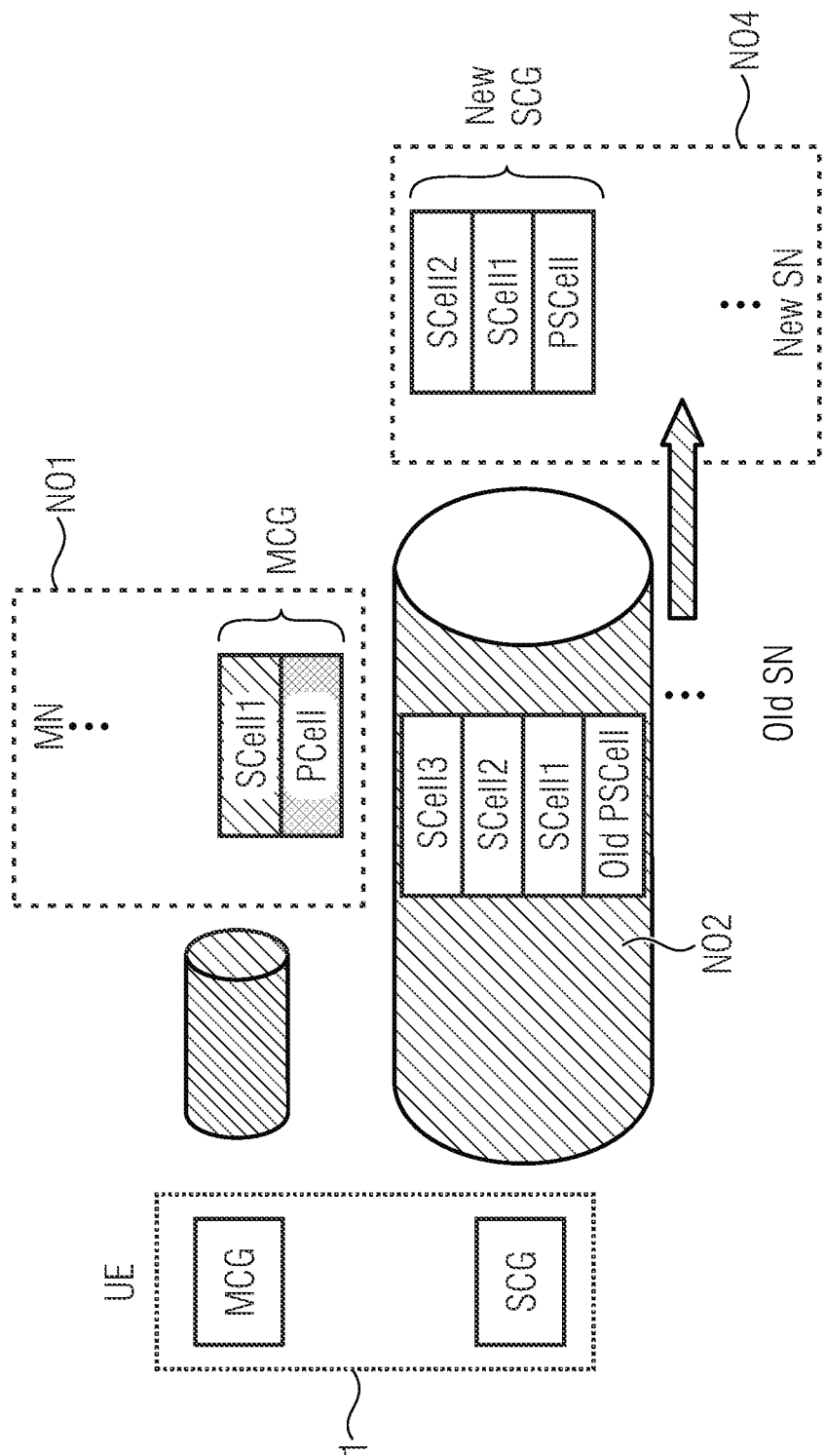
FIG. 19 illustrates an Inter-SN PSCell change.

FIG. 19 illustrates an Inter-SN PSCell change. The condition in relation to a degrading quality of PSCell triggers the decision to switch to a new SN and accordingly change PSCell and SCG.

In the inter-SN PSCell/SCG change enhancement, PSCells and new SCGs belong to different SNs. This enhancement is described below.

Figure 20A:
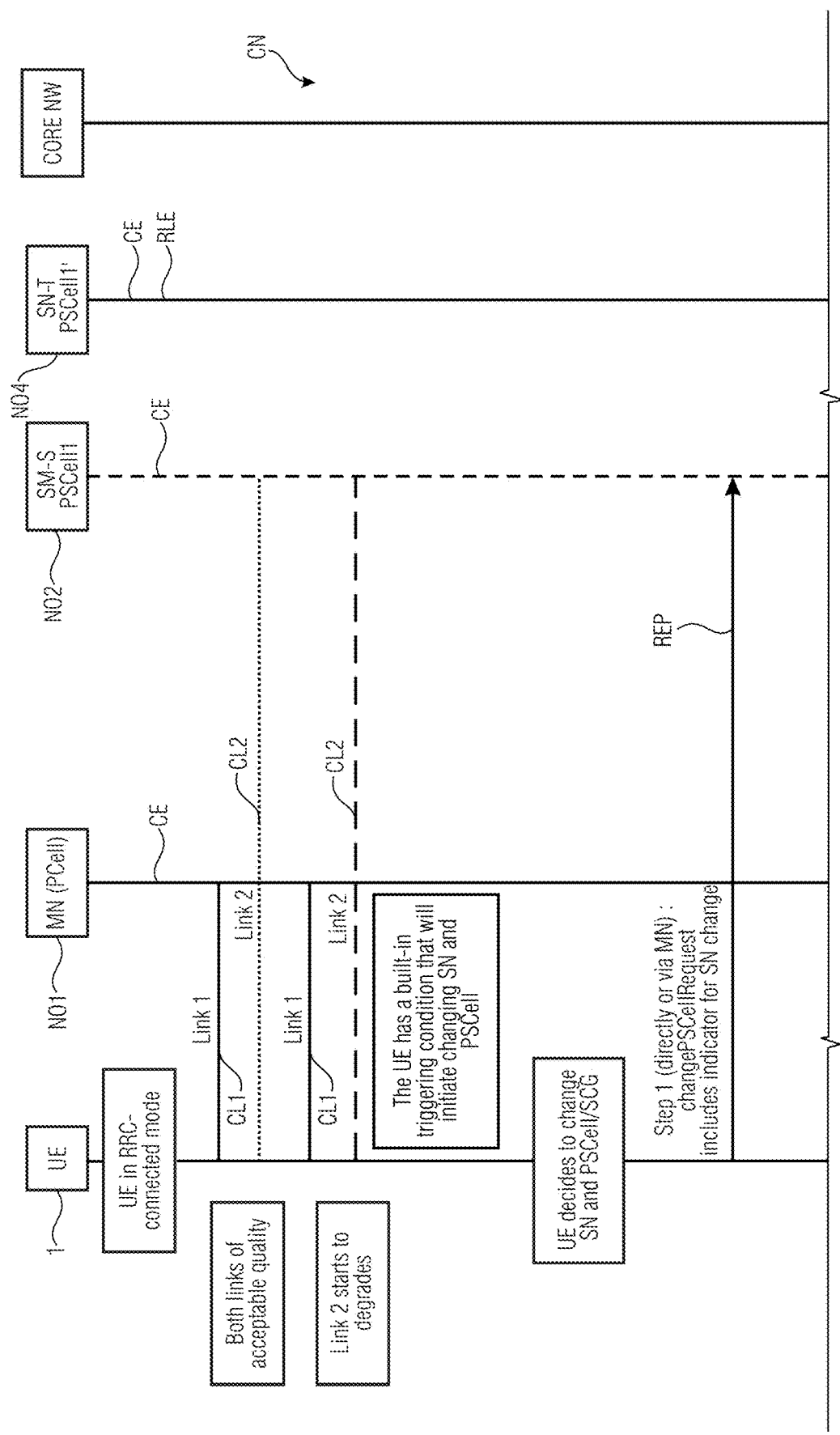
FIGS. 20A and 20B illustrates an implementation of a user equipment according to FIG. 1 in 5G and its interactions with a cellular network in a schematic view.
Figure 20B:
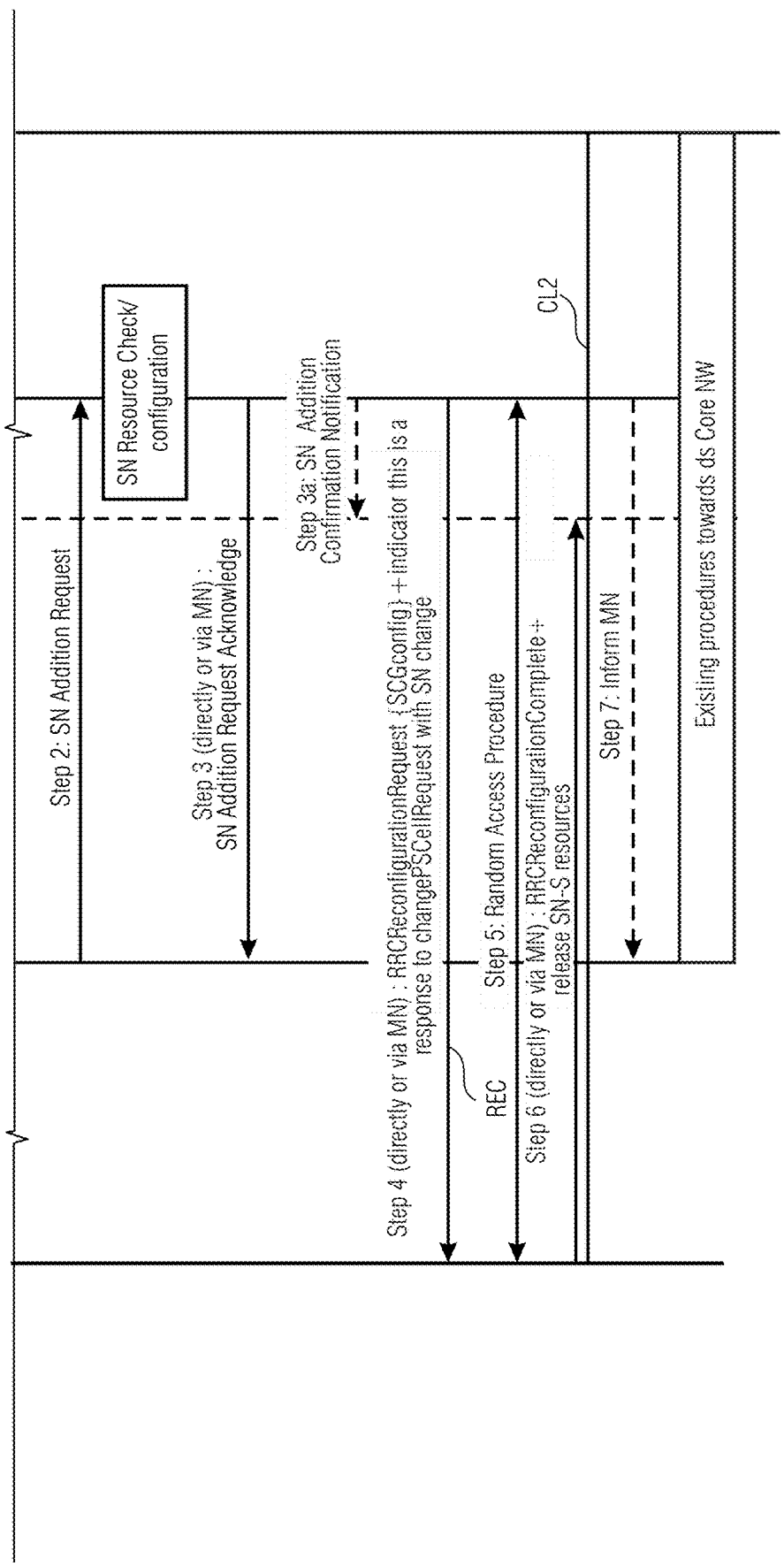

FIGS. 20A and 20B illustrates an implementation of a user equipment according to FIG. 1 in 5G and its interactions with a cellular network in a schematic view. Here, Inter-SN PSCell change is shown when the procedure is being mainly handled between the UE and SN. The UE decides to change SN and accordingly PSCell/SCG based on a triggering condition that takes into account the quality of the existing PSCell.

This enhancement is aimed at giving the UE the right to request the SN change and accordingly, the PSCell/SCG change, due to, e.g. mobility and, generally, degrading quality of PSCell. The same triggering conditions as described above could be defined. Based on the triggering condition, the UE decides to change SN and PSCell/SCG, accordingly. The enhancement also envisages that the UE in addition to PSCell and SCell pools creates a pool of candidate SNs. It should then provide the current SN with the SN/PSCell preferences from these preconfigured pools by sending, e.g. an ordered list of SNs and PSCells. The pools of candidate SNs and PSCell can be created in the same way as described above.

In addition to the SN and PSCell pools, the UE may also provide the network with the ordered list of SCells on the new SN for the new SCG. The SCell pool may be created in the same was as a PSCell pool. The PSCells and SCells may be interchanged between the pools.

The following steps are proposed, which are shown in FIGS. 20A to 20B:
1) Upon making a decision on the SN/PSCell change, the UE sends a PSCell/SCG reconfiguration request to the source SN (SN-S). The request may be sent via MN (using SRB1), or directly to SN-S (using SRB3). The changePSCellRequest message contains an indicator that this is an SNchange request. In case MN is not involved, the SN-S informs the MN of the request.
2) Either MN or SN-S send the addition request to the target SN (SN-T This is the same message as in the existing specifications (TS37.340), except it is envisaged that SN-S can also now send the request to SN-T. The figure depicts the MN-initiated addition.
3) SN-T checks the available radio resources and sends the SN Addition Request Acknowledge, including the indication of the full or delta RRC configuration. The addition request notification is sent to the SN-S.
4) The RRCReconfigurationRequest message is sent from SN-S (directly or via MN) to the UE with the new configuration, including an indicator that the message is a response to a PSCellChangeRequest (including the SN change).
5) The UE performs Random Access (RA) procedure towards SN-T and the new PSCell.
   a. The UE may be configured with a maximum number of attempts or a maximum delay for the RA procedure (less than what is specified for the detection of SCG RLF failure). In that case, the UE would report RRCReconfigurationFailure and would not release SN-S and the existing PSCell/SCG configuration.
6) The UE sends the RRCReconfigurationComplete message—again via MN or directly to the SN-S. An indication to release SN-S is now piggybacked onto RRCReconfigurationComplete message. SN-S releases its resources.
7) In case the signalling from 4) is not transported via MN, the SN needs to inform the MN of the new PSCell/SCG configuration.

It is also possible to have the procedure being mainly handled between the UE and MN (RRCreconfiguration), which could be sent either directly or via SN. In either case, the existing procedures towards the core network can be preserved, which also depends on whether MN is involved or not—as per the existing specifications for the SN modification.

Note that steps 5) and 6) can be interchanged. As explained above, in case RA is performed in Step 5), the potential problems with the RA procedures mean that SN-S is not released and that the UE reports RRCReconfigurationFailure to SN-S, directly or via MN.

Figure 21:
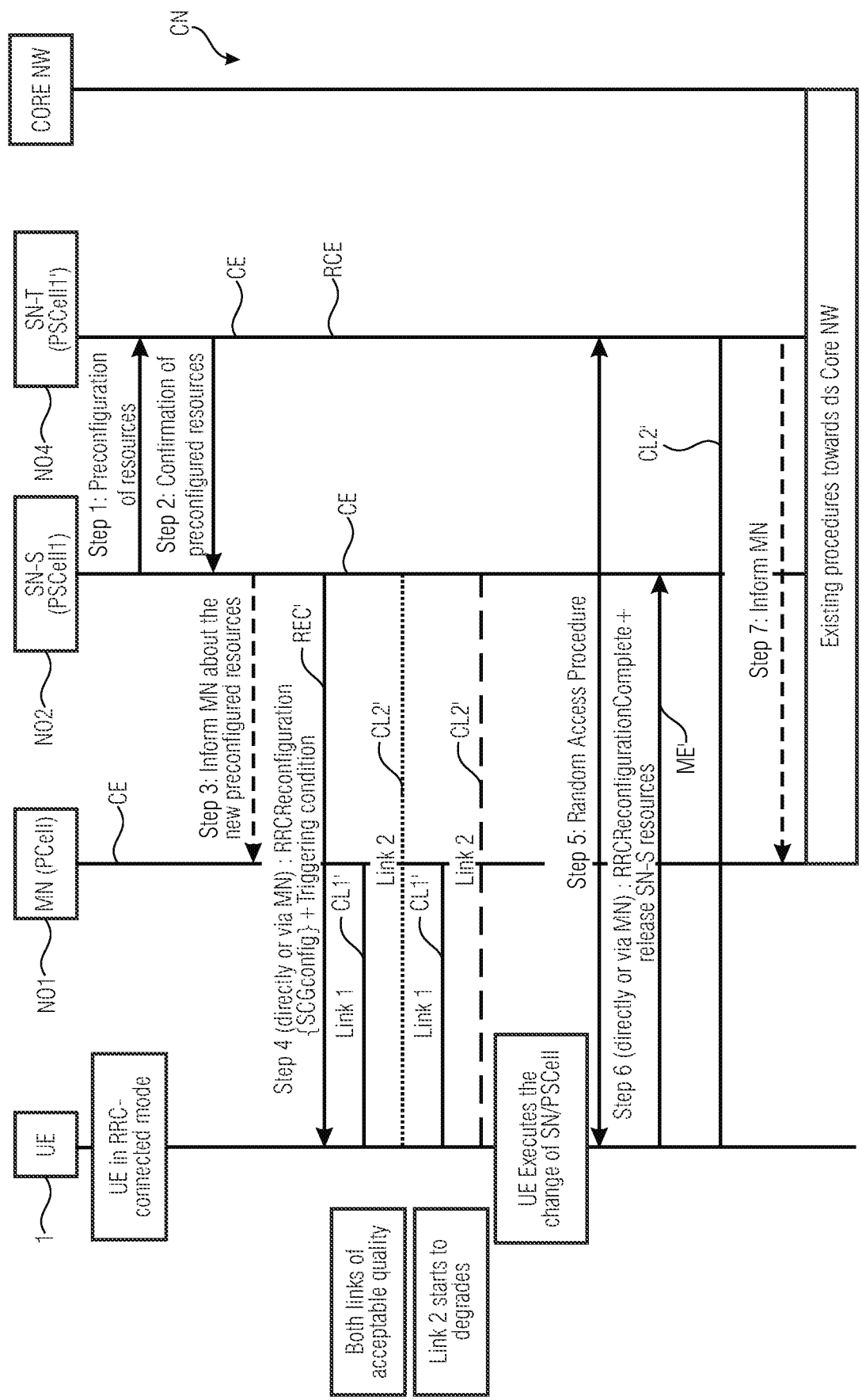
FIG. 21 illustrates an implementation of a user equipment according to FIG. 2 in 5G and its interactions with a cellular network in a schematic view.

FIG. 21 illustrates an implementation of a user equipment according to FIG. 2 in 5G and its interactions with a cellular network in a schematic view. Here, an Inter-SN PSCell change is shown. The network decides to pre-configure new SN and accordingly PSCell/SCG based on a triggering condition that takes into account the quality of the existing PSCell. FIG. 21 depicts an Inter-SN change using CHO as a basis.

Note that it is also possible to have the MN decide on the change of SN and PSCell/SCG. This is not depicted in FIG. 21.

The network (MN or SN) already have the mechanism to create a pool of candidate SNs, PSCells and SCells, which is sent to the UE.

The following steps are proposed, shown in FIG. 21:
1) Based on the measurement results from the UE, the network (MN or SN-S) makes a decision on the SN/PSCell change. The figure depicts the case when SN-S sends a request for preconfiguration of resources to SN-T.
2) SN-T sends the confirmation of pre-configure resources, indicating full availability or delta between the requested and available resources.
3) In case MN does not initiate the preconfiguration, SN-S informs MN about SN-T pre-configured resources.
4) The RRCReconfigurationRequest message is sent from SN-S to the UE with the new configuration, including the triggering condition. Once the condition is met, the UE executes the change of SN and PSCell.
5) The UE performs Random Access (RA) procedure towards SN-T and the new PSCell.
   a. The UE may be configured with a maximum number of attempts or a maximum delay for the RA procedure (less than what is specified for the detection of SCG RLF failure). In that case, the UE would report RRCReconfigurationFailure and would not release SN-S and the existing PSCell/SCG configuration.
6) The UE sends the RRCReconfigurationComplete message—via MN or directly to the SN-S. An indication to release SN-S is now piggybacked onto RRCReconfigurationComplete message. SN-S releases its resources.
7) In case the signalling from 4) is not transported via MN, the SN needs to inform the MN of the new SN/PSCell/SCG configuration.

The existing procedures towards the core network can be preserved, which also depends on whether MN is involved or not—as per the existing specifications for the SN modification.

Note that steps 5) and 6) can be interchanged. As explained above, in case RA is performed in Step 5), the potential problems with the RA procedures mean that SN-S is not released and that the UE reports RRCReconfigurationFailure to SN-S, directly or via MN.

During Handover (HO), the situation of the backhaul is not considered. The target base station for the HO is selected based on the signal strengths and/or the qualities of the links between the UE and one or several bases stations or access points.

Figure 22:
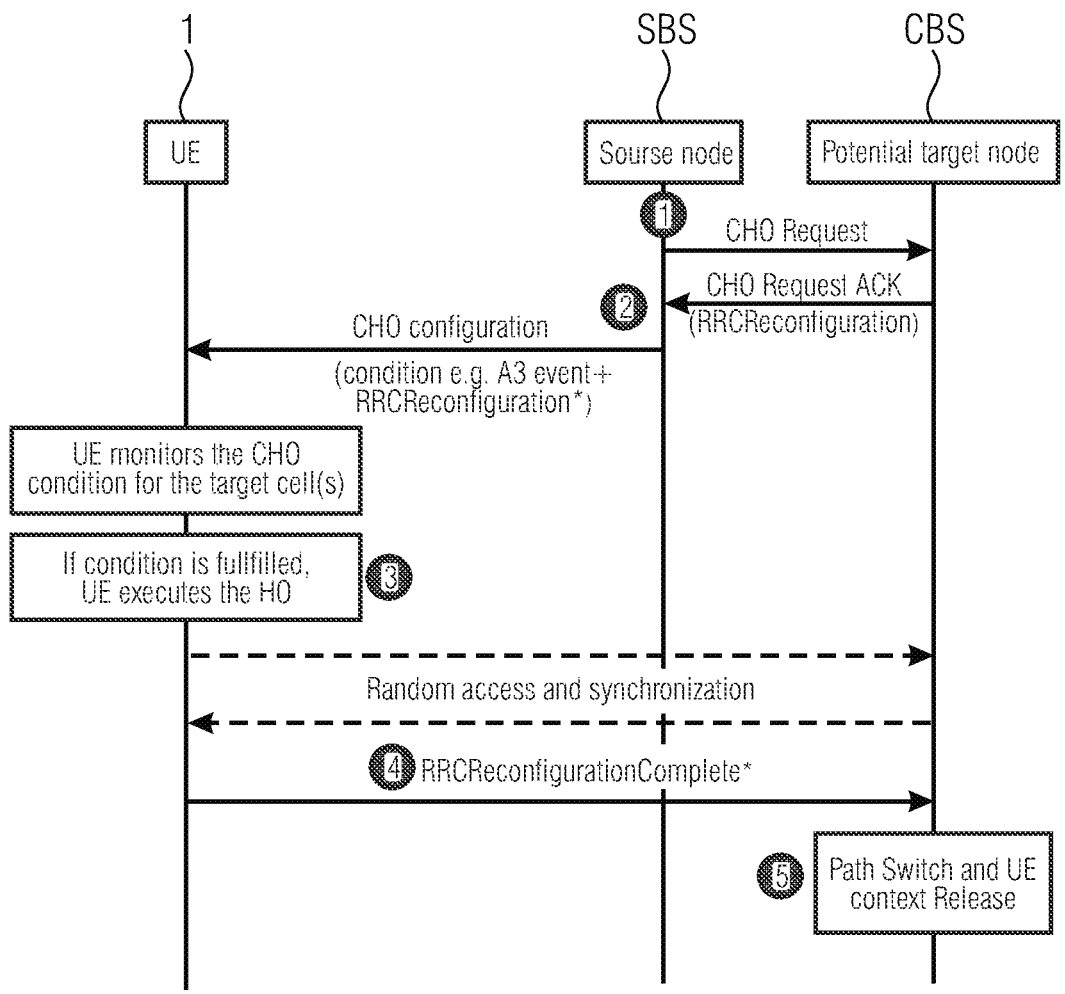
FIG. 22 illustrates a basic CHO procedure (Ericsson "R2-1900404 Conditional Handover)

FIG. 22 illustrates a basic conditional HO (CHO) procedure. A similar situation exists in conditional HO (CHO). In CHO to the target base station is selected considering the link to the UE. The quality of the backhaul link of different base stations is not compared and is not considered in this selection. Then the UE is configured with the configurations that may be used to connect to that selected target base station. In CHO the target base station is selected considering the link quality on the Uu-link based on agreed thresholds between base station and UE with reduced signalling. If a certain link quality threshold is met by the UE, the UE can automatically perform a HO to its target base station without sending a measurement report to its source base station. Furthermore, the UE can directly perform the HO without waiting for the HO command from its source base station, which might fail due to fluctuations on the Uu link. The quality of the backhaul link of different base stations is not compared or exchanged and is not considered in this selection.

In SN selection in dual-/multi-connectivity, the master node (MN) selects the SN considering its link to the UE. The quality of the backhaul link of different base stations is not compared and is not considered in the selection of the SN.

SN change or modification can be initiated by MN or SN. The quality of the backhaul link of different base stations is not compared and is not considered in the change or modification of the SN.

Figure 23:
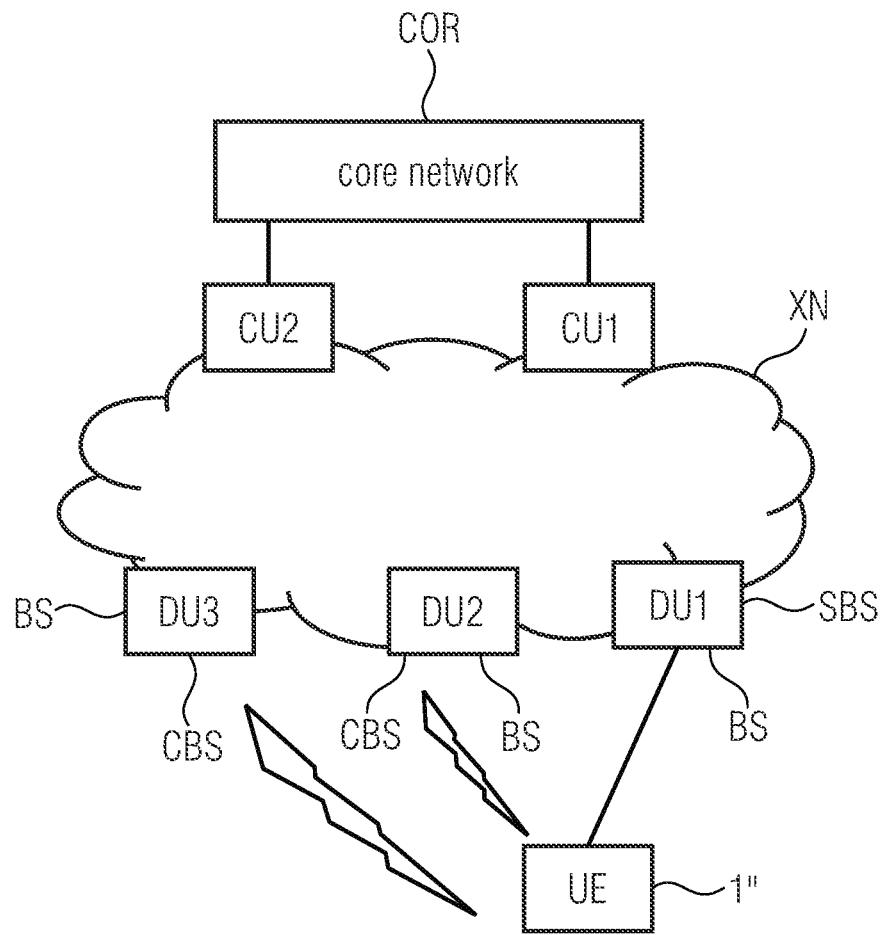
FIG. 23 illustrates a situation of the backhaul between the central unit (CU) and distributed unit (DU) influences the quality of the path from the UE to the Core Network.

FIG. 23 illustrates a situation of the backhaul between the central unit (CU) and distributed unit (DU) influences the quality of the path from the UE to the Core Network. When there are two or more candidate base stations, one base station is selected considering the available resources and signal strength (to the UE). The quality of the backhaul is neglected in this selection. For example, in FIG. 23, the UE is under coverage of both DU2 and DU3. If one of them is to be selected to service the UE (e.g. to handover or as an SN), the backhaul link between each of these two base station to the core network (CN) is not considered or compared.

Figure 24:
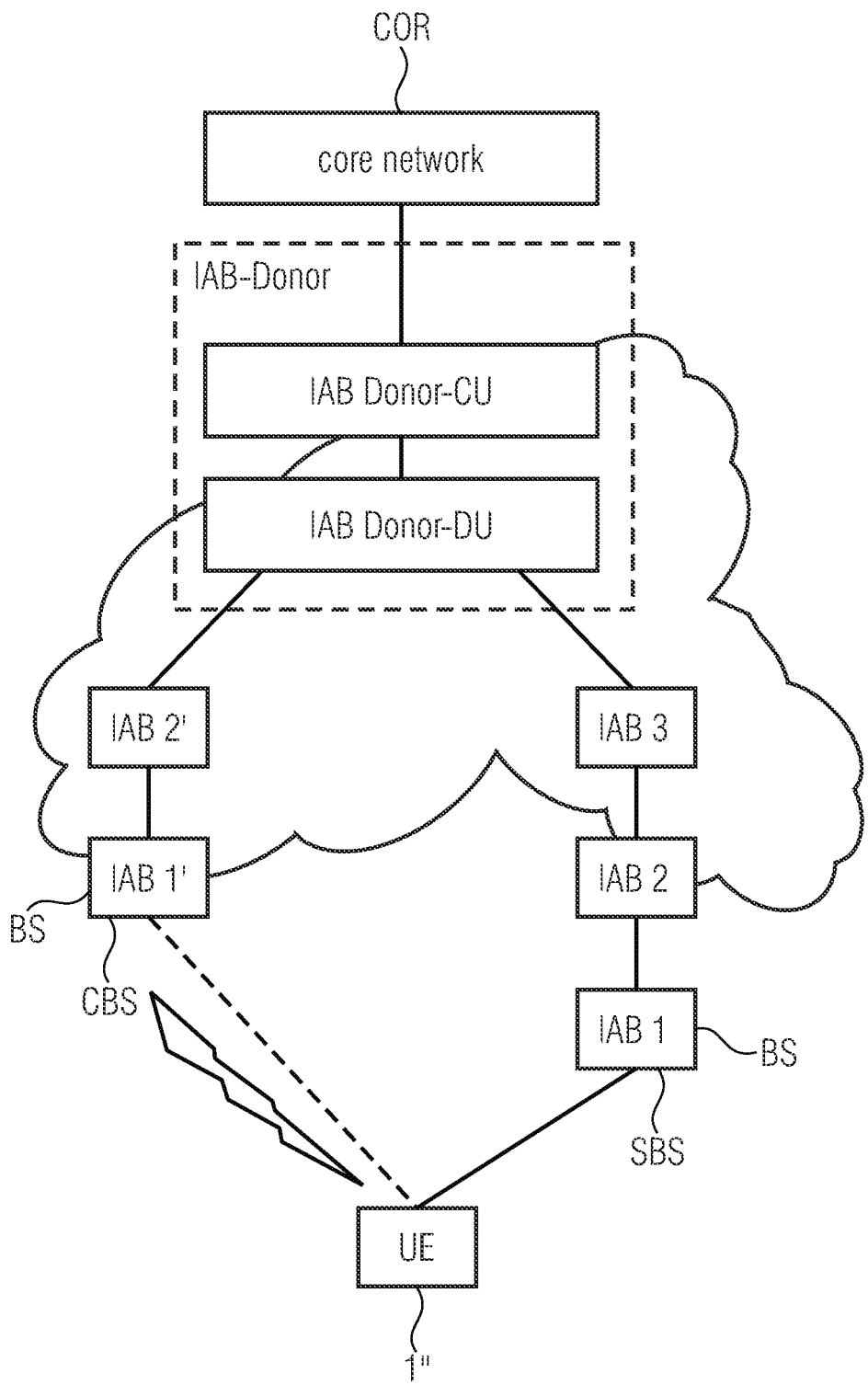
FIG. 24 illustrates an impact of backhaul on the quality of the path from the UE to the Core Network in the case of IAB.

FIG. 24 illustrates an impact of backhaul on the quality of the path from the UE to the Core Network in the case of IAB. IAB is an example of how the backhaul may be implemented. For example, in FIG. 24, consider the case where the signal that the UE gets from IAB node 1 is stronger than the signal from IAB node 1', although both powers are above the acceptable threshold for communication to the UE. On the other hand, the signal from/to IAB node 1 experiences a larger delay to reach the core network. However, the backhaul link from the IAB access node to the IAB-Donor-CU is transparent to the UE. It implies that whether the serving node is an IAB node or not, is also transparent to the UE.

HO scenario: In FIG. 24, node 1 and node 1' are candidates for HO. In the state of the art, neither serving base station nor the UE does have any information of the backhaul links of these two candidates.

Dual-/multi-connectivity scenario: In FIG. 24, node 1 and node 1' are candidates to become an SN. In the state of the art, neither MN nor the UE does have any information of the backhaul links of these two candidates.

In both scenarios however, if the UE and/or serving base station/MN have the knowledge of the quality of the two possible backhaul paths, they can decide which one suits better for the QoS that may be used of the service/s that the UE is using.

The solution includes two possible enhancements, which can be applied together or separately.

Proposed Enhancement 1: Consider Backhaul status (Quality of the backhaul link) Information of the quality of the backhaul transferred between base stations, e.g. over X2 or Xn. In the state of the art, Admission confirmation is transferred over X2/Xn.

Two enhancements are proposed in this invention: One enhancement is to transfer an indication of the quality of the backhaul (from BS to CN). The other proposed enhancement is to enable UE-initiated base station selection e.g. in HO, in dual-/multi-connectivity.

Figure 25:
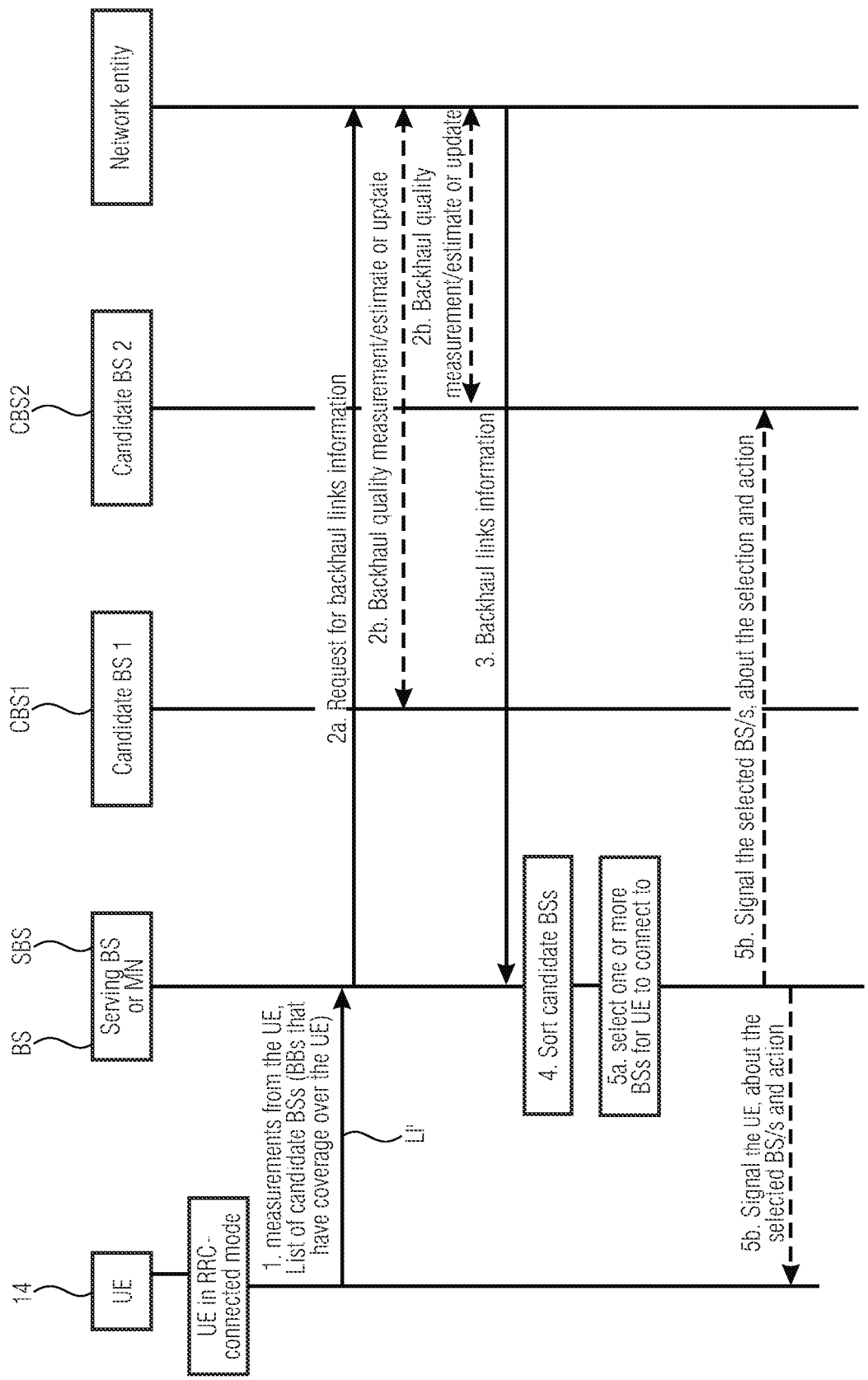
FIG. 25 illustrates Basic procedure (procedure 0) to consider Backhaul status in base station selection.

FIG. 25 illustrates Basic procedure (procedure 0) to consider Backhaul status in base station selection.

Procedure 0:
1. The UE provides the list of candidate base stations to currently serving base station/MN. The serving base station/MN transfers this list from the UE to a particular entity in the network. The serving base station/MN itself can be that particular entity.
   Note 1—Some of the candidates may be IAB nodes.
   Note 2—The currently serving base station/MN may be an IAB node.
2. The so-called particular entity estimates or measures or gets the quality of the backhaul link from each candidate base stations to the core network.

If the backhaul link does not exist the entity may estimate the quality of that link if it is able to do that.

If there are IAB nodes in the candidates list, IAB-Donor-CU can be the entity that estimates or measures the quality of the backhaul link. Especially in case that both (or all of) IAB nodes are connected to the same IAB-Donor-CU, that IAB-Donor-CU have a comparison between the quality of the backhaul links from core network to each of the IAB nodes. For example, the number of hops of a path can give an estimate of the delay of the path.

3. In case that the so-called particular network entity is different from the serving base station/MN, the quality of the backhaul links are sent from that network entity to the serving base station/MN.
4. Serving base station/MN considers the link measurements from the UE AND the backhaul information that it got from the network (step 3) and sorts the list of candidate base stations.
5. Serving base station/MN selects base stations and decides on an action and/or initiates that action, e.g. HO/CHO to the selected base station, initiating a secondary link with the selected base station, swapping MN and SN.

In case that the second proposed enhancement is available and the UE is able to initiate the HO and/or SN establishment, two possible procedures are proposed.

Figure 26:
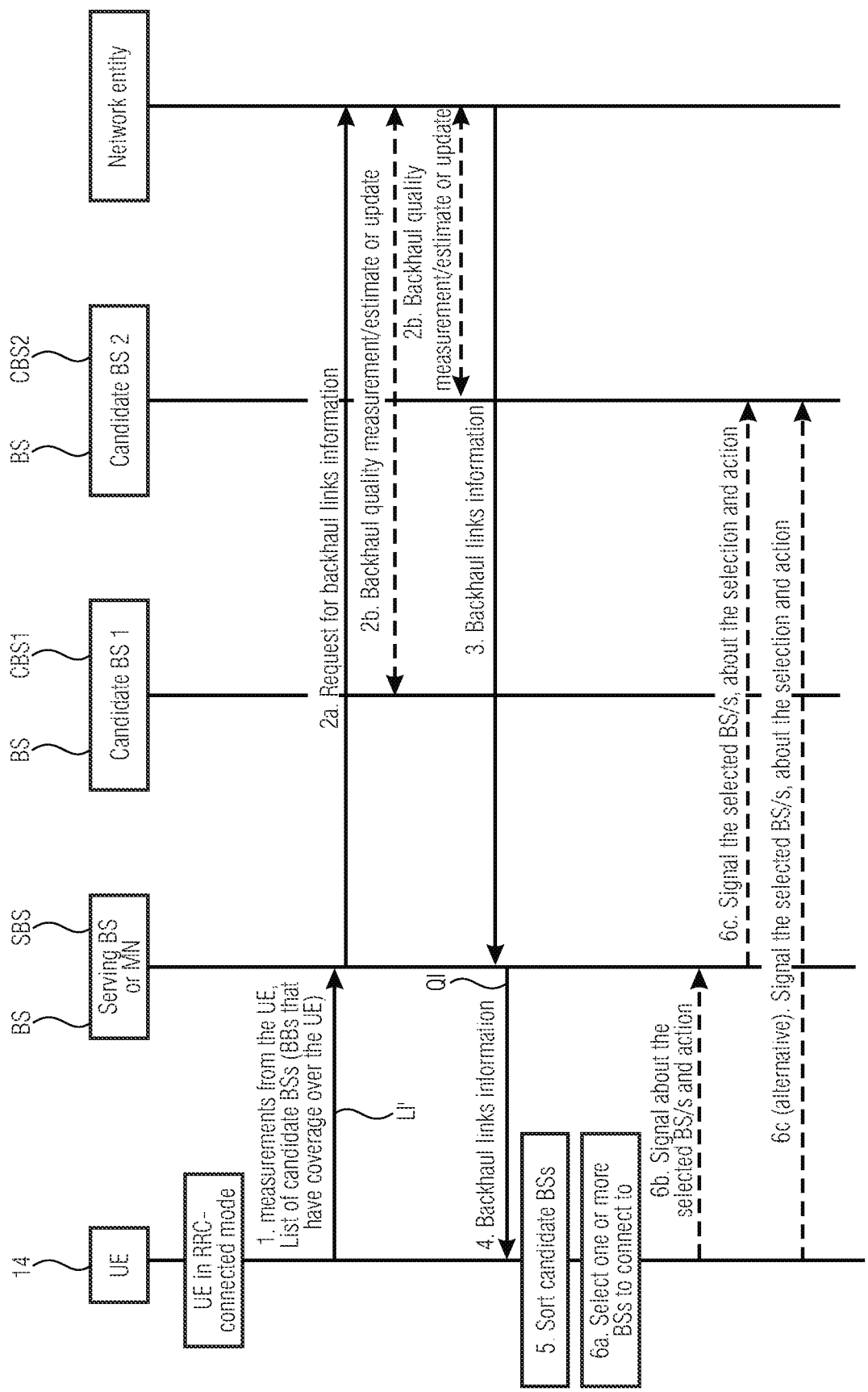
FIG. 26 illustrates an implementation of a user equipment according to FIG. 3 in 5G and its interactions with a cellular network in a schematic view.

FIG. 26 illustrates an implementation of a user equipment according to FIG. 3 in 5G and its interactions with a cellular network in a schematic view.

Procedure 1:
1 to 3: Same as procedure 0 (FIG. 25).
4. Serving base station/MN sends the quality of the backhaul links to the UE.
5. UE considers the measurements that the UE itself has AND the backhaul information that it got from the network and sorts the list of candidate base stations.

6. UE selects base stations and decides on an action, and triggers the action, e.g. HO to the selected base station, initiating a secondary link with the selected base station.

In procedure 1 backhaul information are transferred to the UE (step 4) and UE sorts the base stations (step 5) and make decisions (step 6).

Figure 27:
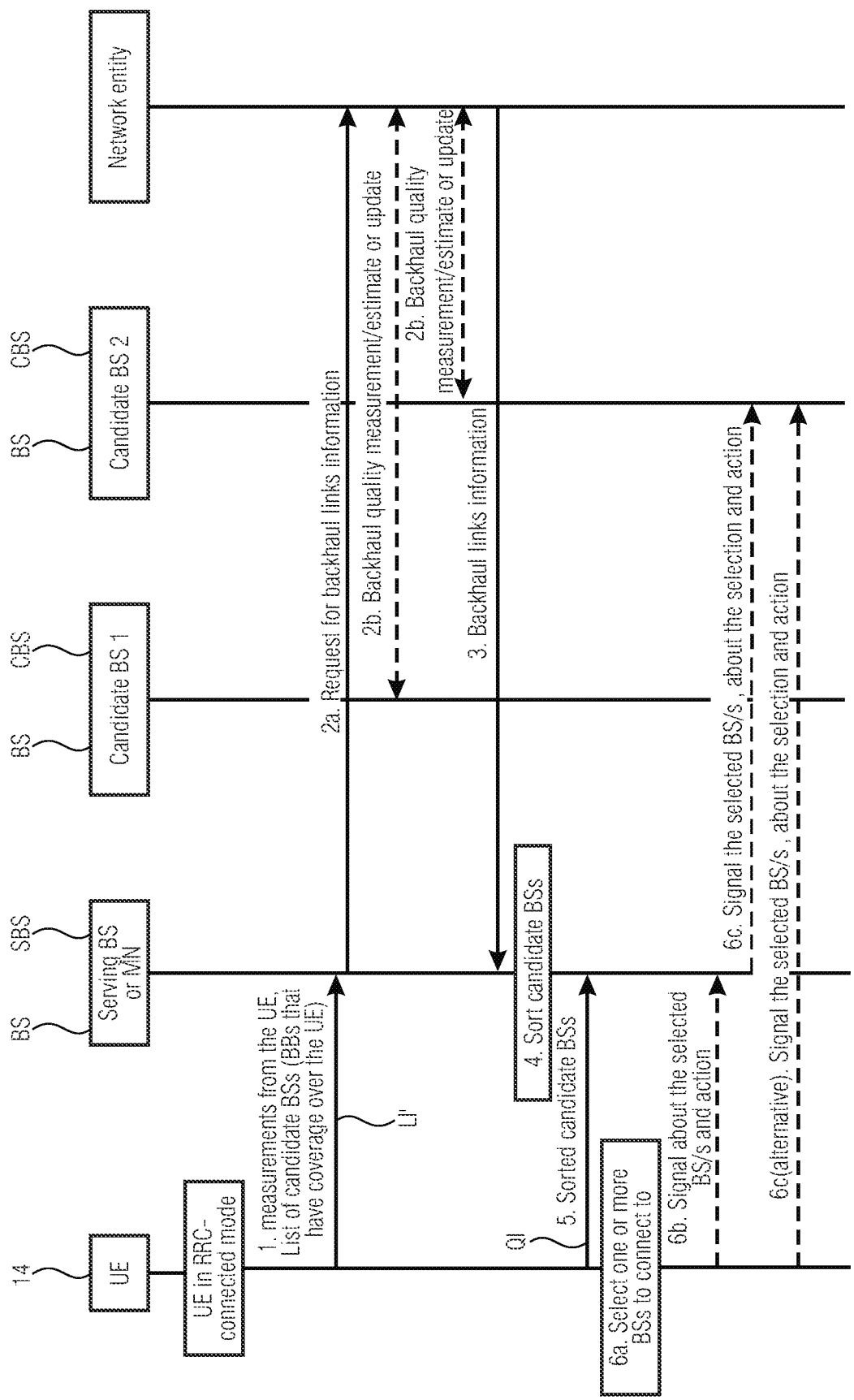
FIG. 27 illustrates a further implementation of a user equipment according to FIG. 3 in 5G and its interactions with a cellular network in a schematic view.

FIG. 27 illustrates a further implementation of a user equipment according to FIG. 3 in 5G and its interactions with a cellular network in a schematic view.

The alternative procedure is that the backhaul information are not sent the UE. Instead, the serving base station or MN uses this information in addition to the measurements collected from the UE and sorts the candidate base stations/nodes. This alternative procedure is shown in FIG. 27 and described below.

Procedure 2:
1 to 4: Same as procedure 0 (FIG. 25).
5. Serving base station/MN sends sorted list of candidate base stations to the UE.
6. UE selects base stations and decides on an action, and triggers the action, e.g. HO to the selected base station, initiating a secondary link with the selected base station.

Depending on certain implementation requirements, embodiments of the inventive device can be implemented in hardware and/or in software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that one or more or all of the functionalities of the inventive device or system is performed.

In some embodiments, a programmable logic device (for example a field programmable gate array) may be used to perform one or more or all of the functionalities of the devices and systems described herein. In some embodiments, a field programmable gate array may cooperate with a microprocessor in order to perform one or more or all of the functionalities of the devices and systems described herein.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the inventive method can be implemented using an apparatus comprising hardware and/or software. The implementation can be performed using a digital storage medium, for example a floppy disk, a DVD, a Blu-ray Disc, a CD, a ROM, a PROM, an EPROM, an EEPROM or a FLASH memory, having electronically readable control signals stored thereon, which cooperate (or are capable of cooperating) with a programmable computer system such that the respective method is performed.

Depending on certain implementation requirements, embodiments of the inventive method can be implemented using an apparatus comprising hardware and/or software.

Some or all of the method steps may be executed by (or using) a hardware apparatus, like a microprocessor, a programmable computer or an electronic circuit. Some one or more of the most important method steps may be executed by such an apparatus.

Some embodiments according to the invention comprise a data carrier having electronically readable control signals, which are capable of cooperating with a programmable computer system such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, which is stored on a machine readable carrier or a non-transitory storage medium.

A further embodiment comprises a processing means, for example a computer, or a programmable logic device, in particular a processor comprising hardware, configured or adapted to perform one of the methods described herein.

A further embodiment comprises a computer having installed thereon the computer program for performing one of the methods described herein.

Generally, the methods are advantageously performed by any apparatus comprising hardware and or software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCE SIGNS 1 user equipment
2 monitoring unit
CN cellular network
CE cell
NO node
CL communication link
REP replacement request
RCE replacement cell
LI list
REC request for reconfiguration
ME message
BS base station
XN xhaul network
COR core network
SBS serving base station
CBS candidate base stations
QI quality information
QIR quality information request
SI signal

REFERENCES (ETRI), Lee. 2015. "A Study of the Radio Resource Control Connection."
38.401, 3GPP. "Architecture description NG RAN 38.401."
3GPP RAN2. 2019. "RAN 2-107—Chairmains Notes." Prague.

3GPP. 2019. TS 38.215 NR; *Physical layer measurements*. 3GPP.
Ahmadi. 2019. "5G NR." Elsevier.
Ericsson. "R2-1900404 Conditional Handover."
MediaTek. 2019. "Conditional PSCell addition."
NEC. 2019. "R2-1904069 Reuse of conditional handover for SCG change in NR-DC.
Rao, Jaya, and Sophie Vrzic. 2018. "Packet Duplication for URLLC in 5G: Architectural Enhancements and Performance Analysis." *IEEE Network*.
Rosa, Claudio. 2016. *Dual Connectivity for LTE Small Cell Evolution: Functionality and Performance Aspects*. IEEE Communications Magazine.
Sauter, Martin. https://blog.wirelessmoves.com/2017/09/5g-part-3-dual-connectivity-en-dc.html.
SI 38.874, 3GPP. 2018. "Study on Integrated Access and Backhaul."
TS 36.331—f60. "LTE Radio Resource Specification."
TS 38.331—f60. "Radio Resource Control (RRC) protocol specification."
TS37.340, TS—f60. Multi-Radio Dual Connectivity.

The invention claimed is:

1. A device comprising:
a processor circuit;
a memory circuit, wherein the memory is arranged to store instructions for the processor circuit,
wherein the processor circuit is arranged to simultaneously communicate with at least one cells of a first node of a cellular network,
wherein the processor circuit is arranged to communicate with at least one cells of a second node of the cellular network;
wherein the processor circuit is arranged to receive a first request for reconfiguration,
wherein the first request for configuration comprises an indication that a first cell of the first node has to be replaced by a first replacement cell of the cellular network
wherein the first cell of the first node is arranged to communicate with the device,
wherein the first request for reconfiguration comprises a first change condition under which the first request for reconfiguration has to be executed and/or for receiving a second request for reconfiguration,
wherein the second request for reconfiguration comprises an indication that a first cell of the second node has to be replaced by a second replacement cell of the cellular network,
wherein the second request for reconfiguration comprises a second change condition under which the second request for reconfiguration has to be executed; and
a monitoring circuit, wherein the monitoring circuit is arranged to monitor the first change condition and/or the second change condition,
wherein the processor circuit is arranged to replace the first cell of the first node by the first replacement cell if the monitoring circuit detects that the first change condition is met,
wherein the processor circuit is arranged to replace the first cell of the second node by the second replacement cell if the monitoring circuit detects that the second change condition is met,
wherein the processor circuit is arranged to transmit a first message to the first node or to the second node after the first condition has been met,
wherein the first message indicates that the first cell of the first node has been released.

2. The device according to claim 1, wherein the processor circuit is arranged to replace the first cell of the first node by the first replacement cell such that the first cell of the first node is released by the user equipment before the processor circuit connects to the first replacement cell.

3. The device according to claim 1, wherein the processor circuit is arranged to replace the first cell of the first node by the first replacement cell such that the device connects to the first replacement cell before the first cell of the first node is released by the device.

4. The device according to claim 1, wherein the processor circuit is arranged to communicate over the cellular network using dual connectivity or multi connectivity.

5. The device according to claim 4,
wherein the first node is a base station and a Master Node for dual connectivity or multi connectivity,
wherein the second node is a base station and a Secondary Node for dual connectivity or multi connectivity.

6. The device according to claim 4,
wherein the first cell of the first node is a Special Cell or a Secondary Cell of a Master Cell Group for dual connectivity or multi connectivity, and/or
wherein the first cell of the second node is Special Cell or a Secondary Cell of a Secondary Cell Group for dual connectivity or multi connectivity.

7. The device according to claim 1, wherein the first change condition and/or the second change condition is any of:
a number of instances where a timer of a Radio Link Failure timer has started, but has not expired within a period of time;
a number of HARQ retransmission from the PHY layer;
a number of retransmissions from a Radio Link Control layer that is less than the maximum number upon which the user equipment detects a radio-link failure;
a weighted or moving average or any other statistical method using metrics that show a degradation of a signal quality;
a bit error rate;
a packet loss rate or a packet error rate;
a data rate demand;
a supported bandwidth;
a multi-cell event,
wherein the multi-cell event is triggered by the user equipment, one of the nodes or another device of the cellular network.

8. The device according to claim 1, wherein the processor circuit is arranged to receive the second request for reconfiguration from the first node or from the second node.

9. The device according claim 1, wherein the processor circuit is arranged to communicate with the first replacement cell after the first change condition has been met.

10. The device according claim 1,
wherein the processor circuit is arranged to perform a random access procedure towards the first replacement cell after the first change condition has been met,
wherein the processor circuit is arranged to release the first cell of the first node after the random access procedure towards the first replacement cell has been successfully completed.

11. The device according to claim 1, wherein the processor circuit is arranged to communicate with the second replacement cell after the second change condition has been met.

12. The device according to claim 1,
wherein the processor circuit is arranged to perform a random access procedure towards the second replacement cell after the second change condition has been met,
wherein the processor circuit is arranged to release the first cell of the second node after the random access procedure towards the second replacement cell has been successfully completed.

13. The device according to claim 1,
wherein the processor circuit is arranged to derive the first request for reconfiguration, whether the first replacement cell belongs to the first node of the cellular network or to a third node of the cellular network,
whether the second replacement cell belongs to the second node of the cellular network or to a fourth node of the cellular network.

14. The device according to claim 1, wherein the processor circuit is arranged to replace the first cell of the second node by the second replacement cell such that the first cell of the second node is released by the user equipment before the processor circuit connects to the second replacement cell.

15. The device according to claim 1, wherein the processor circuit is arranged to replace the first cell of the second node by the second replacement cell such that the user equipment connects to the second replacement cell before the first cell of the second node is released by the device.

16. The device according to claim 1,
wherein the processor circuit is arranged to derive the second request for reconfiguration, whether the first replacement cell belongs to the first node of the cellular network or to a third node of the cellular network,
whether the second replacement cell belongs to the second node of the cellular network or to a fourth node of the cellular network.

17. A method comprising:
communicating with at least one cells of a first node of a cellular network and with at least one cells of a second node of the cellular network;
receiving a first request for reconfiguration,
wherein the first request for configuration comprises an indication that a first cell of the first node has to be replaced by a first replacement cell of the cellular network,
wherein the first cell of the first node is arranged to communicate with the user equipment
wherein the first request for reconfiguration comprises a first change condition under which the first request for reconfiguration has to be executed and/or for receiving a second request for reconfiguration,
wherein the second request for reconfiguration comprises an indication that a first cell of the second node has to be replaced by a second replacement cell of the cellular network,
wherein the second cell of the second node is arranged to communicate with the device,
wherein the second request for reconfiguration comprises a second change condition under which the second request for reconfiguration has to be executed;
monitoring the first change condition and/or the second change condition; and
replacing the first cell of the first node by the first replacement cell if the monitoring circuit detects that the first change condition is met;
replacing the first cell of the second node by the second replacement cell if the monitoring circuit detects that the second change condition is met;
transmitting a first message to the first node or to the second node after the first condition has been met,
wherein the first message indicates that the first cell of the first node has been released.

18. A non-transitory computer-readable medium storing a computer program, wherein the computer program when executed on a processor performs the method according to claim 17.

19. The method according to claim 17, further comprising replacing the first cell of the first node by the first replacement cell such that the first cell of the first node is released by the user equipment before the processor circuit connects to the first replacement cell.

20. The method according to claim 17, further comprising replacing the first cell of the first node by the first replacement cell such that the device connects to the first replacement cell before the first cell of the first node is released by the device.

21. The method according to claim 17, further comprising communicating over the cellular network using dual connectivity or multi connectivity.

22. The method according to claim 21,
wherein the first node is a base station and a Master Node for dual connectivity or multi connectivity,
wherein the second node is a base station and a Secondary Node for dual connectivity or multi connectivity.

23. The method according to claim 21,
wherein the first cell of the first node is a Special Cell or a Secondary Cell of a Master Cell Group for dual connectivity or multi connectivity, and/or
wherein the first cell of the second node is Special Cell or a Secondary Cell of a Secondary Cell Group for dual connectivity or multi connectivity.

24. The method according to claim 17, further comprising receiving the second request for reconfiguration from the first node or from the second node.

25. The method according to claim 17, further comprising communicating with the first replacement cell after the first change condition has been met.

26. The method according to claim 17, further comprising:
performing a random access procedure towards the first replacement cell after the first change condition has been met; and
releasing the first cell of the first node after the random access procedure towards the first replacement cell has been successfully completed.

27. The method according to claim 17, further comprising communicating with the second replacement cell after the second change condition has been met.

28. The method according to claim 17, further comprising:
performing a random access procedure towards the second replacement cell after the second change condition has been met; and
releasing the first cell of the second node after the random access procedure towards the second replacement cell has been successfully completed.

29. The method according to claim 17, further comprising deriving the first request for reconfiguration, whether the first replacement cell belongs to the first node of the cellular network or to a third node of the cellular network, whether the second replacement cell belongs to the second node of the cellular network or to a fourth node of the cellular network.

30. The method according to claim 17, wherein the processor circuit is arranged to replace the first cell of the second node by the second replacement cell such that the first cell of the second node is released by the user equipment before the processor circuit connects to the second replacement cell.

31. The method according to claim 17, further comprising replacing the first cell of the second node by the second replacement cell such that the user equipment connects to the second replacement cell before the first cell of the second node is released by the device.

32. The method according to claim 17, further comprising deriving the second request for reconfiguration, whether the first replacement cell belongs to the first node of the cellular network or to a third node of the cellular network, whether the second replacement cell belongs to the second node of the cellular network or to a fourth node of the cellular network.

33. A device comprising:
a processor circuit;
a memory circuit, wherein the memory is arranged to store instructions for the processor circuit,
wherein the processor circuit is arranged to simultaneously communicate with at least one cells of a first node of a cellular network,
wherein the processor circuit is arranged to simultaneously communicate with at least one cells of a second node of the cellular network;
wherein the processor circuit is arranged to receive a first request for reconfiguration,
wherein the first request for configuration comprises an indication that a first cell of the first node,
wherein the first cell of the first node is arranged to communicate with the device,
wherein the first cell of the first node has to be replaced by a first replacement cell of the cellular network,
wherein the first request for reconfiguration comprises a first change condition under which the first request for reconfiguration has to be executed, and/or for receiving a second request for reconfiguration,
wherein the second request for reconfiguration comprises an indication that a first cell of the second node has to be replaced by a second replacement cell of the cellular network,
wherein the second request for reconfiguration comprises a second change condition under which the second request for reconfiguration has to be executed; and
a monitoring circuit, wherein the monitoring circuit is arranged to monitor the first change condition and/or the second change condition,
wherein the processor circuit is arranged to replace the first cell of the first node by the first replacement cell if that the monitoring circuit detects that the first change condition is met,
wherein the processor circuit is arranged to replace the first cell of the second node by the second replacement cell if the monitoring circuit detects that the second change condition is met,
wherein the processor circuit is arranged to transmit a second message to the first node or to the second node, after the second condition has been met,
wherein the second message indicates that the first cell of the second node has been released.

34. The device according to claim 33, wherein the processor circuit is arranged to replace the first cell of the first node by the first replacement cell such that the first cell of the first node is released by the user equipment before the processor circuit connects to the first replacement cell.

35. The device according to claim 33, wherein the processor circuit is arranged to replace the first cell of the first node by the first replacement cell such that the device connects to the first replacement cell before the first cell of the first node is released by the device.

36. The device according to claim 33, wherein the processor circuit is arranged to communicate over the cellular network using dual connectivity or multi connectivity.

37. The device according to claim 36,
wherein the first node is a base station and a Master Node for dual connectivity or multi connectivity,
wherein the second node is a base station and a Secondary Node for dual connectivity or multi connectivity.

38. The device according to claim 36,
wherein the first cell of the first node is a Special Cell or a Secondary Cell of a Master Cell Group for dual connectivity or multi connectivity, and/or
wherein the first cell of the second node is Special Cell or a Secondary Cell of a Secondary Cell Group for dual connectivity or multi connectivity.

39. The device according to claim 33, wherein the first change condition and/or the second change condition is any of:
a number of instances where a timer of a Radio Link Failure timer has started, but has not expired within a period of time;
a number of HARQ retransmission from the PHY layer;
a number of retransmissions from a Radio Link Control layer that is less than the maximum number upon which the user equipment detects a radio-link failure;
a weighted or moving average or any other statistical method using metrics that show a degradation of a signal quality;
a bit error rate;
a packet loss rate or a packet error rate;
a data rate demand;
a supported bandwidth;
a multi-cell event,
wherein the multi-cell event is triggered by the user equipment, one of the nodes or another device of the cellular network.

40. The device according to claim 33, wherein the processor circuit is arranged to receive the second request for reconfiguration from the first node or from the second node.

41. The device according claim 33, wherein the processor circuit is arranged to communicate with the first replacement cell after the first change condition has been met.

42. The device according claim 33,
wherein the processor circuit is arranged to perform a random access procedure towards the first replacement cell after the first change condition has been met,
wherein the processor circuit is arranged to release the first cell of the first node after the random access procedure towards the first replacement cell has been successfully completed.

43. The device according to claim 33, wherein the processor circuit is arranged to communicate with the second replacement cell after the second change condition has been met.

44. The device according to claim 33,
wherein the processor circuit is arranged to perform a random access procedure towards the second replacement cell after the second change condition has been met,
wherein the processor circuit is arranged to release the first cell of the second node after the random access procedure towards the second replacement cell has been successfully completed.

45. The device according to claim 33,
wherein the processor circuit is arranged to derive the first request for reconfiguration, whether the first replacement cell belongs to the first node of the cellular network or to a third node of the cellular network,
whether the second replacement cell belongs to the second node of the cellular network or to a fourth node of the cellular network.

46. The device according to claim 33, wherein the processor circuit is arranged to replace the first cell of the second node by the second replacement cell such that the first cell of the second node is released by the user equipment before the processor circuit connects to the second replacement cell.

47. The device according to claim 33, wherein the processor circuit is arranged to replace the first cell of the second node by the second replacement cell such that the user equipment connects to the second replacement cell before the first cell of the second node is released by the device.

48. The device according to claim 33,
wherein the processor circuit is arranged to derive the second request for reconfiguration, whether the first replacement cell belongs to the first node of the cellular network or to a third node of the cellular network,
whether the second replacement cell belongs to the second node of the cellular network or to a fourth node of the cellular network.

49. A method comprising:
communicating with at least one cells of a first node of a cellular network and with at least one cells of a second node of the cellular network;
receiving a first request for reconfiguration,
wherein the first request for configuration comprises an indication that a first cell of the first node has to be replaced by a first replacement cell of the cellular network,
wherein the first cell of the first node is arranged to communicate with the user equipment,
wherein the first request for reconfiguration comprises a first change condition under which the first request for reconfiguration has to be executed and/or for receiving a second request for reconfiguration,
wherein the second request for reconfiguration comprises an indication that a first cell of the second node has to be replaced by a second replacement cell of the cellular network,
wherein the second cell of the second node is arranged to communicate with the device,
wherein the second request for reconfiguration comprises a second change condition under which the second request for reconfiguration has to be executed;
monitoring the first change condition and/or the second change condition; and
replacing the first cell of the first node by the first replacement cell if the monitoring circuit detects that the first change condition is met;
replacing the first cell of the second node by the second replacement cell if the monitoring circuit detects that the second change condition is met;
transmitting a second message to the first node or to the second node, after the second condition has been met,
wherein the second message indicates that the first cell of the second node has been released.

50. The method according to claim 49, further comprising replacing the first cell of the first node by the first replacement cell such that the first cell of the first node is released by the user equipment before the processor circuit connects to the first replacement cell.

51. The method according to claim 49, further comprising replacing the first cell of the first node by the first replacement cell such that the device connects to the first replacement cell before the first cell of the first node is released by the device.

52. The method according to claim 49, further comprising communicating over the cellular network using dual connectivity or multi connectivity.

53. The method according to claim 52,
wherein the first node is a base station and a Master Node for dual connectivity or multi connectivity,
wherein the second node is a base station and a Secondary Node for dual connectivity or multi connectivity.

54. The method according to claim 52,
wherein the first cell of the first node is a Special Cell or a Secondary Cell of a Master Cell Group for dual connectivity or multi connectivity, and/or
wherein the first cell of the second node is Special Cell or a Secondary Cell of a Secondary Cell Group for dual connectivity or multi connectivity.

55. The method according to claim 49, further comprising receiving the second request for reconfiguration from the first node or from the second node.

56. The method according to claim 49, further comprising communicating with the first replacement cell after the first change condition has been met.

57. The method according to claim 49, further comprising:
performing a random access procedure towards the first replacement cell after the first change condition has been met; and
releasing the first cell of the first node after the random access procedure towards the first replacement cell has been successfully completed.

58. The method according to claim 49, further comprising communicating with the second replacement cell after the second change condition has been met.

59. The method according to claim 49, further comprising:
performing a random access procedure towards the second replacement cell after the second change condition has been met; and
releasing the first cell of the second node after the random access procedure towards the second replacement cell has been successfully completed.

60. The method according to claim 49, further comprising deriving the first request for reconfiguration, whether the first replacement cell belongs to the first node of the cellular network or to a third node of the cellular network, whether the second replacement cell belongs to the second node of the cellular network or to a fourth node of the cellular network.

61. The method according to claim 49, wherein the processor circuit is arranged to replace the first cell of the second node by the second replacement cell such that the first cell of the second node is released by the user equipment before the processor circuit connects to the second replacement cell.

62. The method according to claim 49, further comprising replacing the first cell of the second node by the second replacement cell such that the user equipment connects to the second replacement cell before the first cell of the second node is released by the device.

63. The method according to claim 49, further comprising deriving the second request for reconfiguration, whether the first replacement cell belongs to the first node of the cellular network or to a third node of the cellular network, whether the second replacement cell belongs to the second node of the cellular network or to a fourth node of the cellular network.

* * * * *